United States Patent

[11] 3,551,656

| [72] | Inventor | Jack A. Wohlfeil<br>Fond du Lac, Wis. |
|---|---|---|
| [21] | Appl. No. | 447,291 |
| [22] | Filed | Apr. 12, 1965 |
| [45] | Patented | Dec. 29, 1970 |
| [73] | Assignee | Giddings & Lewis Inc.<br>Fond du Lac, Wis.<br>a corporation of Wisconsin |

[54] NUMERICAL CONTROL SYSTEM
34 Claims, 47 Drawing Figs.

[52] U.S. Cl.................................................235/151.11,
318/18; 340/146; 2, 235/170
[51] Int. Cl........................................................G06j 3/00,
G05b 19/38
[50] Field of Search..........................................235/151.11;
318/20.250, 20.260, 20.330, 20.730

[56] References Cited
UNITED STATES PATENTS

| 3,063,311 | 11/1962 | Beckwith et al. | 77/32.2 |
|---|---|---|---|
| 3,098,995 | 7/1963 | Mundt | 340/146.2 |
| 3,117,263 | 1/1964 | MacDonald | 318/28 |
| 3,172,026 | 3/1965 | Schuman | 318/28 |
| 3,284,618 | 11/1966 | Goetz et al. | 235/151.11 |
| 3,324,364 | 6/1967 | Caruthers | 318/18 |
| 3,348,208 | 10/1967 | Rosener | 340/172.5 |
| 3,362,601 | 1/1968 | Ford et al. | 226/122 |

*Primary Examiner*—Eugene G. Botz
*Attorney*—Wolfe, Hubbard, Leydig, Voit and Osann

ABSTRACT: A numerically controlled positioning system primarily, but not exclusively, for machine tools. A numerically defined commanded position is read in BCD notation from a record (punched tape) into a storage register and then algebraically combined in a digital adder-subtractor with an "adjustment" or "correction" number which the operator has dialed in to account for factors which the programmer could not foresee. The resulting adjusted command number accurate to the nearest .0001 inch is then placed in a storage resigster. The actual position of the movable part is continuously signaled in BCD notation by a reversible counter which counts forwardly or reversely in response to a pulse generator coupled to be driven from the movable part, the signaled position being accurate to the nearest .001 inch. The adder-subtractor then rapidly and repeatedly computes and signals the error or difference between the adjusted command number and the actual position number and the signaled error number is compared with stored "switch point values" to effect corrective drive of the member until the error is less than ±.025 inch. When such coarse digital positioning is completed, a fine servosystem is rendered operative. This includes a digital-to-analog converter responsive to the last few lower order digits of the stored adjusted command number for exciting a suitable analog device such as a linear Inductosyn (T.M.) which in turn produces a fine analog error signal indicative of the sense and extent of the position error over repeating fine spans, e.g., spans of .050 inch. The latter signal is caused to continue corrective drive of the movable part until the signal is reduced substantially to zero and the part is stopped precisely in the adjusted command position. When this occurs, means are activated to preset the reversible counter to agree with the then stored adjusted command number so as to obviate any cumulative errors due to loss of or pickup of spurious feedback pulses. The system then causes reading of the next set of command data after any machining operation at the position is completed.

The system may include apparatus for positioning along one or more axes, and a single adder-subtractor operates on a rapidly repeating cyclic basis to perform the algebraic combination of correction numbers and of commanded and actual position numbers for all axes of control. As each computed and signaled error number falls below successively lower and predetermined "switch point values," comparing apparatus conditions the drive means to move the part at a lower velocity along the axis corresponding to that error number. No digital-to-analog conversion of the digital error number is required.

INVENTOR
Jack A. Wohlfeil
by Wolfe, Hubbard, Voit & Osann
ATTORNEYS

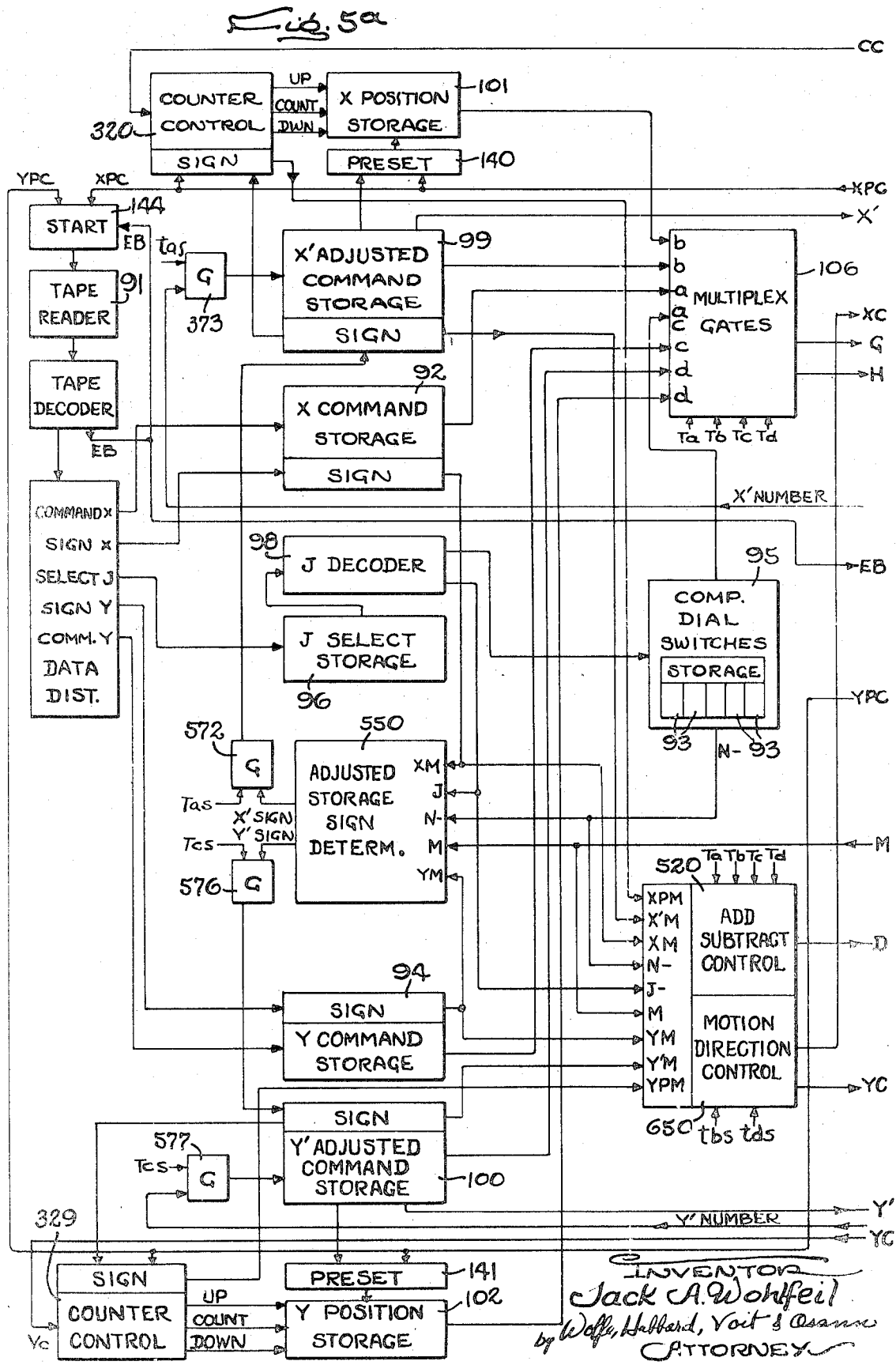

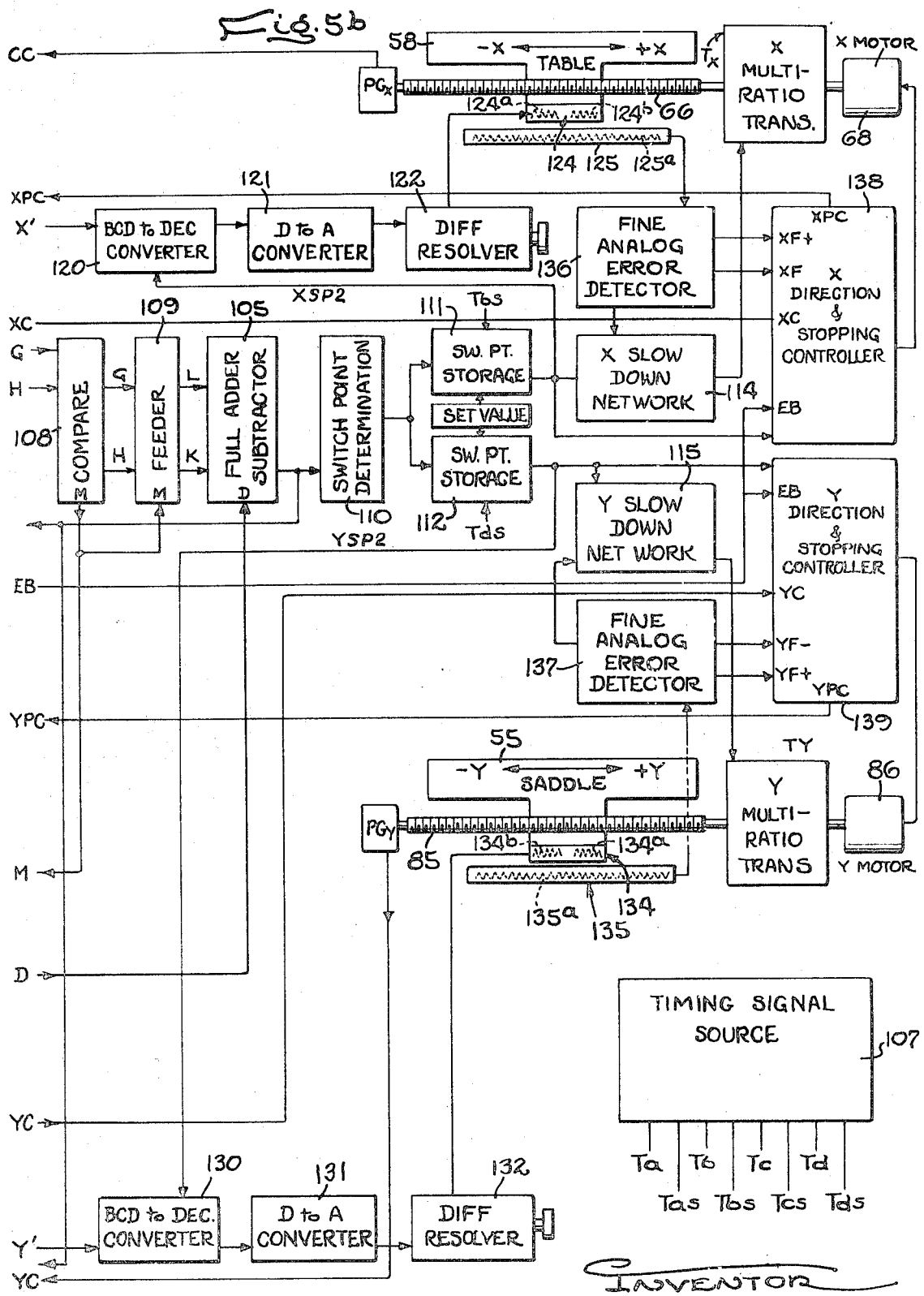

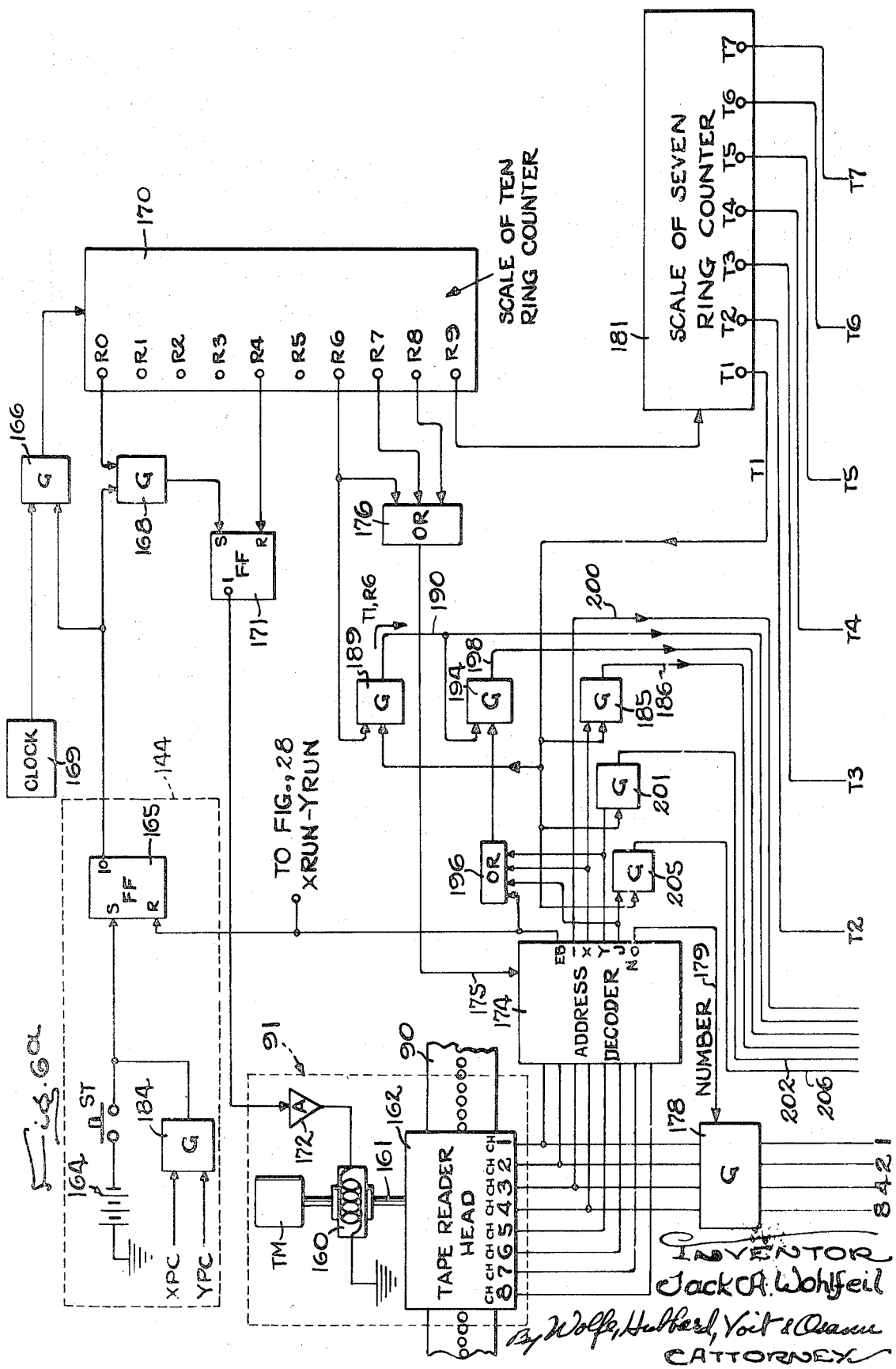

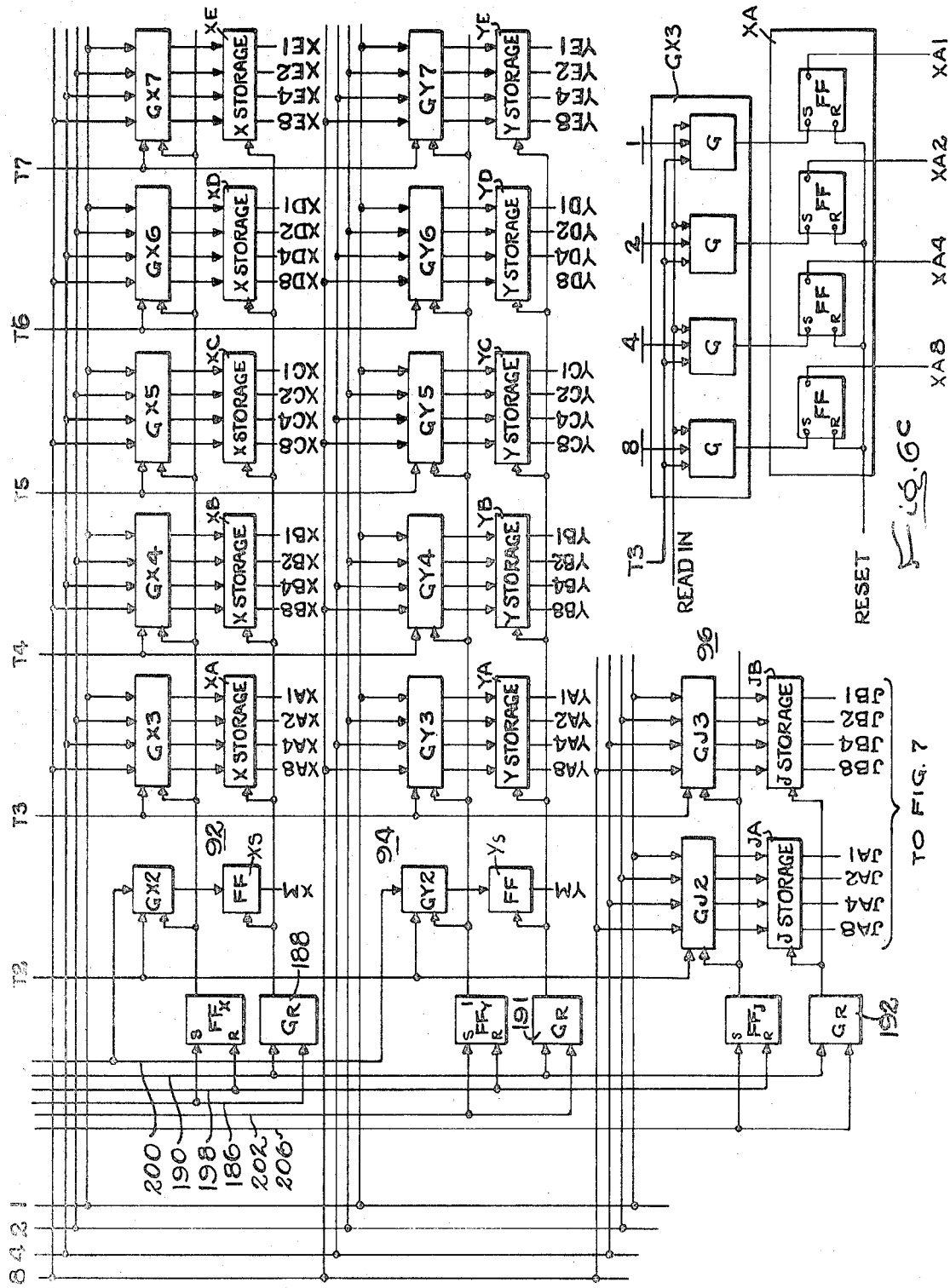

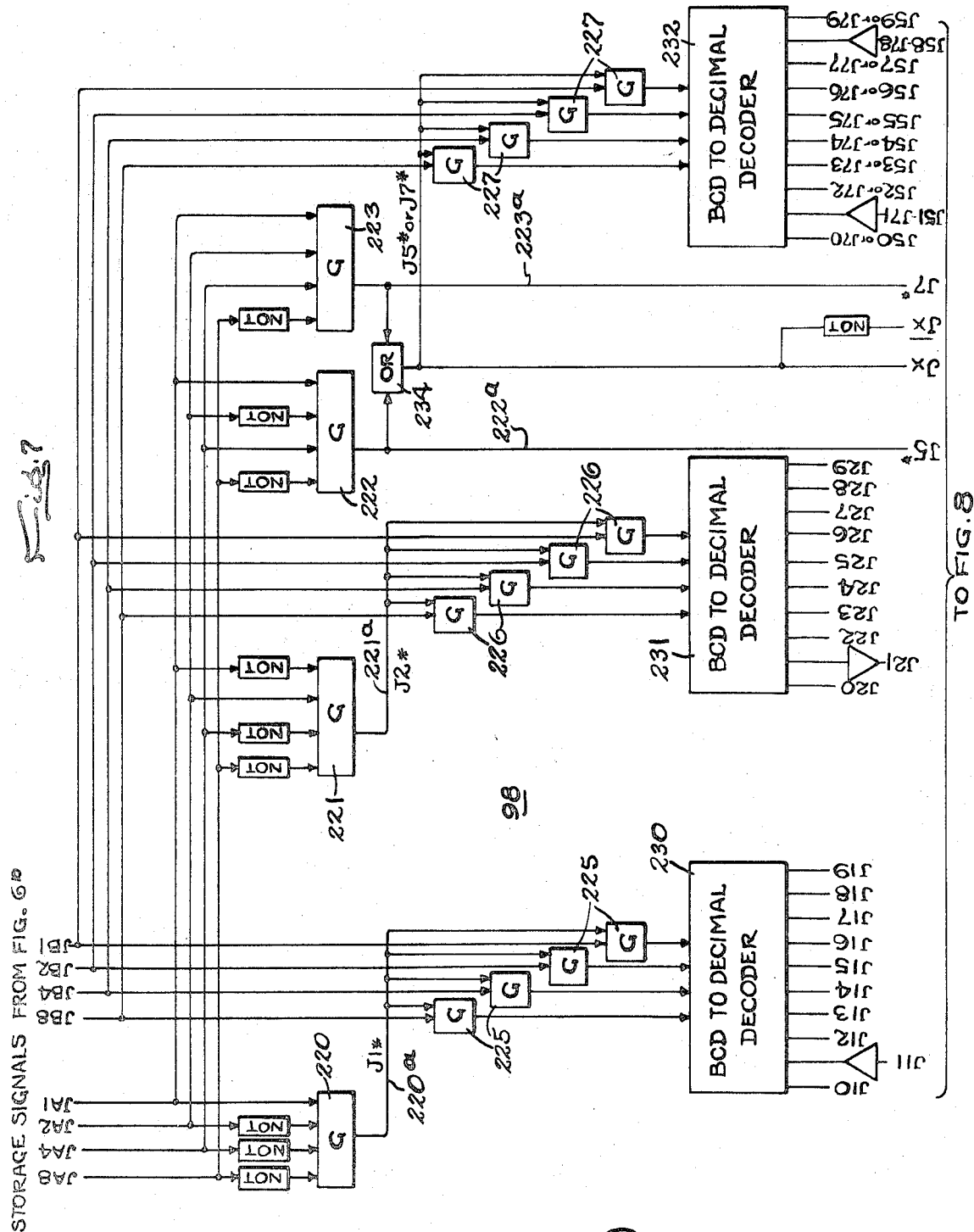

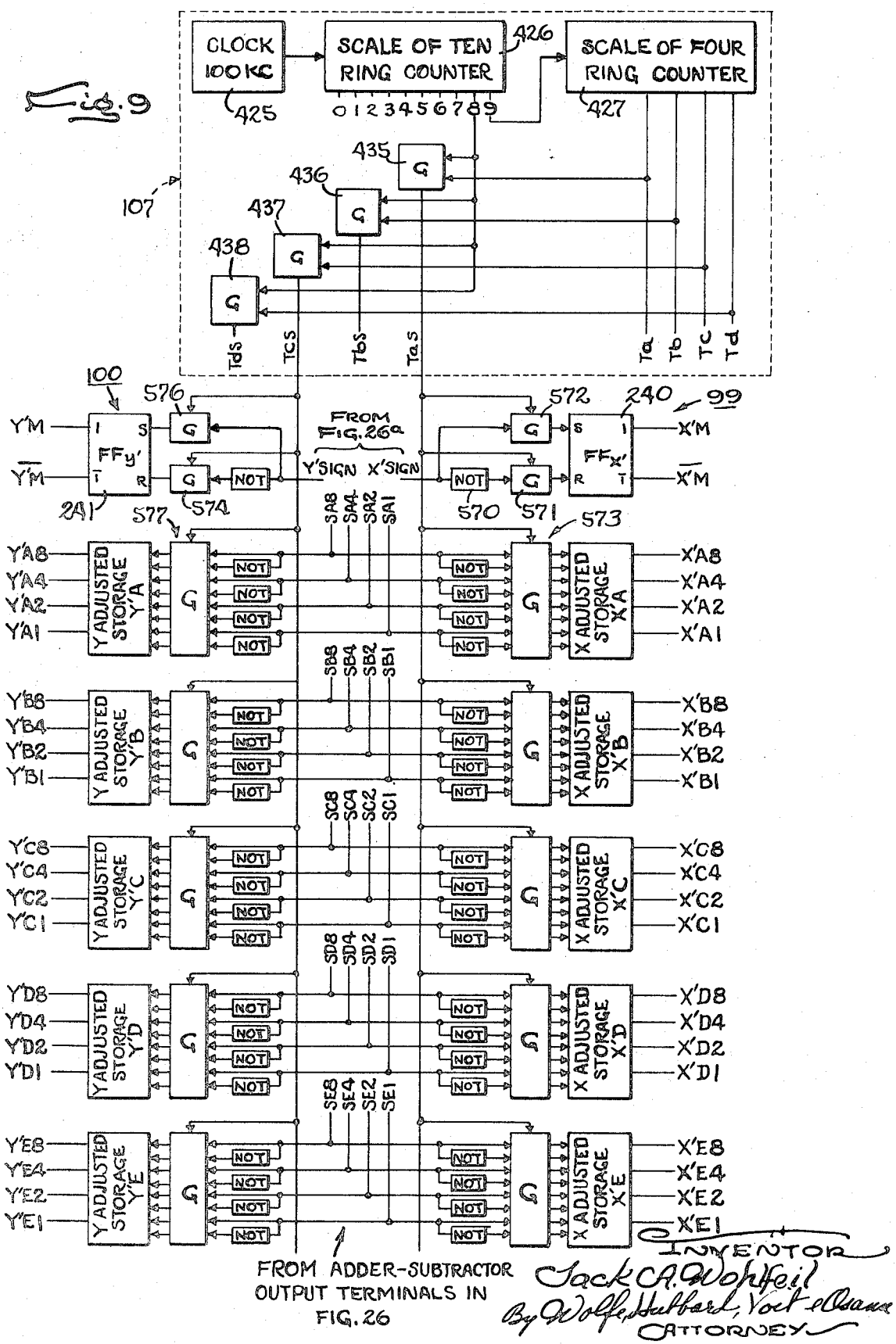

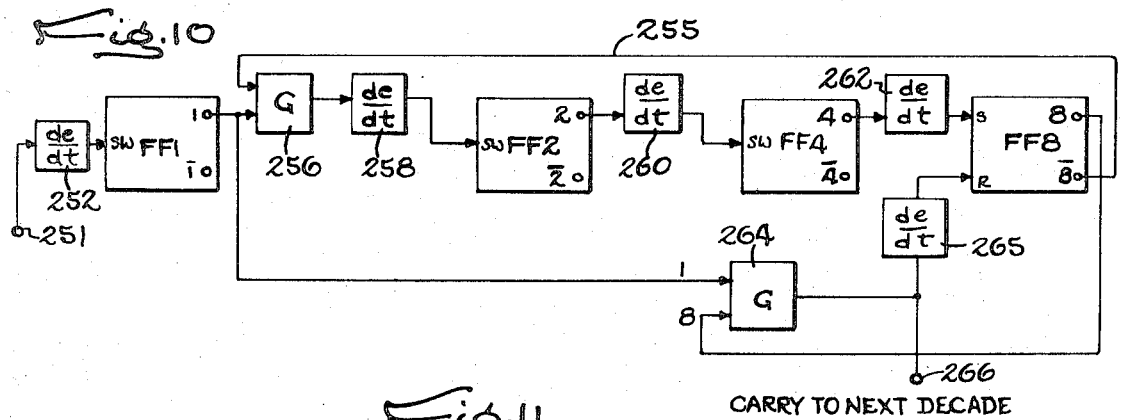
Fig. 10
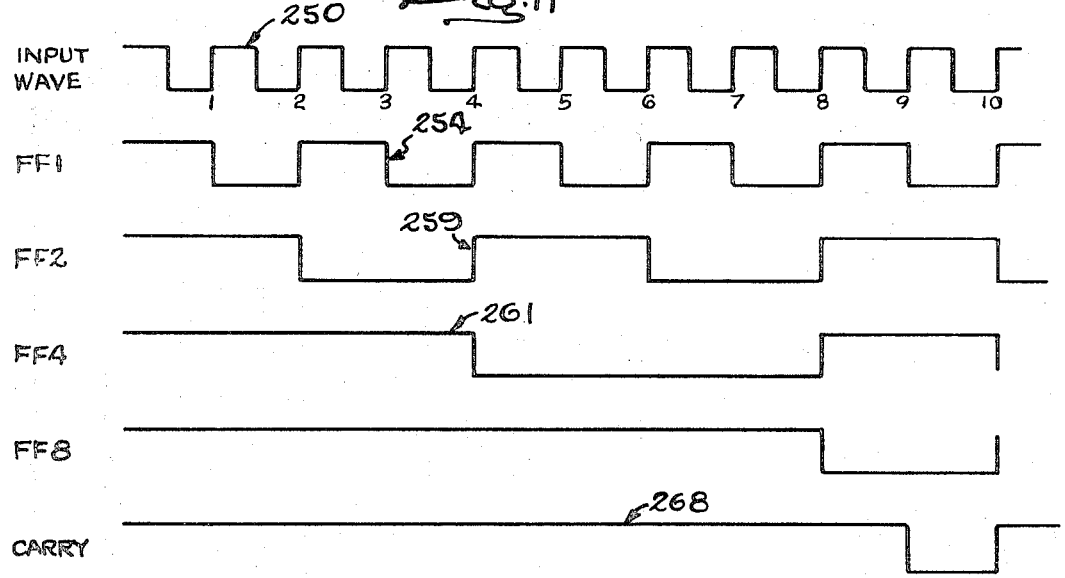
Fig. 11
| No of INPUT WAVES OR PULSES | FF1 | FF2 | FF4 | FF8 | DECIMAL NUMBER STORED |
|---|---|---|---|---|---|
| 0 | 0 | 0 | 0 | 0 | 0 |
| 1 | 1 | 0 | 0 | 0 | 1 |
| 2 | 0 | 1 | 0 | 0 | 2 |
| 3 | 1 | 1 | 0 | 0 | 3 |
| 4 | 0 | 0 | 1 | 0 | 4 |
| 5 | 1 | 0 | 1 | 0 | 5 |
| 6 | 0 | 1 | 1 | 0 | 6 |
| 7 | 1 | 1 | 1 | 0 | 7 |
| 8 | 0 | 0 | 0 | 1 | 8 |
| 9 | 1 | 0 | 0 | 1 | 9 |
| 10 | 0 | 0 | 0 | 0 | 0 |
| 11 | 1 | 0 | 0 | 0 | 1 |
Fig. 12
INVENTOR
Jack A. Wohlfeil
by Wolfe, Hubbard, Voit & Osann
ATTORNEY

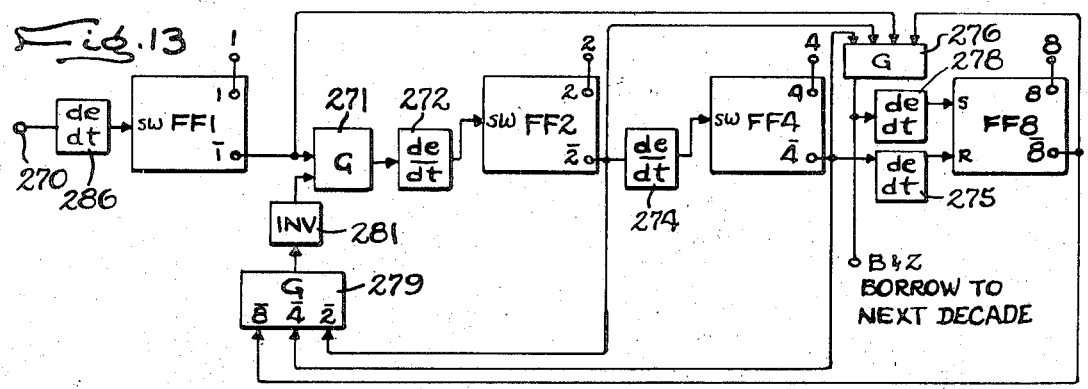
Fig. 13
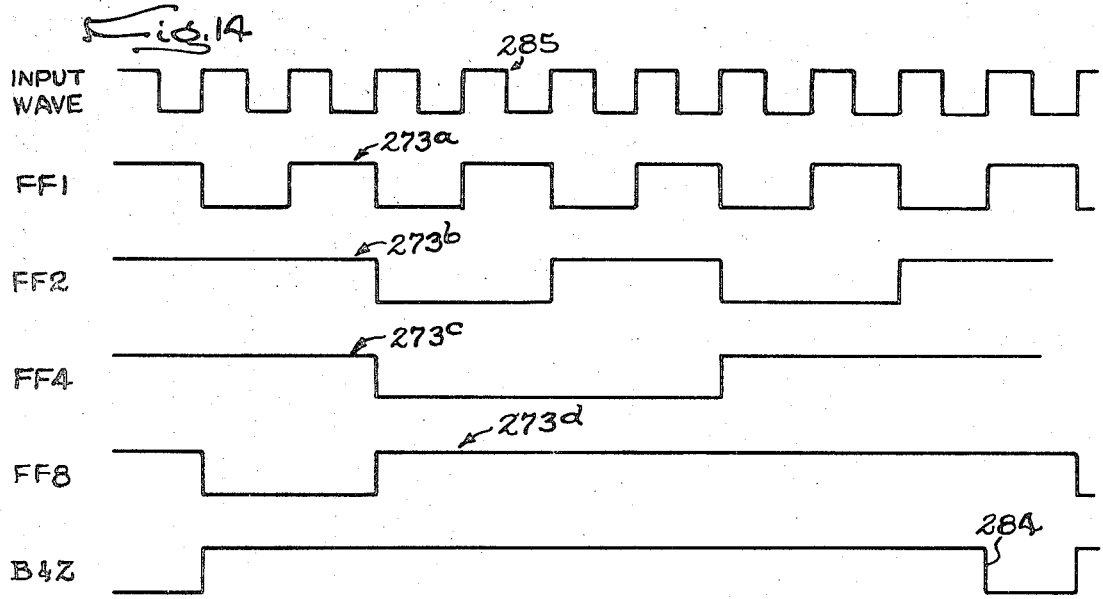
Fig. 14
Fig. 15
| No of INPUT WAVES OR PULSES | FF1 | FF2 | FF4 | FF8 | DECIMAL NUMBER STORAGE |
|---|---|---|---|---|---|
| 0 | 0 | 0 | 0 | 0 | 0 |
| 1 | 1 | 0 | 0 | 1 | 9 |
| 2 | 0 | 0 | 0 | 1 | 8 |
| 3 | 1 | 1 | 1 | 0 | 7 |
| 4 | 0 | 1 | 1 | 0 | 6 |
| 5 | 1 | 0 | 1 | 0 | 5 |
| 6 | 0 | 0 | 1 | 0 | 4 |
| 7 | 1 | 1 | 0 | 0 | 3 |
| 8 | 0 | 1 | 0 | 0 | 2 |
| 9 | 1 | 0 | 0 | 0 | 1 |
| 10 | 0 | 0 | 0 | 0 | 0 |
| 11 | 1 | 0 | 0 | 1 | 9 |
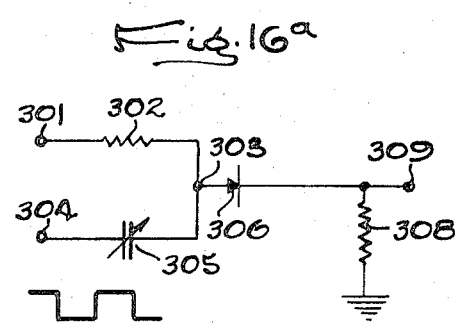
Fig. 16a
INVENTOR
Jack A. Wohlfeil
By Wolfe, Hubbard, Voit & Osann
ATTORNEYS

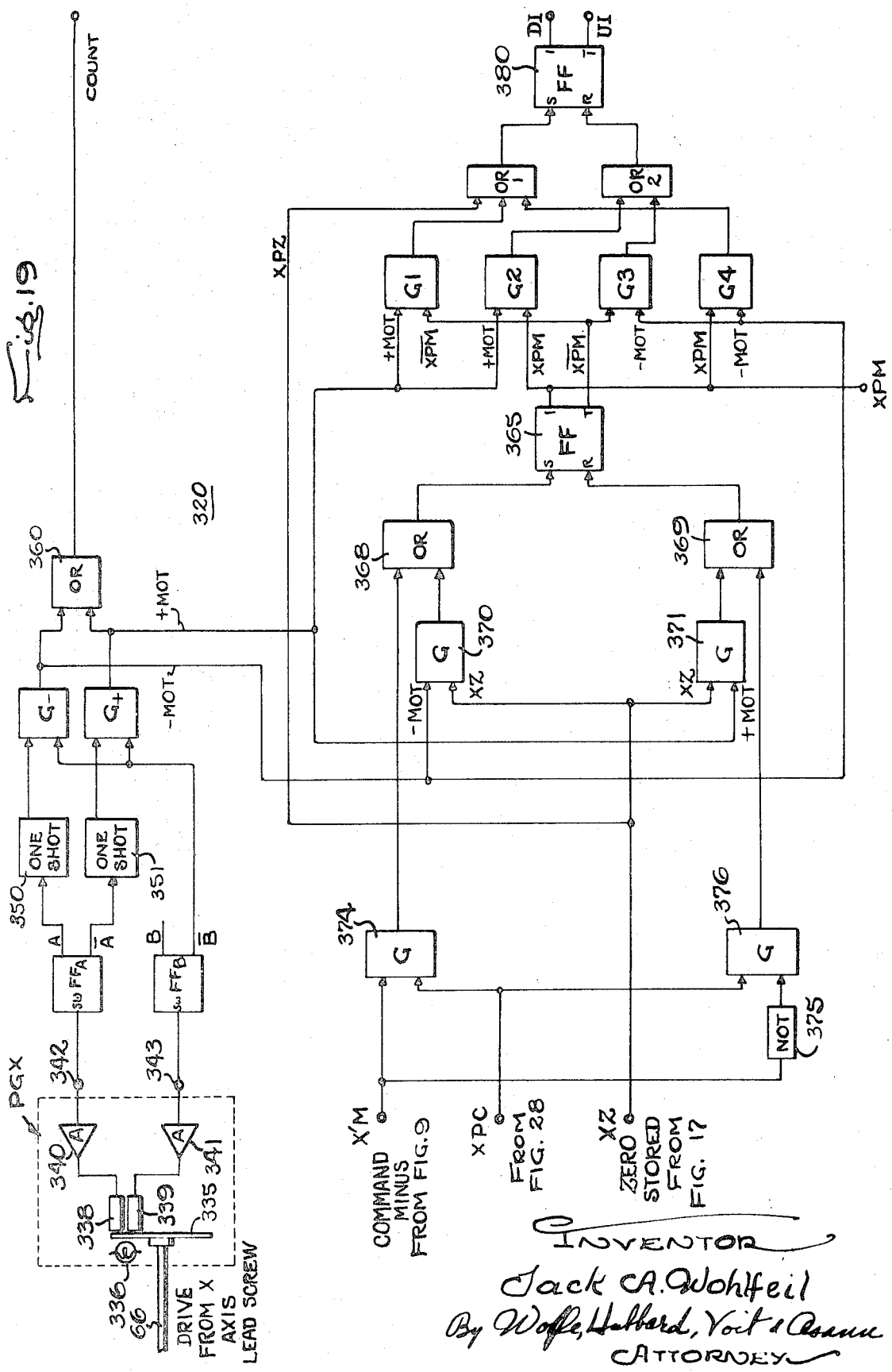

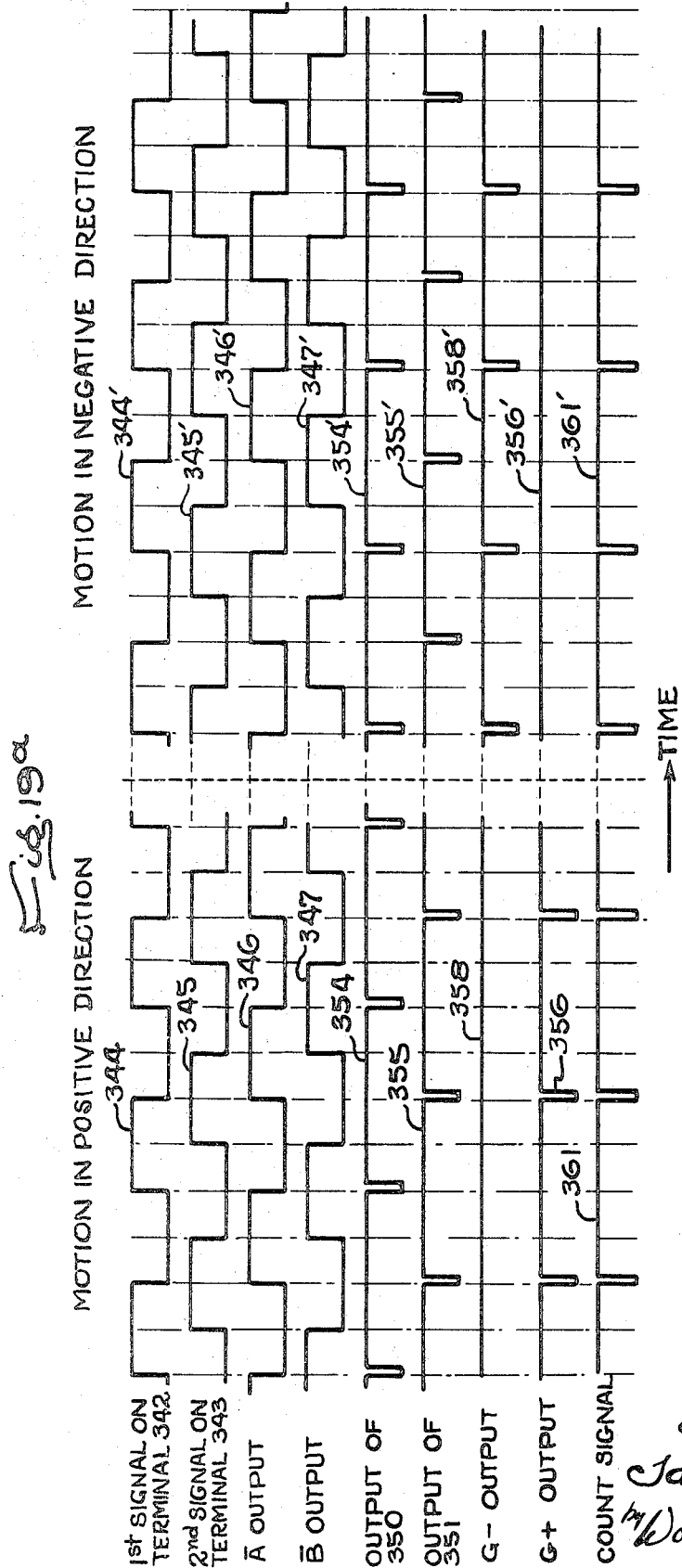

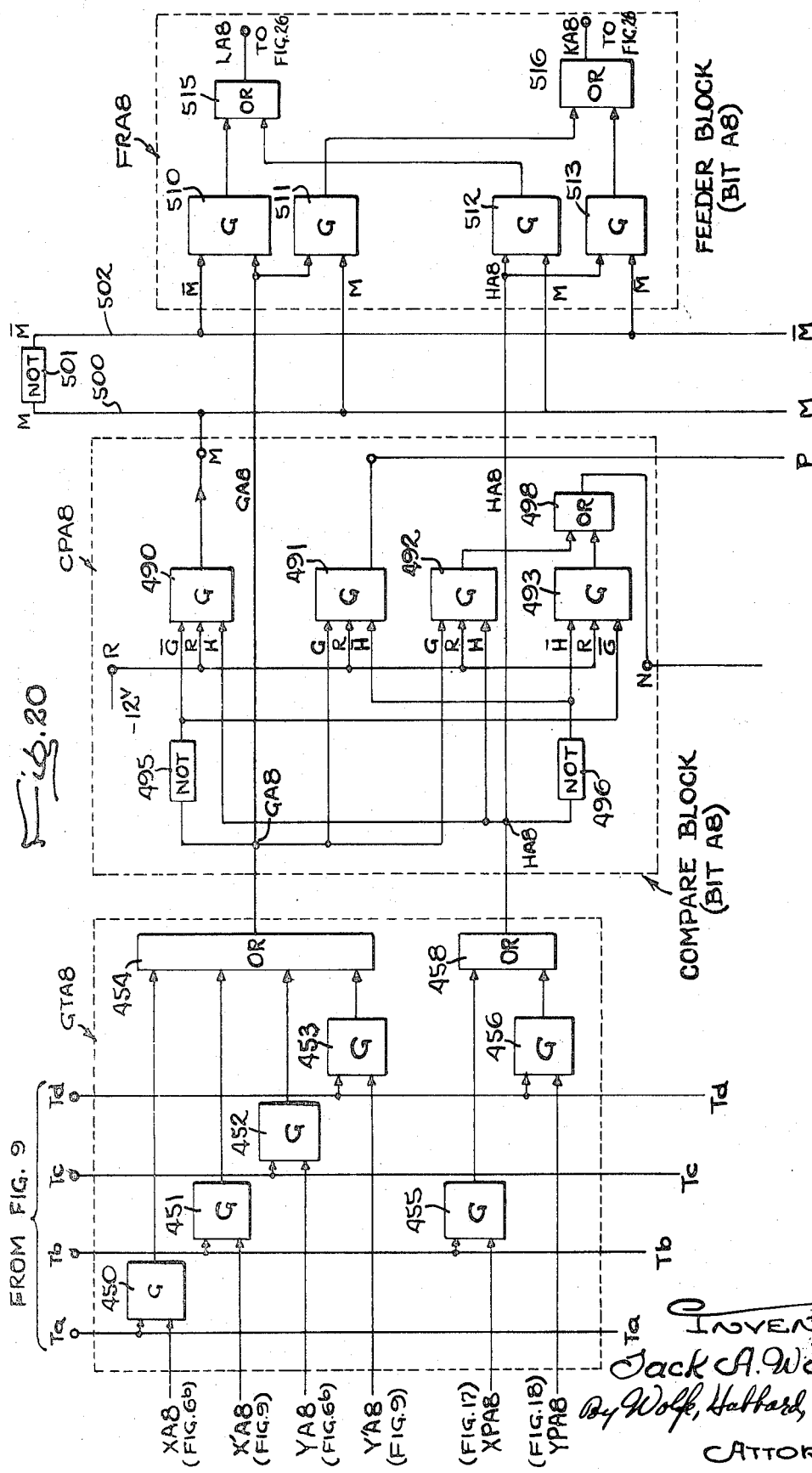

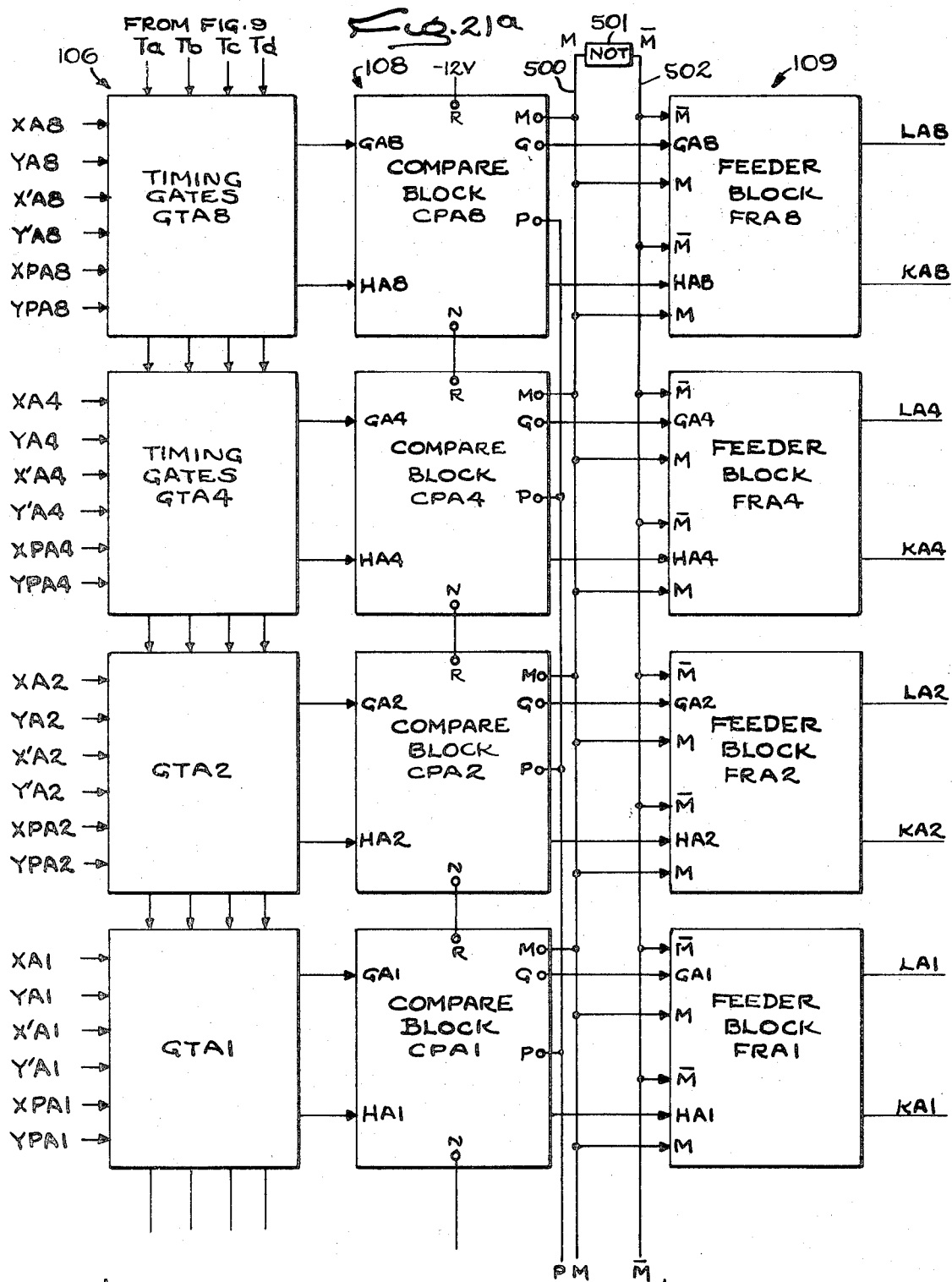

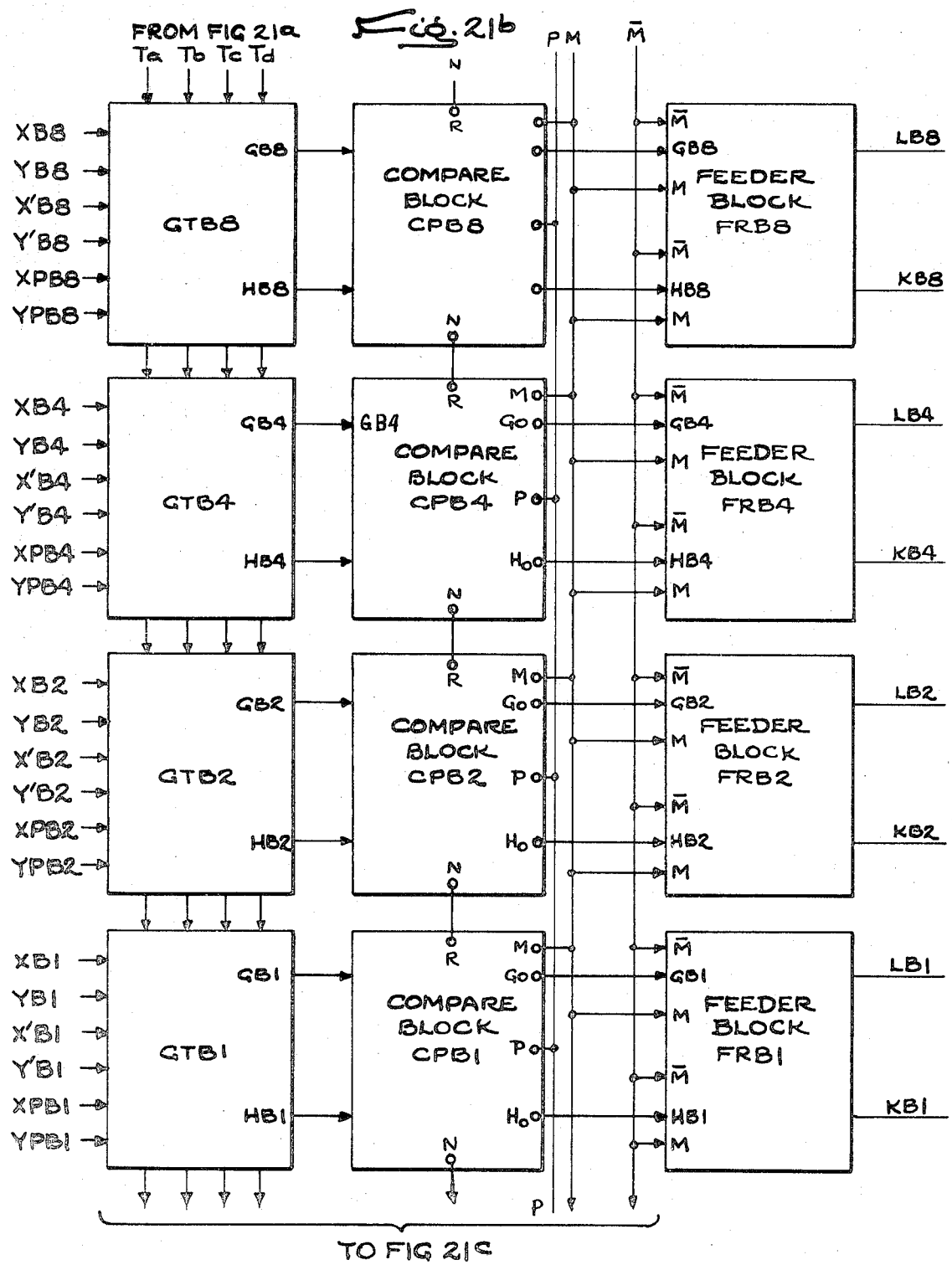

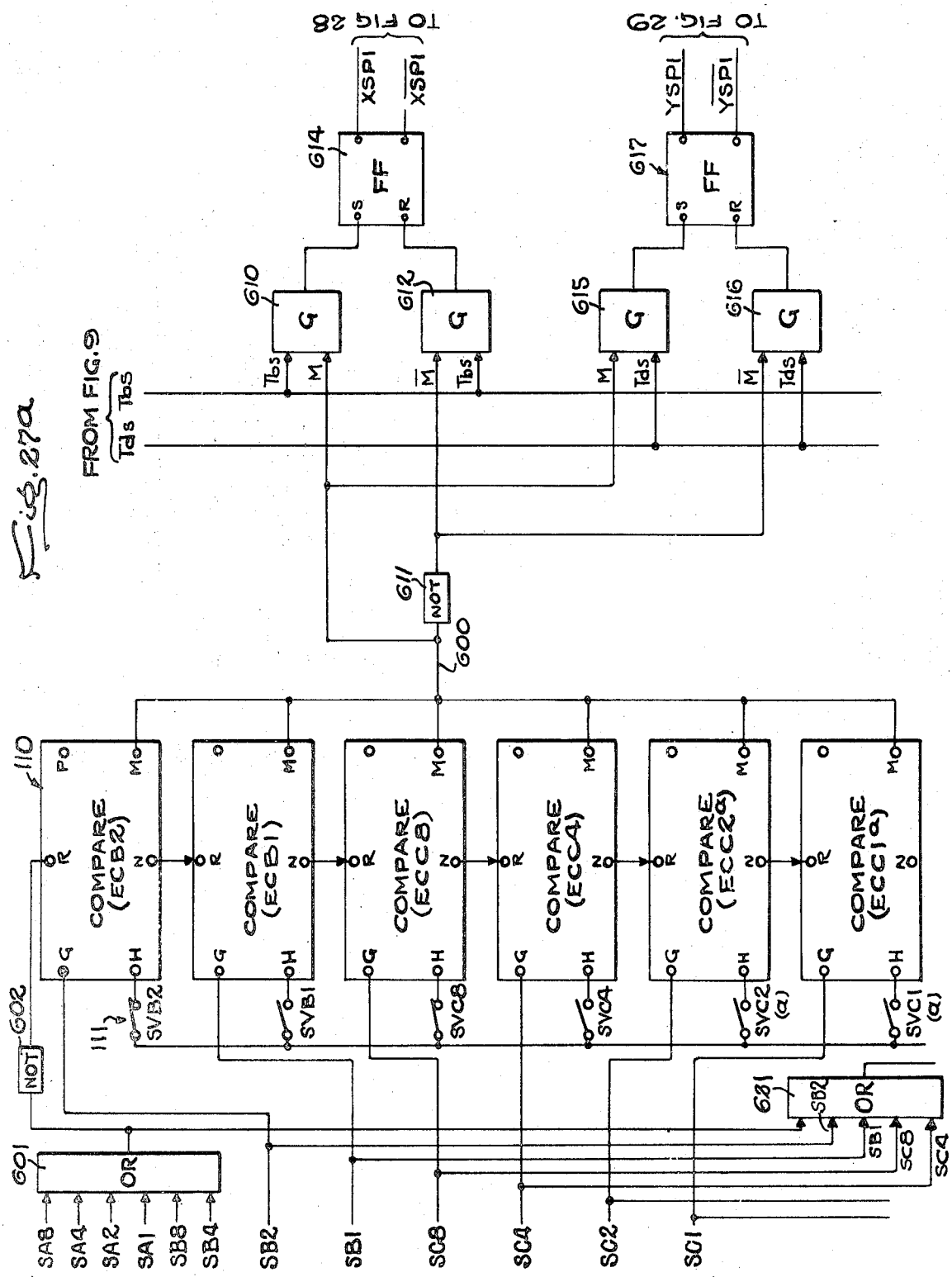

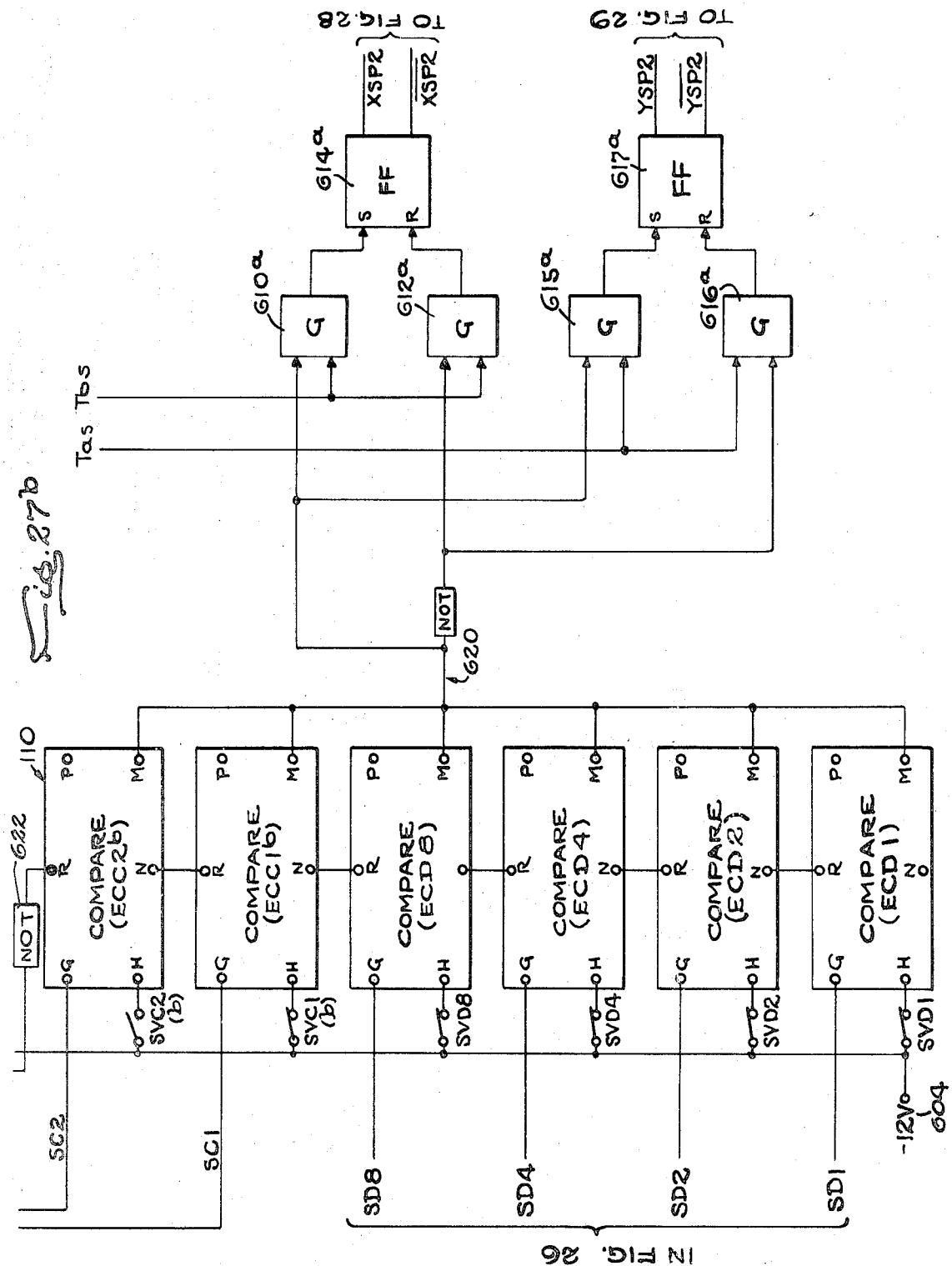

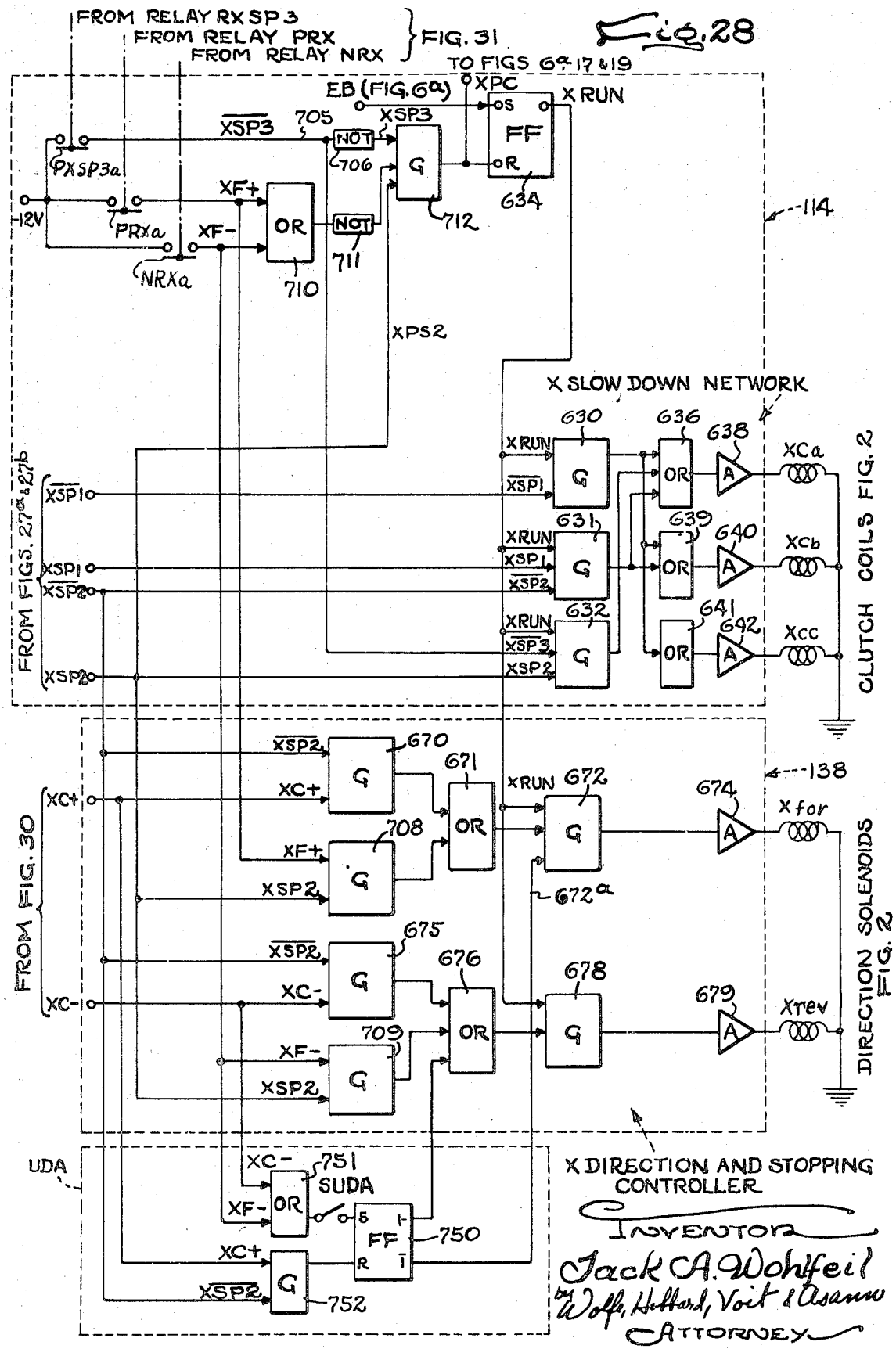

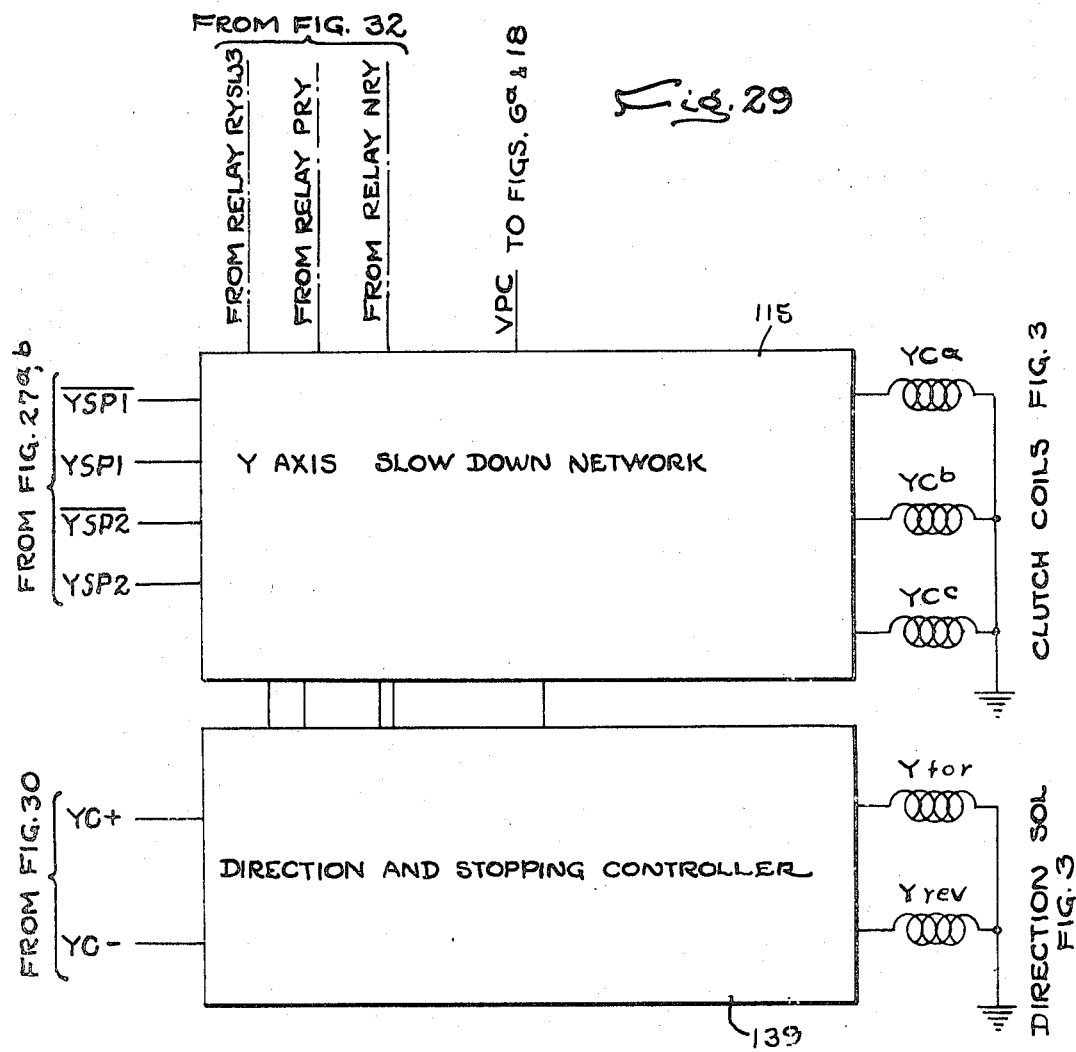

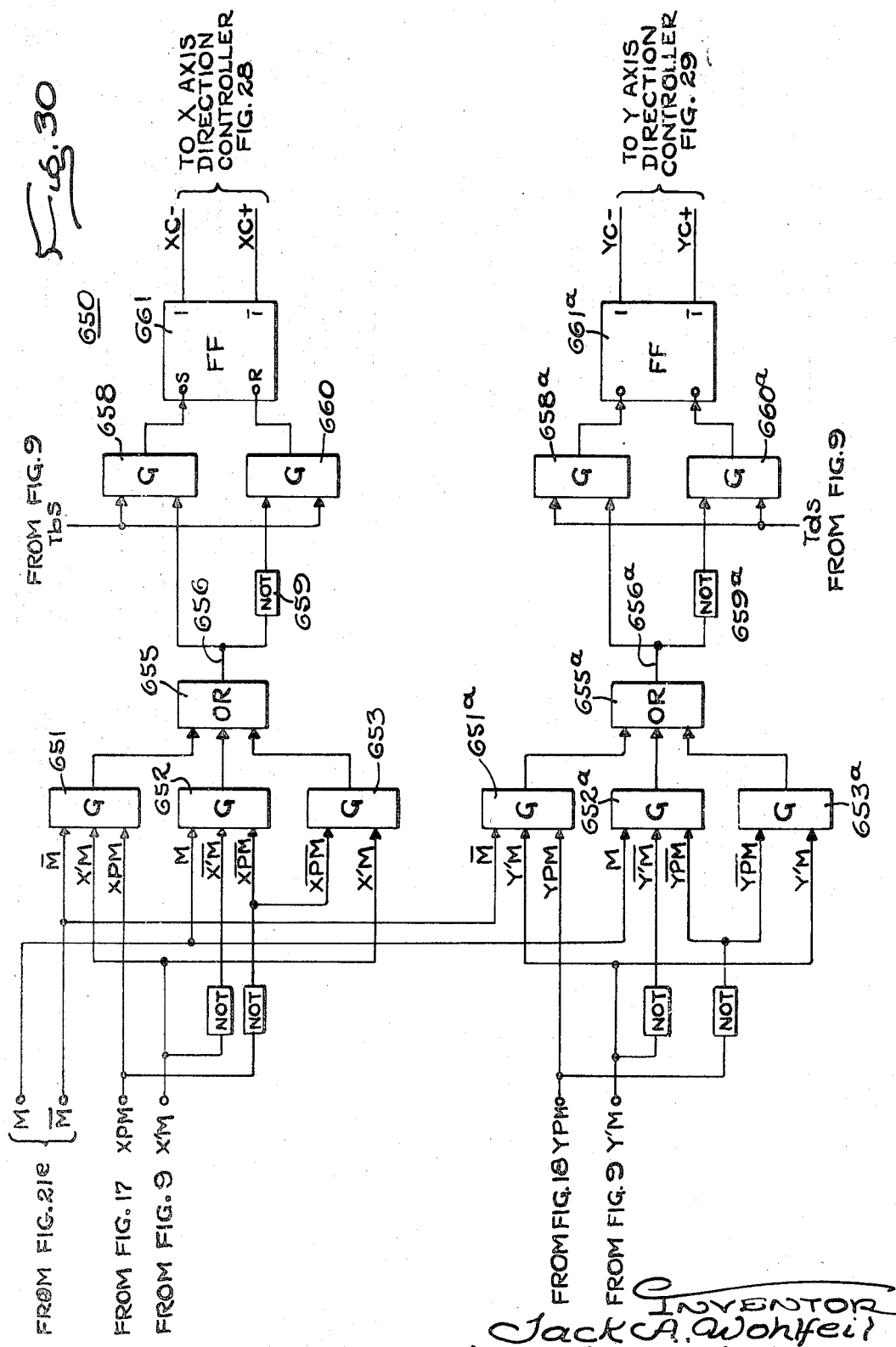

NUMERICAL CONTROL SYSTEM

The present invention relates in general to numerical control systems of the kind used to produce automatic motions of machine tools and the like according to a predetermined program. Although not so specifically limited in its uses, the invention finds especially advantageous employment in point-to-point positioning of the movable elements of a machine tool, and it will here be described in that exemplary environment.

It is the general aim of the present invention to provide an improved numerical control system for positioning one or more elements respectively movable along one or more axes according to a predetermined, numerically represented program, and characterized especially by relative simplicity and compactness, by flexibility in its various uses and functions, by precision in positioning, and by the elimination of cumulative errors.

It is an important object of the invention to provide a numerical control system for positioning a movable element at any desired position within a relatively wide range of travel with all the accuracy of a precision analogue servoarrangement, but without all of the very expensive and multiplied apparatus for coarse, medium, medium fine, and fine channels which have heretofore been required for analogue systems. Conversely, it is an object of the invention to provide such a control system operable over a wide positioning range by a digital servoloop, but without the attendant possibilities of error and inaccuracy which have heretofore plagued digital control arrangements.

Another and related object of the invention is to provide a numerically controlled positioning system wherein the movable element is brought to within a certain distance of a desired position under the control of digital feedback and error-computing means, and thereafter moved to and stopped precisely in the desired position under the control of a fine range, highly precise analogue feedback loop.

Moreover, it is an object completely to do away with errors, or accumulation of errors, which otherwise would arise as a result of the loss of feedback pulses, or pickup of spurious noise pulses, in a digital feedback system. It is a related object to achieve the elimination of errors through periodic correction of a digital representation of the actual position of the movable element by resetting such digital representation to the correct value as determined by a simple but highly precise analogue system.

Still another object is to provide a numerically controlled positioning system in which a movable element is first driven at a high velocity toward the desired position, progressively slowed in velocity as it approaches within predetermined distances the desired position by digital computation of the error between desired and actual positions, then further progressively slowed by analogue comparison of the desired and actual positions, and finally stopped in the desired position without overtravel or hunting due to inertia and momentum.

It is a further object of the invention to rapidly and repeatedly determine the error between the desired and actual positions of a movable element by algebraically subtracting a digital numerical representation of the actual position from a digital numerical representation of the desired position, using a single algebraic combining or subtracting computer to perform such operations for a plurality of movable elements being positioned simultaneously along different axes.

Another object of the invention is to provide a system which effects coarse positioning of a movable element by algebraically combining digitally represented numbers indicative of desired and actual positions, and which effects fine and final positioning of the movable element according to a fine analogue signal derived from the digital representation of the desired position.

It is yet another object of the invention to provide a numerical control system in which correction distances may be dialed in or selected by an operator to modify any position in a predetermined program of desired positions, and characterized in that a numerical correction distance is algebraically combined with a numerically defined programmed position by an algebraic combining device, thereby to produce a numerical representation of the adjusted desired position, and with the same algebraic combining device serving also to digitally compute and numerically represent error distances utilized in controlling the positioning motion of the movable element.

It is also an object of the invention to provide a system in which an operator may dial into designated ones of a plurality of adjuster devices numerical corrections to modify certain ones of the numerically defined programmed or desired positions, and wherein the same magnitude of correction is produced in a positive or negative sense, as may be required, without the need for the adjuster device to have a sign-representing component. By this provision, a single adjuster device serves to effect the necessary corrections for an undersize cutter regardless of whether such corrections should be positive or negative in sense, a given number of adjuster devices thereby enabling the necessary undersize cutter radius corrections to be made for twice as many rotating cutters as compared to an arrangement in which each adjuster device must signal not only the magnitude but also the sign of the correction distance.

A further object of the invention is to provide a numerically controlled positioning system having very simple and reliable apparatus for causing the movable element always to approach a desired position from one direction before stopping, thereby to eliminate backlash inaccuracies of lead screws, gear trains or other drive components.

Still another object is to provide a very simple and reliable digital adder-subtracter which operates with numbers represented in binary coded decimal form and which is characterized by its fast operation in the absence of any need to complement numbers or represent them in any special code, such as excess three.

It is an additional object to provide a feeder to supply two input numbers to an adder-subtracter, the large number always being presented on one set of input terminals and the smaller number on another set of input terminals.

Yet another object is to provide a simple and reliable arrangement for determining and signaling the sign of a numerically calculated and represented adjusted position derived from an algebraic combination of a programmed numerical position which may be either positive or negative and a correction distance which may be either positive or negative.

And it is an object of the invention to provide a simple and reliable means to determine and control the direction in which an element is moved from its actual position so that it always moves toward a desired position, both of the latter positions being represented by positive or negative numbers indicative of points in positive or negative regions on opposite sides of a zero point.

These and other objects will become apparent as the following description proceeds, taken in conjunction with the accompanying drawings, in which.

Figure 5C:
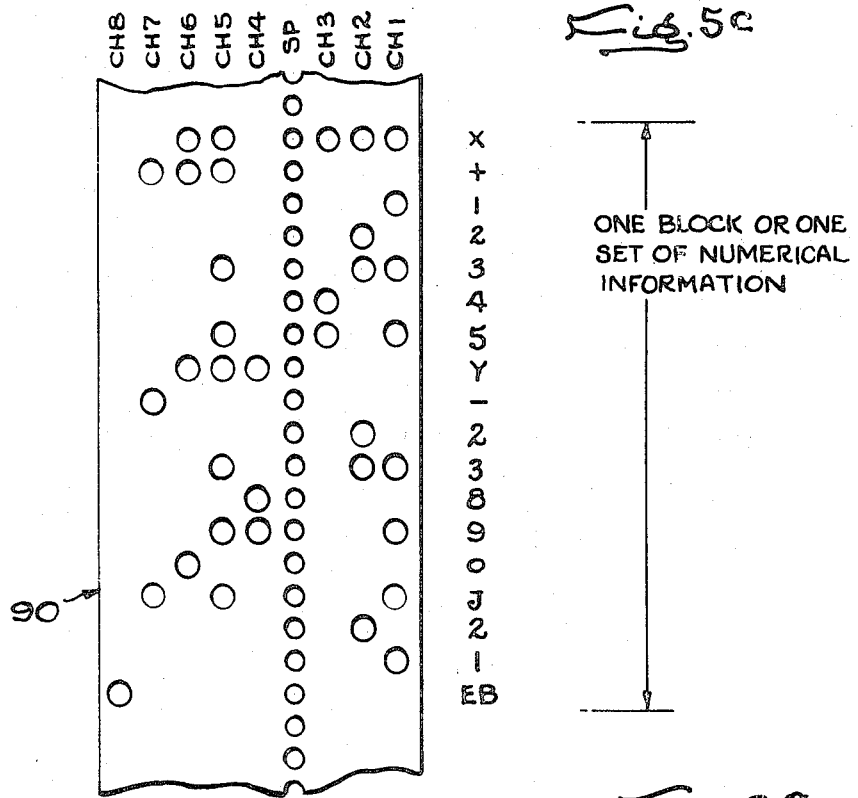
Figure 9A:
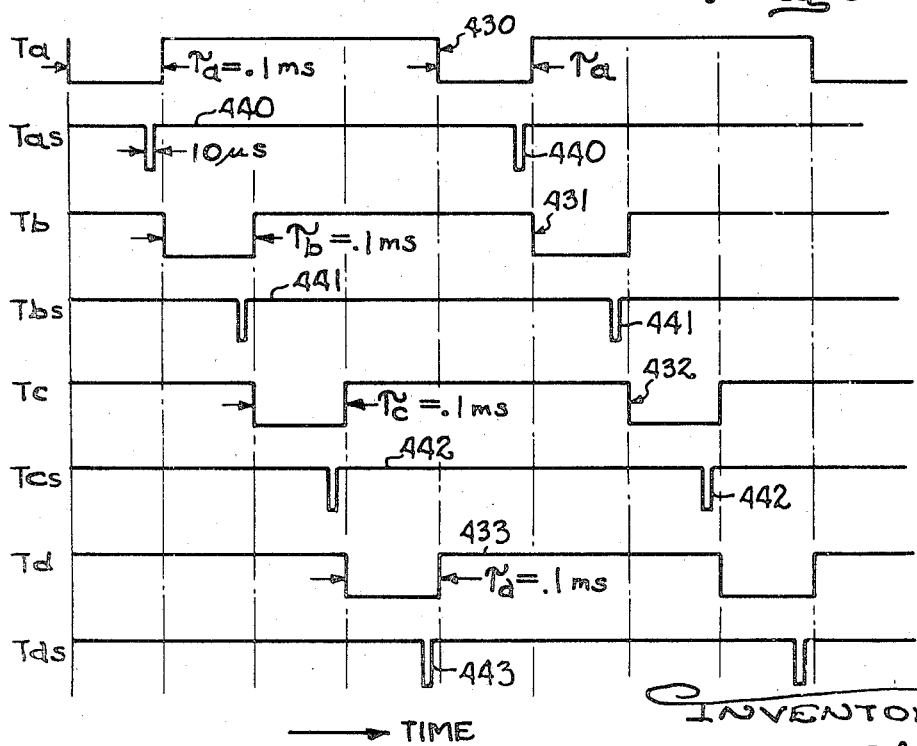
Figure 8:
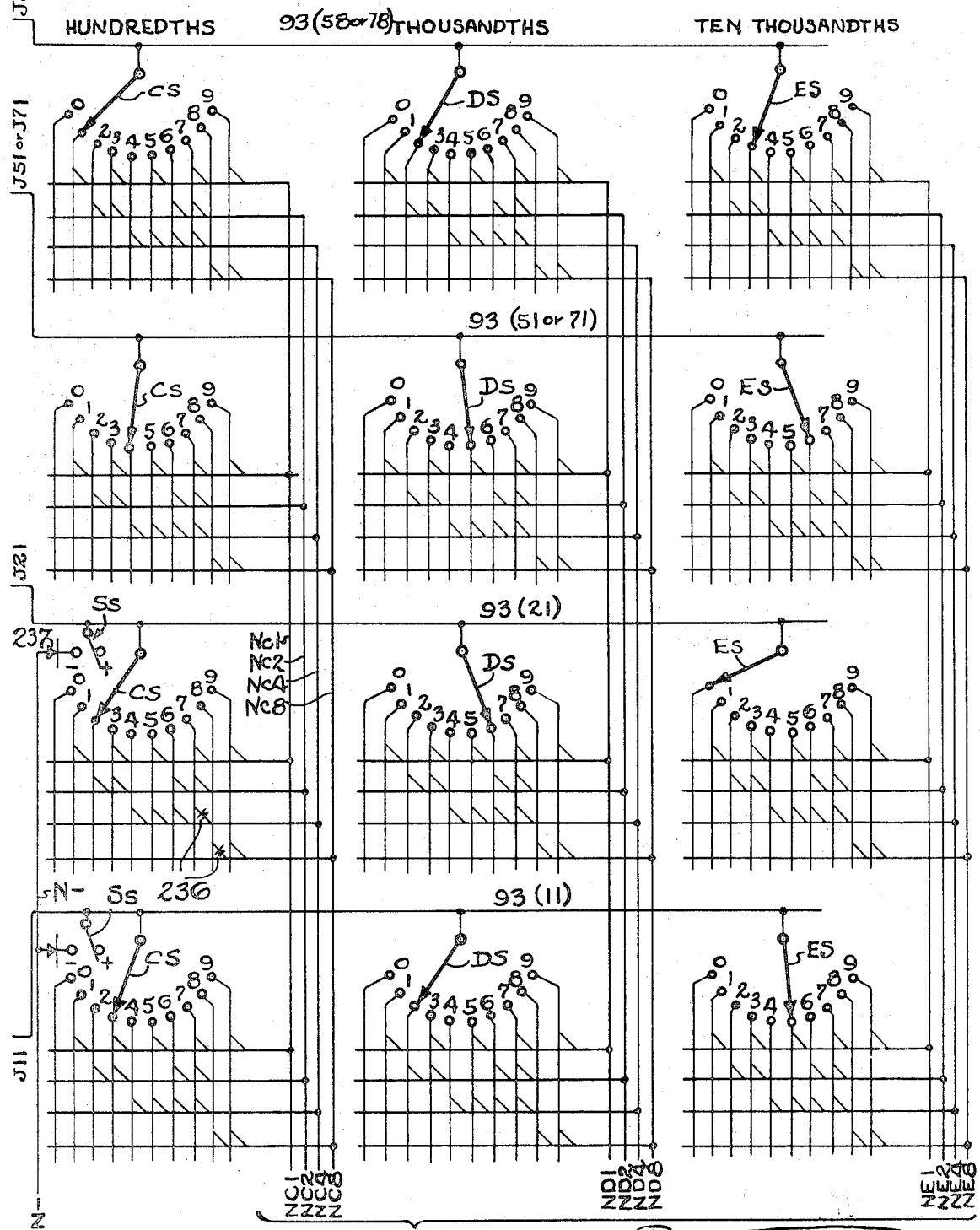
Figure 16:
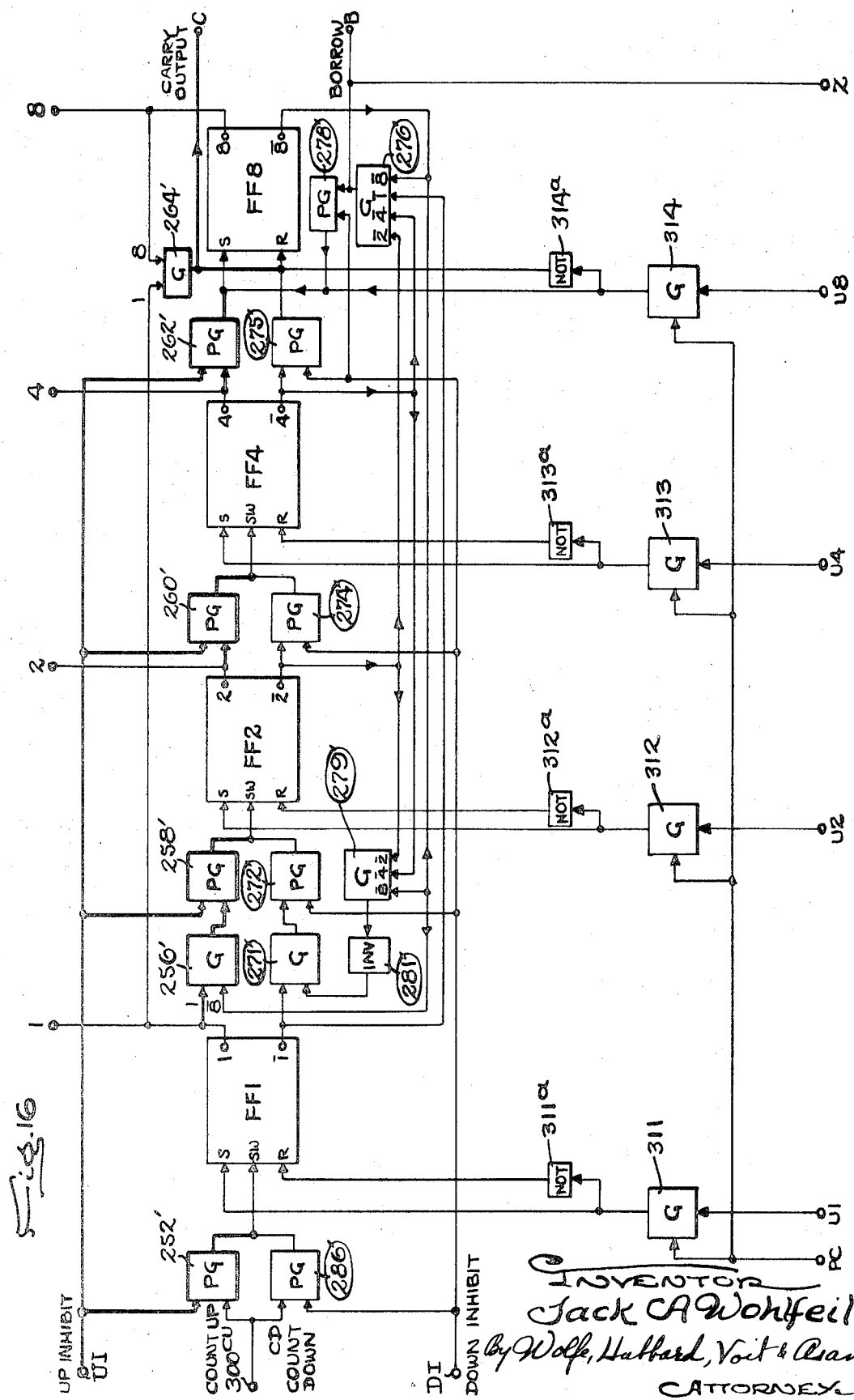
Figure 17:
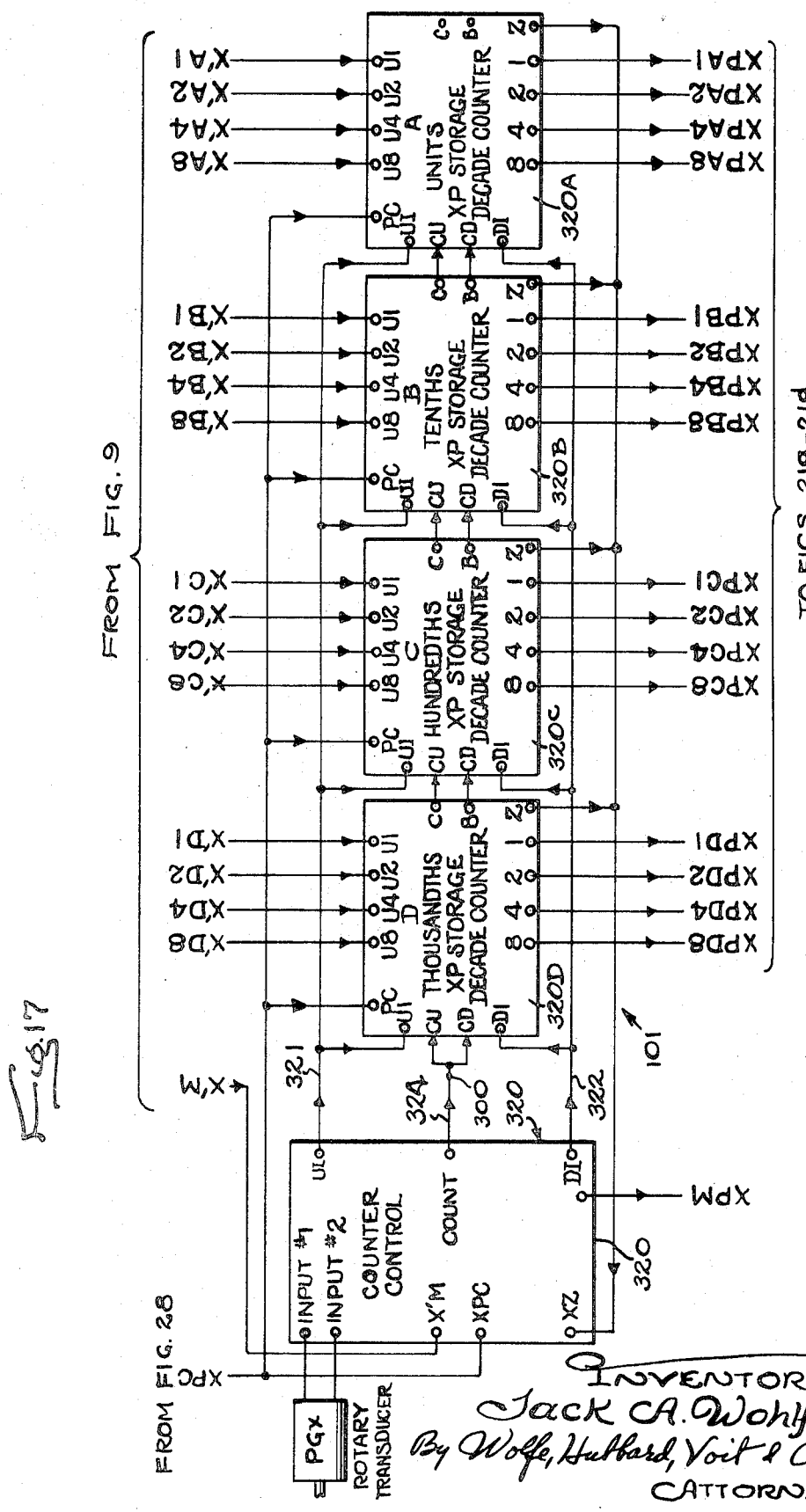
Figure 18:
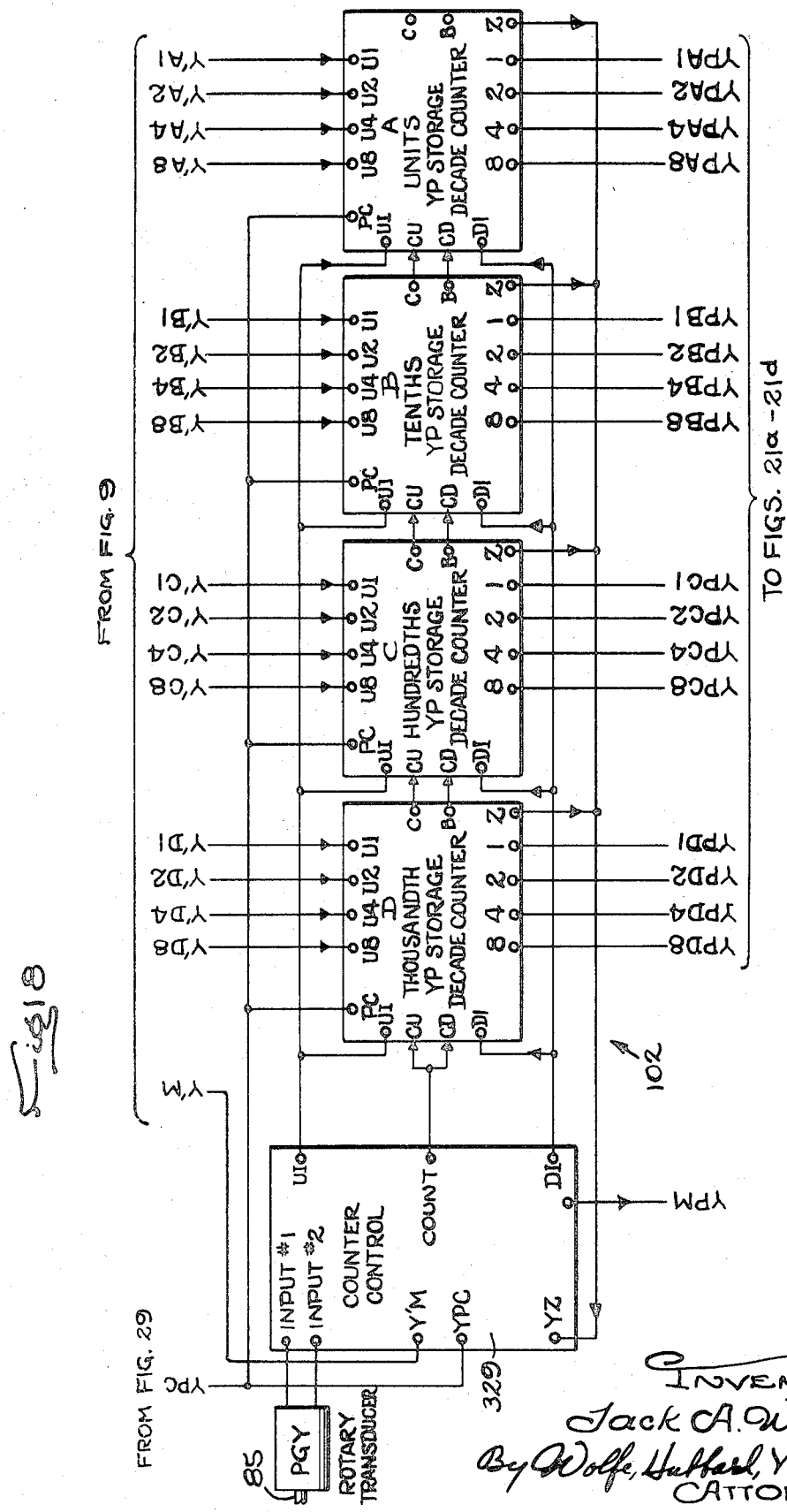
Figure 22:
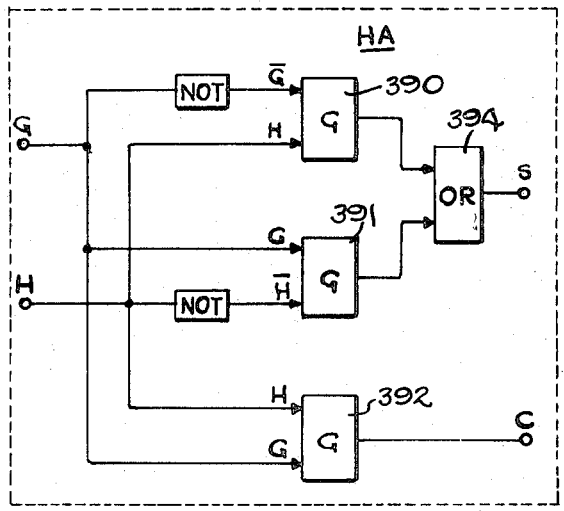
Figure 23:
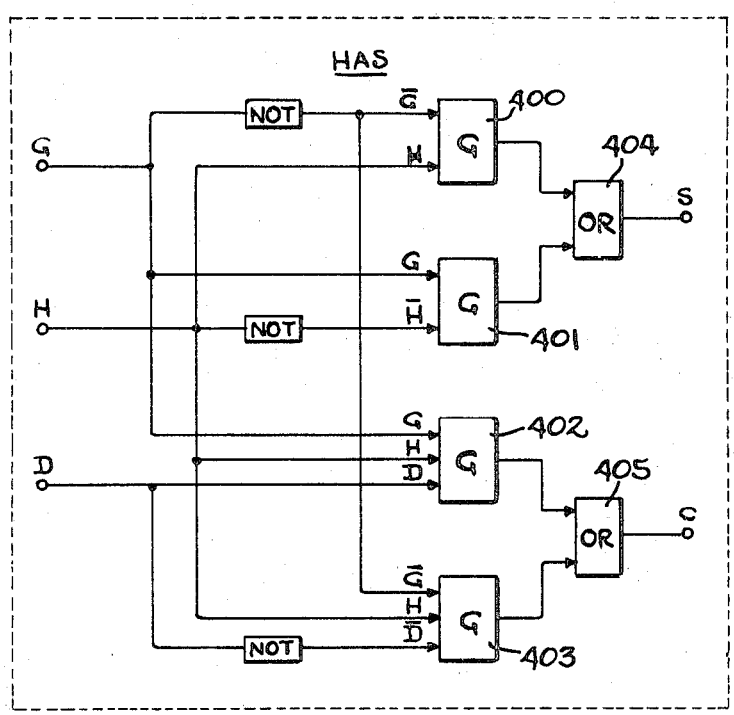
Figure 23A:
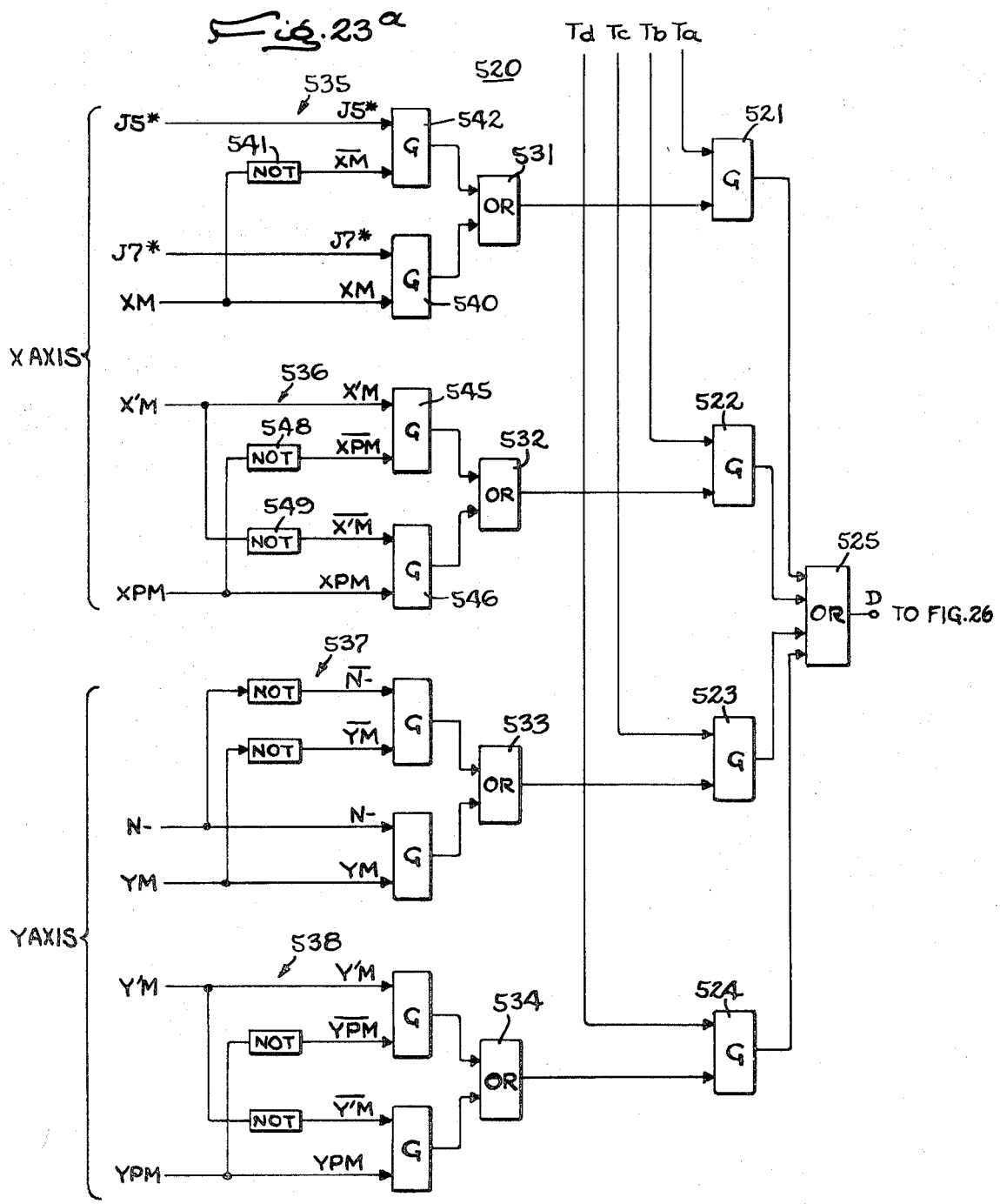
Figure 24:
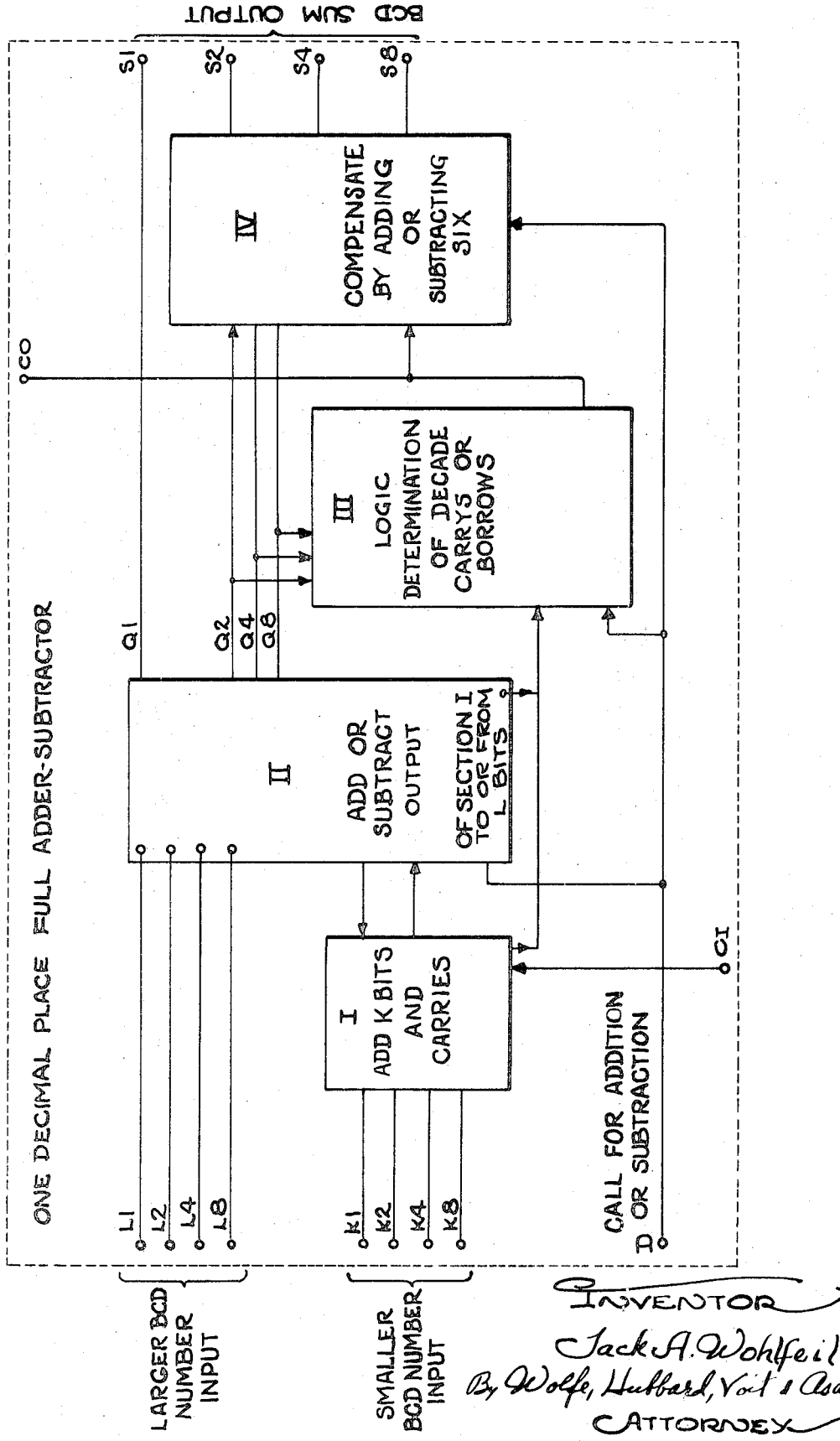
Figure 25:
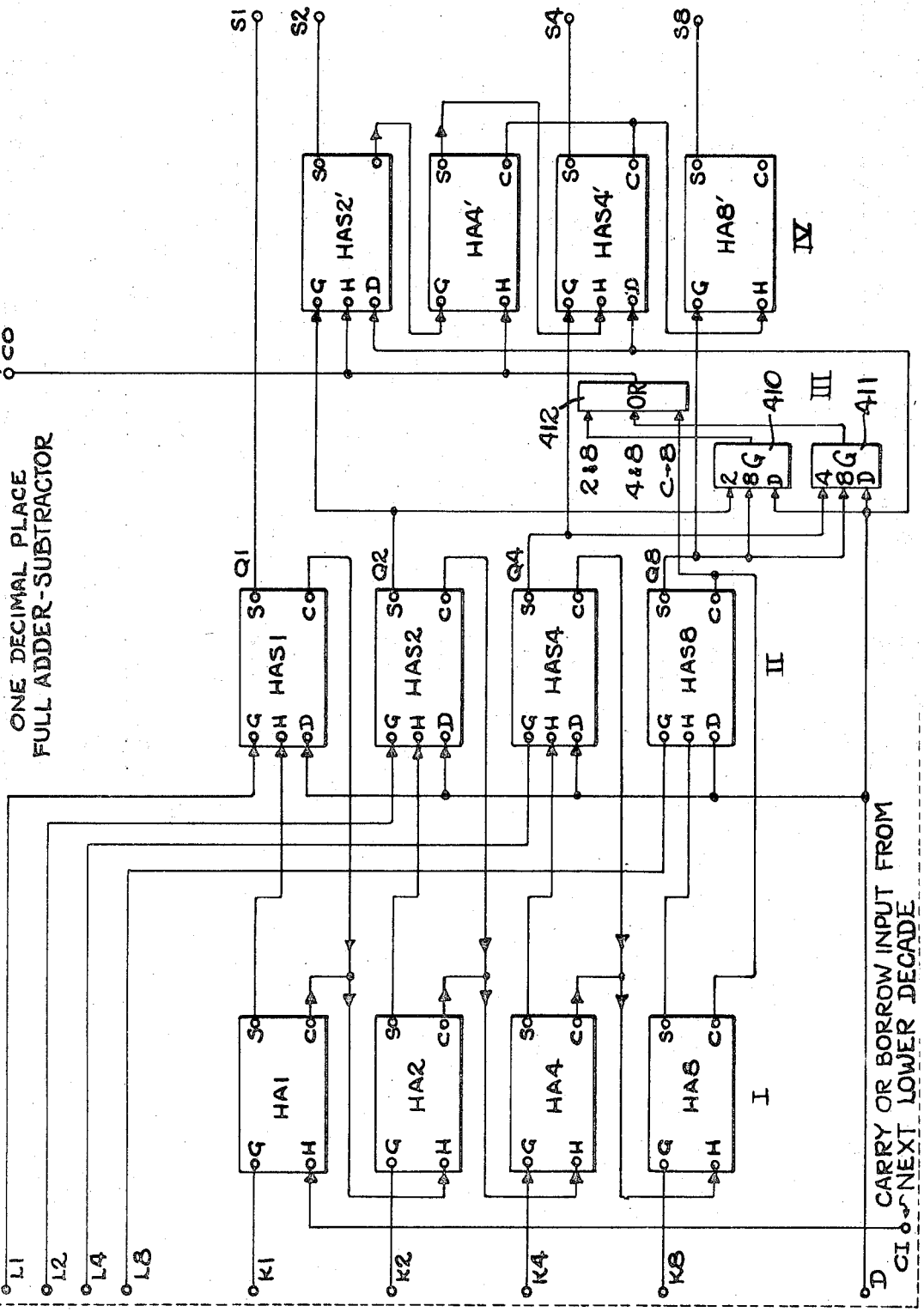
Figure 26:
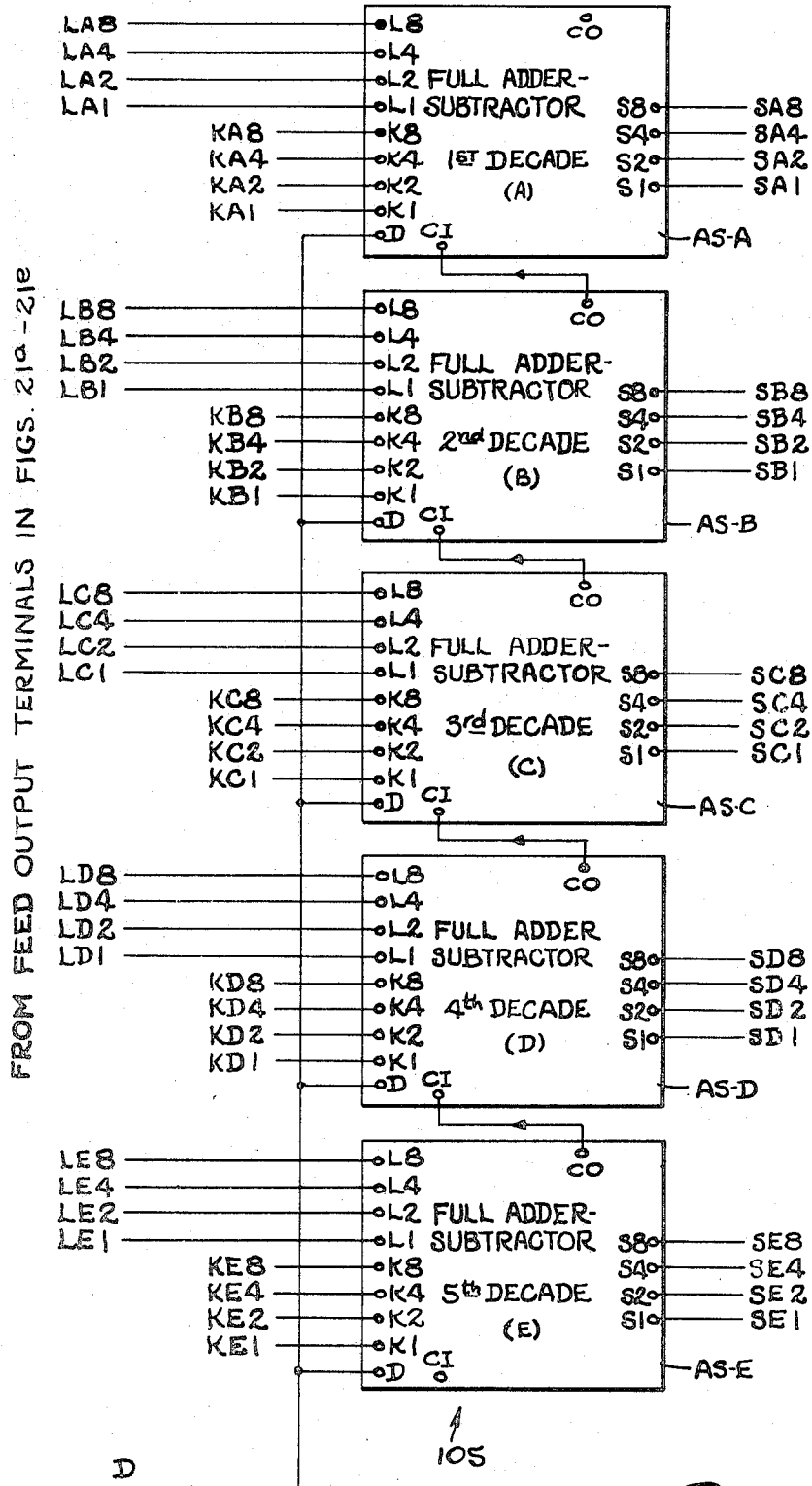
Figure 26A:
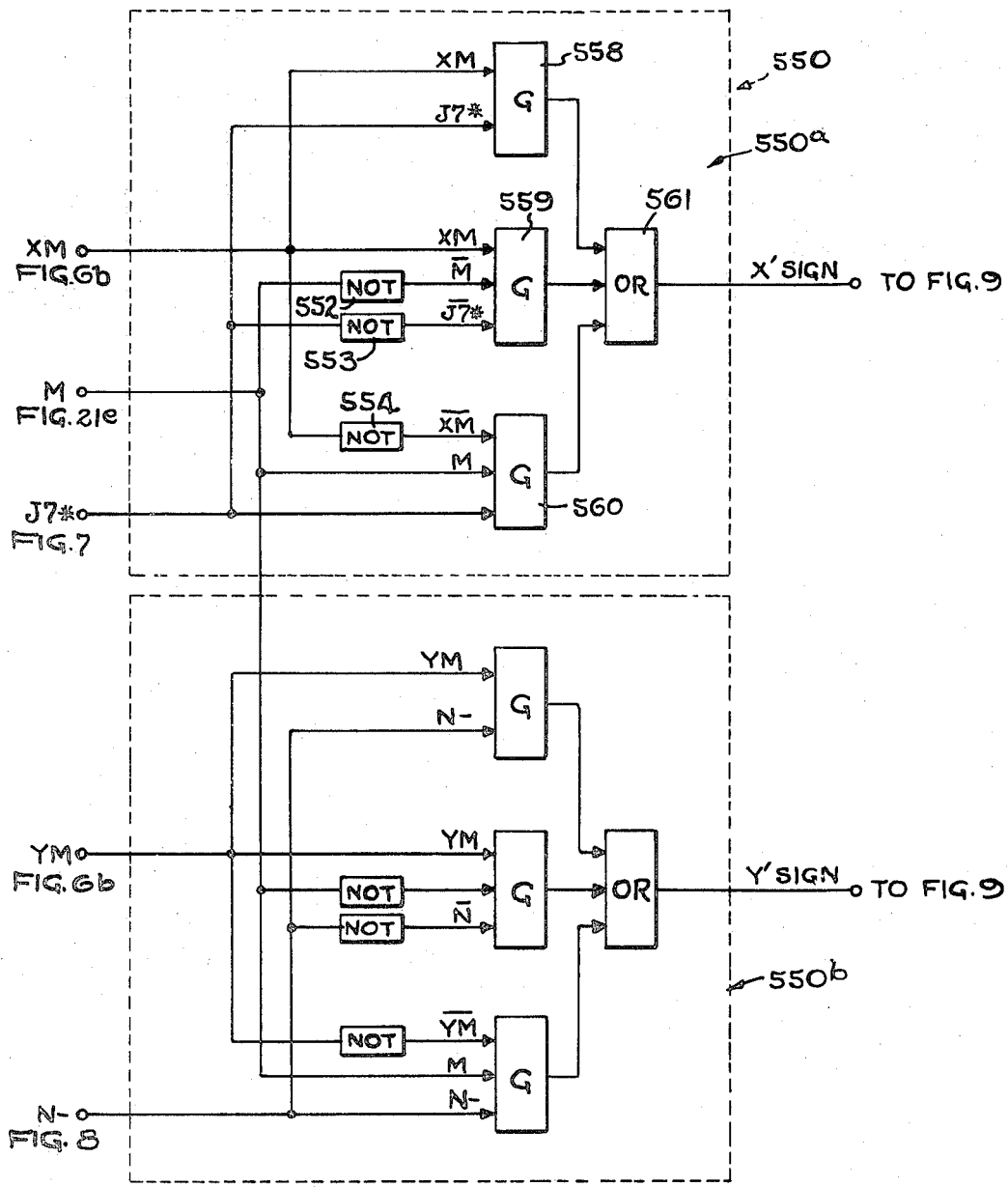
Figure 31:
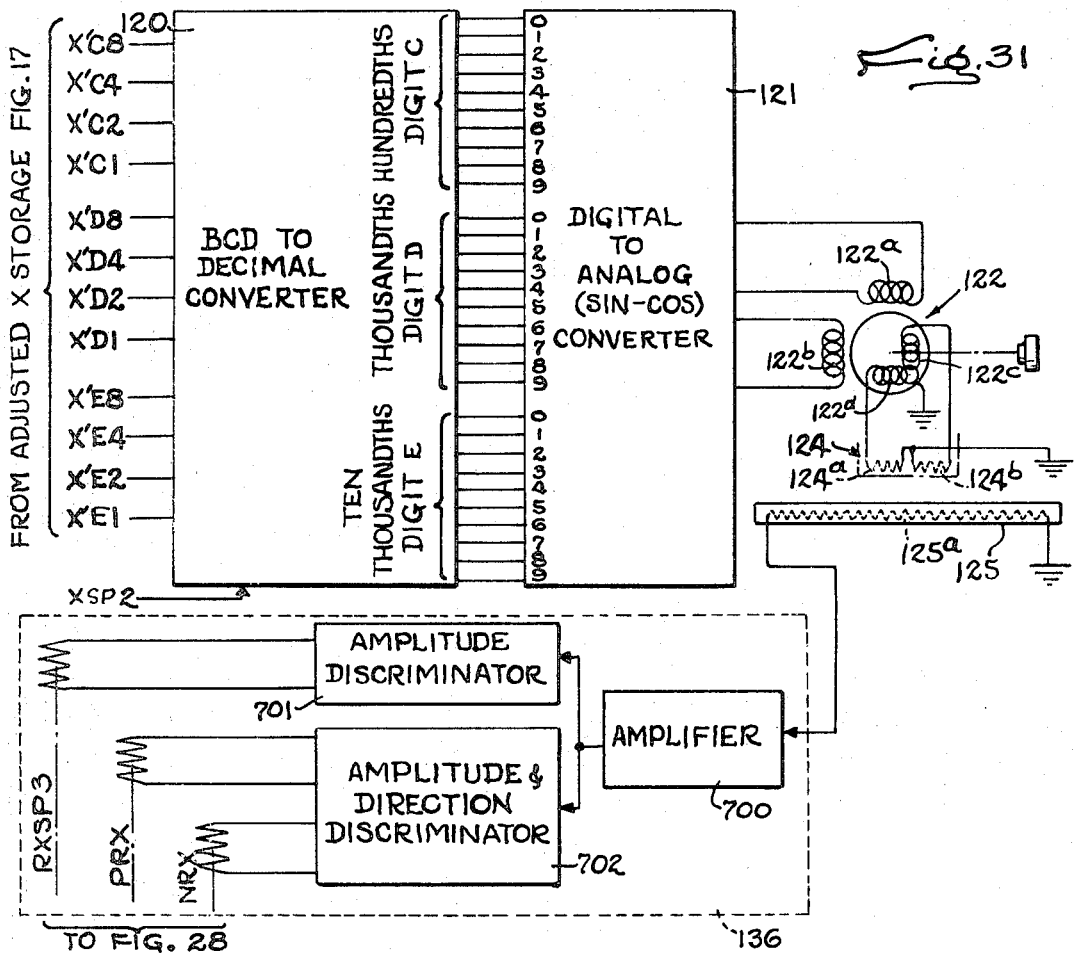
Figure 32:
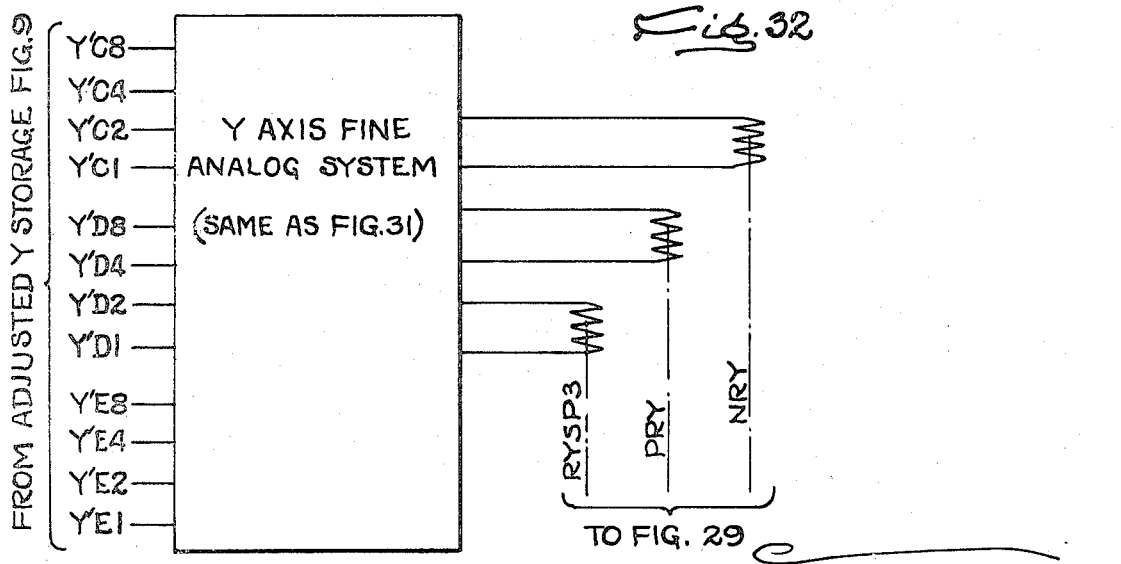

FIGS. 5a and 5b together form a block diagram generally illustrating a control system embodying the present invention;

FIG. 5c is an illustration of one block of numerical information as carried on a record device or punched tape;

FIGS. 6a and 6b, when joined along the indicated junction line, form a detailed block-and-line diagram illustrating apparatus for reading successive sets of digitally represented symbols and numbers from a record device such as a punched tape, and storing such information in electrical form as numbers representing desired positions of two elements movable along two respective axes, and numbers representing selector codes employed to render effective selected ones of a plurality of adjuster devices;

FIG. 6c is a more detailed showing of one of the devices illustrated in FIG. 6b and employed to store one decimal digit in binary code;

FIG. 7 is a block and line diagram illustrating apparatus for decoding stored selector codes;

FIG. 8 is a schematic circuit diagram showing four adjuster devices capable of representing three-digit correction distances, these being typical of a larger plurality of such selector devices employed in the present system;

FIG. 9 is a block diagram illustrating both a timing signal generator and a storage means for holding and representing numbers indicative of adjusted commands or adjusted desired positions;

FIG. 9a shows waveforms produced by the timing signal generator;

FIG. 10 is a block and line diagram of a typical decade scaling stage which scales input signals according to a binary coded decimal system;

FIG. 11 is a series of waveforms which illustrate the operation of the decade scaling stage of FIG. 10;

FIG. 12 is a table which further illustrates the successive states and scaling operation of the decade stage shown in FIG. 10;

FIGS. 13, 14, and 15 are similar to FIGS. 10, 11, and 12, respectively, except that the former pertain to a decade stage for scaling backwards or reversely in binary coded decimal notation in response to input pulses supplied thereto;

FIG. 16 is an illustration of one decade stage of a binary coded decimal counter which will count either up or down depending upon control signals supplied thereto, and which also may be preset or driven to any desired state or count;

FIG. 16a is a schematic diagram for one pulse gate, several of the latter being used in the counter of FIG. 16;

FIG. 17 is a block diagram illustrating a multidecade reversible binary coded decimal counter employed in the present system to dynamically store and numerically represent the actual position of an element movable along a first or X-axis;

FIG. 18 is similar to FIG. 17, but illustrates a reversible binary coded decade counter for dynamically storing and representing numerically the position of a second movable element along a second or Y-axis;

FIG. 19 is a block and line diagram illustrating in greater detail the counter controls which are shown in block form by FIGS. 17 and 18;

FIG. 19a is a graphic representation of the timing of certain signals which occur in the apparatus of FIG. 19 when the movable element is moving in a positive or negative direction;

FIG. 20 is a detailed block and the line diagram of apparatus for transferring one binary bit of two digitally represented numbers from storage to the input terminals of an algebraic combining device;

FIGS. 21a through 21e are block and line diagrams illustrating means for transferring successive pairs of multidigit decimal numbers represented in binary coded decimal notation from storage to two respective sets of input terminals of an algebraic combining device;

FIG. 22 is a block diagram of a one bit binary digital half adder employed in the algebraic combining device of the present system;

FIG. 23 is a block diagram illustrating a one bit binary half adder-subtracter employed in the algebraic combining device;

FIG. 23a is a block diagram of an add-subtract control for determining whether the algebraic combining device of the present invention should add the two numerical inputs supplied thereto together, or whether it should subtract the smaller from the larger;

FIG. 24 is a generalized block and line diagram illustrating one decimal place portion of an algebraic combining device;

FIG. 25 is similar to FIG. 24 but illustrates in greater detail one decimal digit place of a full adder-subtracter;

FIG. 26 is a block and line diagram for a full adder-subtracter capable of adding or subtracting two numerical inputs supplied thereto and representative of four place decimal numbers according to binary coded decimal notation;

FIG. 26a is an illustration of apparatus for determining the sign of an adjusted command position computed and represented in digital numerical form;

FIGS. 27a and 27b when joined along the indicated junction line illustrate the switch point determination and switch point storage portions of the present system;

FIG. 28 illustrates a slowdown network and a direction and stopping controller for the X-axis in the present system;

FIG. 29 is similar to FIG. 28 but shows in more general form the slowdown network and the direction and stopping controller for the Y-axis;

FIG. 30 illustrates a motion direction control for determining the direction in which movable elements must be driven in order to move toward the stored and represented desired position;

FIG. 31 shows apparatus for producing a fine analogue signal in accordance with the invention, and the means which respond to the position error produced in response to such fine analogue signal; and FIG. 32 is similar to FIG. 31, but shows the fine analogue system for the Y-axis.

While the invention has been shown and will be described in some detail with reference to a particular embodiment thereof, there is no intention that it thus be limited to such detail. On the contrary, it is intended here to cover all modifications, alternatives and equivalents falling within the spirit and scope of the invention.

TABLE OF CONTENTS OF THE SPECIFICATION

| | Page |
|---|---|
| The Exemplary Machine Tool | 9 |
|     Table I | 13 |
| The Control System In General | 15 |
| Punched Tape Format | 20 |
| Date Read-in and Storage | 22 |
|     Table II | 24 |
|     Table III | 28 |
| Decoding of Selection Codes and Storage of Correction Distances | 36 |
| Digital Representation and Storage of Adjusted Command Numbers | 43 |
| Digital Representation and Dynamic Storage of Actual Position Numbers | 46 |
|     A. Coded Binary Decade Counting Stages | 46 |
| Storage and Numerical Representation of Actual Positions Along the X and Y Axes | 56 |
| The Counter Controls | 59 |
|     A. Pulse Generation and Motion Direction Signaling | 59 |
|     B. XP Number Sign Representation | 62 |
|     C. Counter Up-Down Control | 64 |
|     Table IV | 67 |
| Algebraic Combination of Multi-Digit Numbers | 71 |
|     A. One Bit Half Adder | 71 |
|     Table V | 72 |
|     B. One Bit Half Adder-Subtracter | 72 |
|     Table VI | 73 |
|     C. One Decimal Place Adder-Subtracter | 74 |
|     D. The Complete Five Place (Twenty Bit) Full Adder-Subtracter | 88 |
| Timing Signal Source | 89 |
| Multiplex Gates | 91 |
| Comparing Apparatus | 96 |
|     Table VII | 98 |
| The Feeder Apparatus | 100 |

TABLE OF CONTENTS OF THE SPECIFICATION— Continued

| | Page |
|---|---|
| Add-Subtract Control | 103 |
| Table VIII | 104 |
| Table IX | 105 |
| Signaling the Sign of X Axis Correction Distances | 107 |
| Combining X and N Numbers To Compute and Store X' Numbers | 112 |
| Adjusted Command Sign Determination | 113 |
| Table X | 116 |
| Combining X' and XP Numbers To Compute X Axis Error | 118 |
| Combining Y and N Numbers To Compute Y' Numbers | 119 |
| Combining Y' and YP Numbers To Compute the Y Axis Error | 120 |
| Signaling the Reduction of Position Errors to Predetermined Values (Switch Points) | 121 |
| Digital Slowdown Control | 128 |
| Motion Direction Control | 130 |
| Table XI | 132 |
| Direction and Stopping Controllers | 134 |
| Fine Analogue System | 138 |
| Starting the Next Positioning Cycle | 147 |
| Presetting the Actual Position Storage Counters | 148 |
| Unidirectional Approach | 150 |
| Resume of Operation | 155 |

THE EXEMPLARY MACHINE TOOL

Figure 1:
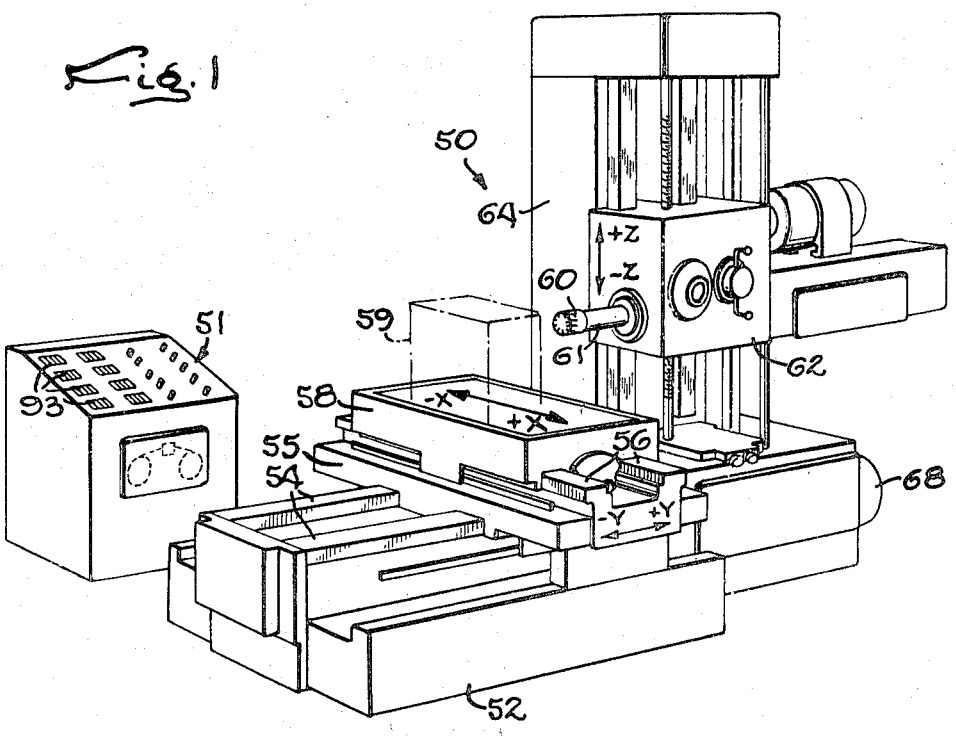
FIG. 1 is a simplified perspective view of a machine tool having movable elements typical of those which may be automatically positioned at successive desired locations along respective axes by a numerical control system embodying the present invention, the components of the control system being contained principally within an associated cabinet or console.

To facilitate a clear understanding of the invention, a typical machine tool 50 is shown in FIG. 1 coupled by connecting cables (not visible) to a console or cabinet 51 containing most of the components of the numerical control system which will hereinafter be described as an exemplary embodiment of the invention.

The illustrated machine tool is a horizontal boring, milling and drilling machine comprising a base 52 having machined ways 54 slidably mounting a first movable element or saddle 55 which is translatable back and forth to different positions along what will here be called a Y-axis. Movement of the saddle to the right or to the left as viewed in FIG. 1 will be considered as motion in a positive or a negative direction along the Y-axis.

The saddle 55 is also formed with ways 56 slidably mounting a second movable element or work table 58 which is translatable back and forth to different positions along what will here be termed an X-axis. Motion of the table 58 to the right or left (as viewed from the left end of the machine tool) will here be designated as positive or negative motion along the X-axis.

The table 58 is adapted to receive and mount a work piece 59 to be machined (drilled, bored or milled) by a cutter 60 carried on a rotationally driven spindle 61 projecting from a headstock 62 which may be bodily moved along a supporting upright column 64 to different vertical positions, i.e., along what is here termed as a Z-axis. The spindle 61 and the cutter 60 carried thereby may not only be rotationally driven at any one of a plurality of speeds, but it may also be axially advanced out of or retracted into the headstock 62 with different feed rates, as is well known.

Positioning movements along the three orthogonal axes X, Y and Z may be controlled according to a predetermined program by the numerical control system of the present invention; and similarly the axial movement and positioning of the spindle 61 may likewise be programmed and controlled. However, for the sake of brevity and avoiding unnecessary duplications in the drawings and description which follow, the present numerical control system will be described only with reference to controlling the movement and positioning of the table 58 and the saddle 55 along the X- and Y-axes, respectively. It will be apparent to those skilled in the art that the invention hereinafter described with reference to two axes of movement may be extended to the control of positioning along any greater desired number of axes.

The machine tool 50 and its functional operations will be familiar to those skilled in the art and need not be described in any great detail. It will suffice simply to observe that after the work piece 59 has been mounted on the table 58 and brought to a desired position along the orthogonal X,- Y- and Z-axes, the cutter 60 may be advanced by feeding the spindle axially outward to drill or bore a hole in a desired, numerically defined position on the work piece. Alternatively, with the rotating spindle and cutter axially stationary, the work piece may be moved inwardly toward it (positive direction of Y-axis motion) to a desired stopping point, thus drilling or boring a hole to a desired depth and at desired coordinates along the X- and Z-axes. Still further, milling of horizontal inside or outside surfaces of the work piece may be accomplished by mounting a milling cutter in the spindle, relatively positioning the cutter and work piece along the Y- and Z-axes, and thereafter moving the table and the work piece along the X-axis to a desired stopping point. Vertical surfaces may also be milled on the work piece by moving the cutter along the Z-axis after the table and saddle have been brought to desired positions along the X- and Y-axes.

Figure 2:
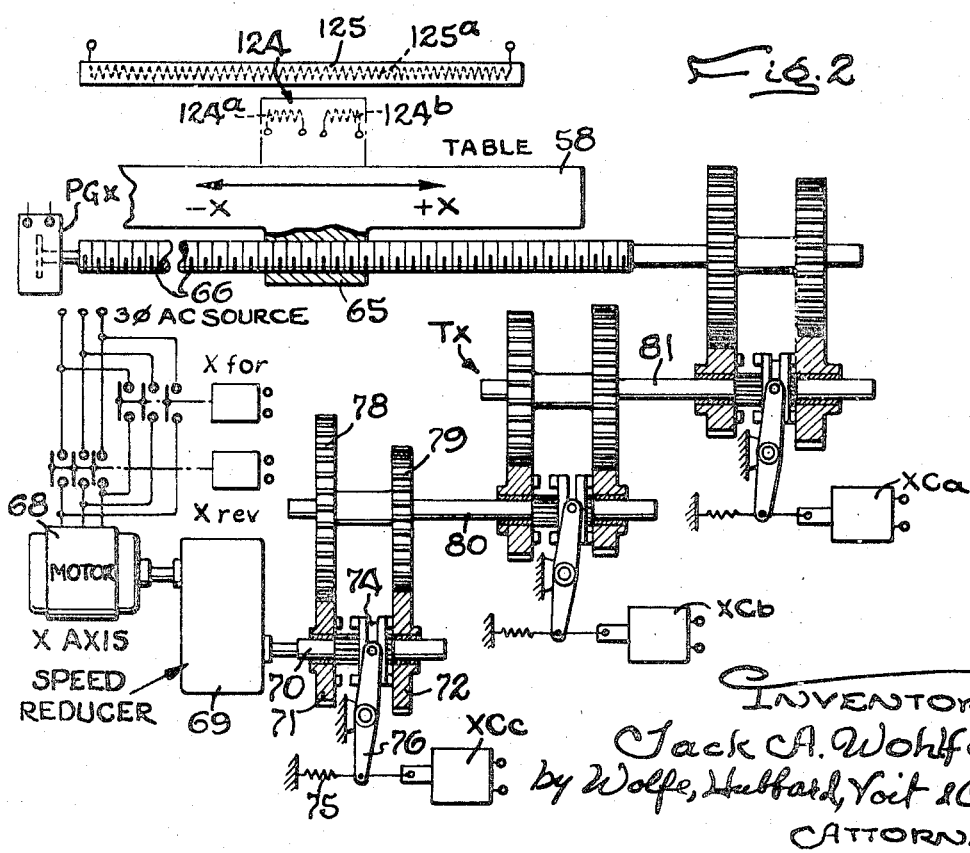
FIG. 2 is a diagrammatic and simplified illustration of a multispeed transmission and reversible drive for moving an element, here shown as the machine tool table, to different positions along a first or X-axis.
Figure 3:
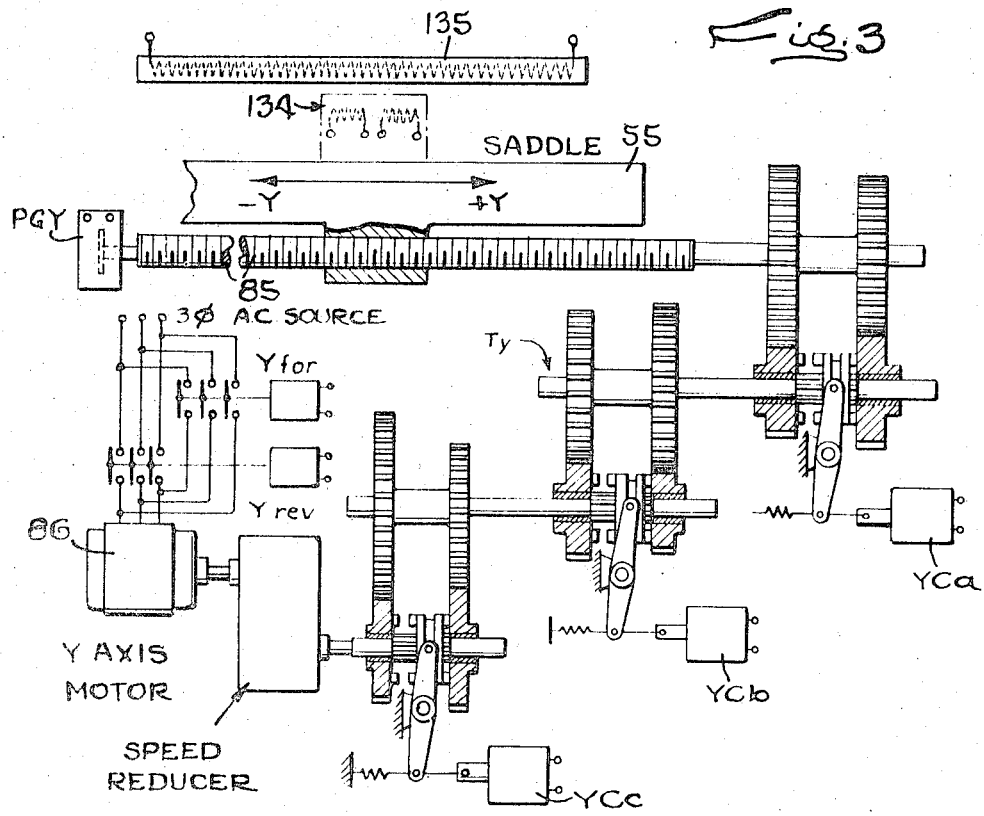
FIG. 3 is similar to FIG. 2, but shows a multispeed transmission and reversible drive for moving a second element, here shown as the machine tool saddle, to different positions along a second or Y-axis.

To make clear how such positioning motions are effected by the present numerical control system, the drive transmissions for translating the table 58 and the saddle 55 along the X- and Y-axes have been diagrammatically illustrated in simplified form by FIGS. 2 and 3. As shown in FIG. 2, the table 58 is rigidly fixed to or integral with a nut 65 cooperatively engaged with a lead screw 66 adapted to be rotated in either of two directions so as to move the table to different positions along the ways of the saddle, i.e., to different positions along the X-axis. In this instance, motive power for rotating the lead screw 66 is taken from a reversible, constant speed electric motor 68 adapted to be energized from a three-phase AC voltage source by either a forward contactor actuated in response to energization of a solenoid X$fwd$ or a reverse contactor actuated in response to energization of a solenoid X$rev$. The shaft of the motor 66 acts through a speed reducer 69 to drive the input shaft 70 of a multispeed transmission T$x$ having a plurality (here three) of clutches which may be actuated in different patterns to produce any one of eight speed ratios.

In more detail, the input shaft 70 journals two differently sized gears 71, 72 disposed on either side of a clutch yoke 74 splined to and axially movable along that shaft. When a first clutch coil XC$c$ is deenergized, biasing means such as a spring 75 acting on a lever 76 urge the yoke 74 to the right and into clutching, driving engagement with the gear 72. When the clutch solenoid XC$c$ is energized, however, it swings the pivoted lever 76 counterclockwise against the bias of the tension spring 76, thereby breaking the driving engagement between the yoke 74 and the clutch 72, but establishing a driving or clutched engagement between the yoke and the gear 71. The gears 71 and 72 are constantly meshed with differently sized gears 78, 79 integral with or fixed to a second shaft 80. It will thus be apparent that the shaft 80 may be selectively driven at either of two speeds from the constant speed shaft 70 through the gear 71 or the gear 72 depending upon whether the controlling clutch coil XC$c$ is deenergized or energized.

The shaft 80 is selectively coupled through a similar clutch and gear assembly to a third shaft 81, and the latter will thus be driven selectively at either of two speeds, relative to the shaft 81, depending upon whether an associated clutch coil XC$b$ is deenergized or energized. This means that the shaft 81 can be driven from the constant speed shaft 70 at any one of four possible speeds.

Finally, a third clutch and gear assembly similar to the one previously described is interposed between the shaft 81 and the lead screw 66. The lead screw will thus be selectively rotated at either of two speeds relative to the speed of the shaft 81 depending upon whether an associated clutch coil or solenoid XC$a$ is energized or deenergized. This means that the lead screw 66 may be driven from the shaft 70 and the motor 68 at any one of eight possible speeds depending upon the pattern with which the three clutch coils XC$a$, XC$b$ and XC$c$ are energized or deenergized. Although in conventional practice an elongated splined shaft and a splined coupling slidable therealong are employed to transmit rotation to the lead screw 66 journaled on the saddle 55 as the latter moves along the Y-axis, such a splined shaft and coupling have for the sake of simplicity been omitted from the simplified and diagrammatic illustration of FIG. 2.

In summary, and for convenient reference, the operation of the multispeed transmission Tx shown in FIG. 2 is reflected by the following table illustrating the eight different linear velocities which are imparted to the table 58 by rotation of the lead screw when the controlling clutch coils are energized in different combinations:

TABLE 1

| Speed No.: | Coil XCa | Coil XCb | Coil XCc | Table velocity, i.p.m. |
|---|---|---|---|---|
| 1 | 1 | 1 | 1 | 128 |
| 2 | 0 | 1 | 1 | 64 |
| 3 | 1 | 0 | 0 | 32 |
| 4 | 0 | 0 | 1 | 16 |
| 5 | 1 | 1 | 0 | 8 |
| 6 | 0 | 1 | 0 | 4 |
| 7 | 1 | 0 | 0 | 2 |
| 8 | 0 | 0 | 0 | 1 |

NOTE:
1=Coil Energized.
0=Coil De-Energized.

It will be understood, of course, that the linear table velocities listed by way of example in the foregoing table can be produced with table motion in either a positive or negative direction along the X-axis simply by energizing the X$fwd$ or the X$rev$ contactor solenoids; and when neither of the latter solenoids are energized, then drive of the lead screw 66 and the table 58 will terminate so that the latter comes to a stop. If desired, a brake (not shown) may be associated with the lead screw and actuated when neither of the solenoids X$fwd$ or X$rev$ is energized.

Referring to FIG. 3, a reversible, multispeed transmission Ty for translating the saddle 55 in either direction and at any one of a plurality of speeds is there shown as substantially identical to the X-axis driving transmission of FIG. 2. Therefore, it will be unnecessary to describe FIG. 3 in detail, and it need only be noted that the saddle 55 is driven along the Y-axis in response to rotation of a lead screw 85 driven at any one of eight speeds according to the energized combination of three clutch control coils YCa, YCb, and YCc. A Y-axis motor 86 which supplies the power for such positioning movements of the saddle is energized to run in a forward or reverse direction, and thus to translate the saddle in a positive or negative sense along the Y-axis, in response to energization of forward and reverse contactor solenoids Y$fwd$ and Y$rev$. Although in actual practice the saddle transmission Ty might differ in detail from the table transmission Tx, it may be assumed for the present purposes that Table I, supra, reflects also the several different linear velocities (in inches per minute) which may be imparted to the saddle in response to energization of the clutch coils YCa, YCb and YCc in different combinations or patterns.

THE CONTROL SYSTEM IN GENERAL

Although the numerical control system embodying the features of the present invention will be described in some detail hereinafter, it will be helpful at the outset first to generally describe the system with reference to the block diagram shown in FIGS. 5a and 5b. The various portions of the system represented by blocks in those FIGS. will then be taken up in more detail as the description proceeds.

By way of a general introduction, the present control system accepts successive sets of numerical information designating desired or commanded successive positions of the table 58 and saddle 55 along the X- and Y-axes respectively, according to a predetermined program. The successive sets of information carried by a record device, here shown as punched tape 90 (FIG. 5c) are sensed or read, one set at a time, by means such as a tape reader 91 (FIG. 5a). Each set of information, corresponding to one "block" on the tape 90, is transferred into storage with a programmed or command position for each of the X- and Y-axes being digitally represented as numerical values held by X and Y command storage devices 92 and 94, respectively. The numerical representations held in the latter two devices will here be termed X command numbers and Y command numbers. The signs of the X and Y command numbers are also stored in the devices 92 and 94.

Some of the sets of information read from the punched tape may include selector codes, each such code designating that a particular one of a plurality of adjuster devices be rendered effective. Such adjuster devices 93 are mounted on the exposed panel of the console 51 (FIG. 1) and are represented collectively at 95 in FIG. 5a. When a given one of the selector devices is effective, the operator of the machine tool may adjust the same to represent any correction distance which he finds necessary to compensate for factors which could not be, or were not, contemplated and allowed for by the programmer who made up the original program data for the punched tape. Examples of such factors are (a) the cutter in use being worn so that it is smaller in diameter than the diameter assumed at the time of programming, (b) a drilling bit having been worn and shortened by sharpening so that it is shorter in length than was assumed at the time of programming, (c) the tool or workpiece deflecting under load, so that the final relative position of the workpiece and cutter would, without compensation, be slightly different than that originally programmed (this factor varies from one machine tool to another), or (d) slight inaccuracies in the numerical data calculated by the programmer and recorded on the punched tape.

In the present system, the selector code (herein called a J code) which may be included with any one set of information within a given block of the punched tape and read from the latter, is stored in a J select storage device 96 (FIG. 5a). The information stored is converted into direct selection signals by a J-decoder 98 which renders a corresponding one of the adjuster devices 93 effective. The operator having "dialed in" the necessary distance correction on the selected adjuster 93, the correction distance is then digitally represented in numerical form. In the present system, this numerical correction distance (hereinafter called an N number) is algebraically added to the stored numerical desired position (for either or both of the X- or Y-axes) to produce a numerical representation of adjusted command positions X' and Y'. Such digital representations are stored in numerical form by an X' adjusted command storage 99 and Y' adjusted command storage 100 (FIG. 5a).

Provision is made to digitally represent and store numerical values which, as a practical matter, at all times represent the actual positions of the two movable elements along their respective X- and Y-axes For this purpose, pulse generators PGx and PGy (FIGS. 2, 3 and 5b) are driven from the respective lead screws 66 and 85 to produce one pulse for each predetermined increment (here, .001 inch) through which the table 58 or saddle 55 moves. These generated pulses are supplied to reversible counters which constitute an X position storage device 101 and a Y position storage device 102, these devices being caused to count negatively or positively as the elements 58 and 55 move in positive or negative directions, so that the position storage devices dynamically store and numerically represent the actual positions of the table 58 and saddle 55. The numbers stored in the devices 101 and 102 will here be designated as XP and YP, representing actual positions along the X- and Y-axes.

In order to produce and control movement of the table 58 and the saddle 55 until their actual positions XP, YP agree with the stored representation of adjusted command positions X', Y', a single adder-subtracter 105 (FIG. 5b) is employed to rapidly and cyclically algebraically subtract first the XP number from the X' number, and then the YP number from the Y' number, producing rapidly and cyclically a numerical representation of the error which exists between the X-axis desired and actual positions and the error which exists between the Y-axis desired and actual positions. The adder-subtracter 105 is assisted in this function by multiplex gates 106 operated in sequence from a timing signal generator 107, a comparing device 108, and a feeder device 109 so that successive parts of numbers can be rapidly and cyclically added or subtracted.

So long as the X- or Y-axis error representations exceed a predetermined value, the X- and Y-axes motors 68 and 86 will be energized. As the error representations reach progressively smaller values, however, the velocity of the elements in traveling toward the desired positions is progressively reduced by sensing slowdown or "switch points," and changing the drive ratio of the X- and Y-axis multiratio transmissions Tx and Ty. This function is performed by the switch point determination system 110, switch point storage devices 111 and 112 and by X- and Y-axis slowdown networks 114 and 115 which in turn control the multispeed transmission clutches.

To bring the movable elements precisely to the numerically represented adjusted positions X' and Y', a fine analogue system is employed. Such analogue system is effective only within successive fine spans of distance over the entire range of travel along the two axes, and it is disabled until the digitally represented error indicates that the movable elements are within a particular fine span of the analogue system which enables the latter to bring the movable elements to a stop precisely at the desired positions. The adjusted desired positions are represented to a high degree of accuracy by converting the last few digits of the stored adjusted command numbers X' and Y' into an analogue signal for excitation of position sensing elements such as Inductosyn sliders and scales. The name "Inductosyn" is a registered trademark of the Industosyn Corporation, and designates apparatus of a type familiar to those skilled in the art. As shown in FIGS. 5a and 5b, information from the X' adjusted command storage 99 is passed a BCD-to-decimal converter 120 whose output is transferred to a digital-to-analogue converter 121, the latter in turn transmitting through a manually adjustable differential resolver 122 excitation signals for the slider 124 of an Inductosyn device having a scale 125. The slider 124 is carried by and movable with the table 58 relative to the stationary scale 125.

The apparatus for fine analogue control of the Y-axis positioning is substantially identical, including a BCD-to-decimal converter 130, a digital-to-analogue converter 131, a differential resolver 132, and the slider 134 and scale 135 of an Inductosyn position sensing device. This fine analogue system will be described in more detail below, but it will suffice here to note only that signals are supplied from the X- and Y-axis Inductosyn scales 125 and 135 to X- and fine analogue error detectors 136 and 137, the latter in turn controlling the slowdown networks 114, 115 as well as the X- and Y-axes direction and stopping controllers 138 and 139.

When a new set of numerical information is read from the punched tape and placed in storage, the adder-subtracter first algebraically combines the X and Y command numbers with the correction number N stored in a selected adjuster 93, and the resulting adjusted position numbers X' and Y' are transferred into the adjusted storages 99 and 100. The adder-subtracter 105 then repeatedly subtracts the actual position numbers XP and YP held in the position storages 101 and 102 from the adjusted numbers X' and Y', respectively, the resulting numerical error representations being compared with switch point values held in storage at 111 and 112. As the digitally computed and represented errors are reduced to the value of preselected switch points, signals are applied to the slowdown networks 114, 115 which in turn change the energized patterns of clutch coils in the transmissions Tx and Ty, thus reducing the velocity of the table 58 and the saddle 55. When the error is reduced sufficiently, the fine analogue systems are rendered effective. As the analogue error signals are further reduced, the slowdown networks cause further reductions in velocity, and when the analogue signal is reduced substantially to zero, the stopping controllers 138, 139 deenergize the motors 68 and 86 to terminate movement with the table 58 and saddle 55 precisely in the desired positions.

At the conclusion of one complete positioning operation (and the performance of any necessary machine tool functions while the elements are in that position) a "position complete" signal appears on terminals XPC and YPC in the X and Y stopping controllers. This signal is fed back to preset controls 140 and 141 which cause the X position storage 101 and the Y-position storage 102 to be reset so that they hold and store the number then contained in the X' adjusted command storage 99 and the Y' adjusted command storage 100, respectively. By this arrangement, cumulative errors due to loss or spurious gain of feedback pulses is completely eliminated. The same signals XPC and YPC pass to a start control 144 associated with the tape reader 91, causing the latter to read the next block or portion of the punched tape, and thus to transfer into the system the next set of numerical data for the program.

With the foregoing preliminary and very general description of the present system in mind the organization and operation of the apparatus which is generally illustrated by the block diagram of FIGS. 5a and 5b will be readily understood from the following, more detailed description.

PUNCHED TAPE FORMAT

Although the format of the record device or punched tape 90 may be any of a wide variety, it will be helpful to have in mind the specific one here employed. As shown in FIG. 5c the punched tape 90 contains eight longitudinal columns designated CH1 through CH8, plus longitudinally spaced sprocket holes SP which are used to feed the tape lengthwise through a tape reader. Each transverse row of the tape, aligned with one sprocket hole, may contain holes in different combinations of the eight columns to represent different decimal numbers 0 through 9 or different alphabetical characters. The code here employed is the familiar "Flex-o-writer" code, with numerical characters being represented in binary coded decimal notation by the presence or absence of holes in the first four columns CH1 through CH4.

The tape contains successive sets of numerical information thereon, each set constituting what is termed as one "block" of the tape. A typical block of information is shown in FIG. 5c, with the first numerical word X+ 1.2345 designating that the table 58 is commanded to move a positive position (shown at Pd in FIG. 4) 1.2345 inches from the zero point origin of the X-axis. The next word represented by the succeeding seven rows on the tape 90 is Y− 2.3890, indicating that the saddle 55 is commanded to move to a negative position 2.3890 inches from the origin relative to the Y-axis (see point Pd in FIG. 4). Finally, the set of data or block shown by example in FIG. 5c contains three rows of holes representing a selection code J21, thus designating that the number 21 adjuster device 93 is to be effective for program compensation during the execution of the positioning operation called for by that particular block. The last row of holes within each block on the tape represents the symbol EB or "end of block" and this is used to terminate reading of the tape after one complete block of information has been read and transferred into storage.

Figure 4:
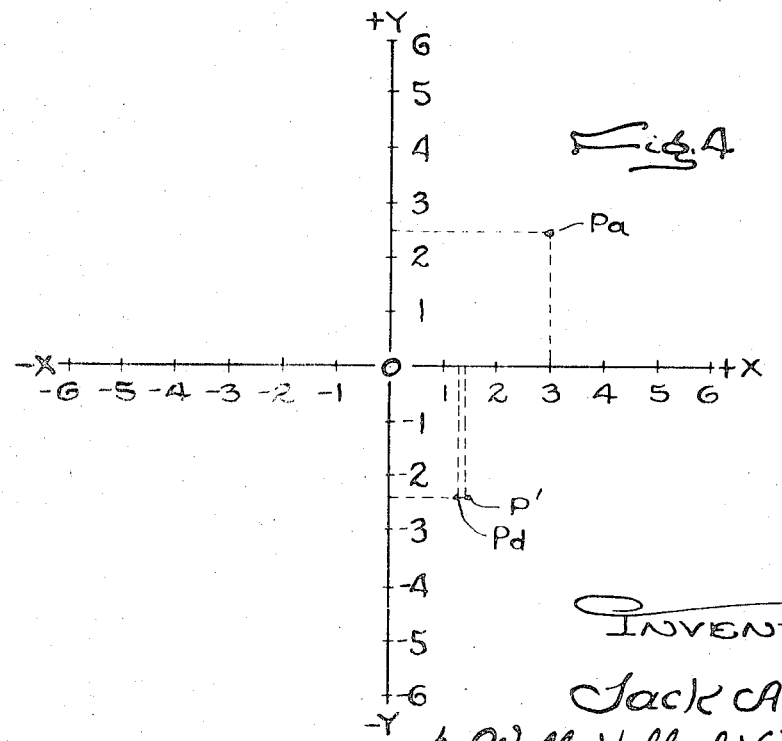
FIG. 4 is a plot of X- and Y-axes illustrating the four-quadrant range of positions to which the work piece may be moved relative to the cutter in the present system.

Referring to FIG. 4, the desired positions of the table 58 and saddle 55 are represented by point Pd located +1.2345 inches along the X-axis scale, and −2.3890 inches along the Y-axis scale. If it is assumed that the table 58 is at an actual position Pa of +3.0000 along the X-axis scale, and the saddle 55 is at an actual position of +2.5000 inches along the Y-axis scale, then the command data shown by example in FIG. 5c requires that the table be moved in a negative direction along the X-axis a distance of $3.000 - 1.2345 = 1.7655$ inches to reach the desired position Pd, and that the saddle be moved in a negative direction along the Y-axis a distance of 2.5000 − (−2.3890) equals 4.8890 inches. This positioning operation will occur in response to reading the exemplary set of numerical information from the tape 90 shown in FIG. 5c, and in a manner which will be made clear below.

DATA READ IN AND STORAGE

To read one block of information from the punched tape and store it in digital form, the apparatus shown in FIGS. 6a and 6b is employed. The tape reader 91 is there diagrammatically illustrated as including a continuously rotating tape reader motor TM selectively coupled by energizing the coil 160 of an electromagnetic clutch to drive an input shaft 161 of a tape reader head 162, the shaft rotating the sprocket (not shown) engaged with the tape sprocket holes to advance the successive transverse rows of holes on the tape beneath eight hole sensors, such as photoelectric device or feeler switches (not shown).

To initiate operation of the system, a push button switch ST is momentarily closed to supply a negative potential from a voltage source or battery 164 to the "set" terminal S of a bi-state device or flip-flop 165, so that the 1 output terminal of the latter supplies an enabling potential to gates 166 and 168. the gate 166 open, a recurring pulse source or clock 169 operating at a predetermined frequency begins transmitting pulses to a scale-of-ten ring counter 170, and the latter thus produces on its output terminals R0—R9 10 trains of time-separated pulses at one-tenth of the clock frequency. The first pulse from the output terminal R0 passes through the now open gate 168 to a set a flip-flop 171, the resulting potential on the 1 output terminal of the latter being transmitted through an amplifier 172 to energize the clutch coil 160. The tape 90 is thus advanced. A short time later, the output terminal R4 of the counter 170 supplies a pulse to the reset terminal R of the flip-flop 171, so that the latter resets and deenergizes the clutch coil 160. Assuming the frequency of the clock 169 to be 100 p.p.s. the tape reader clutch will thus be energized for a period of .04 seconds during each successive 0.10 second interval necessary for the counter 170 to complete one complete cycle of operation. With the clutch coil energized for .04 second periods within successive 0.10 second intervals, the tape will be advanced row by row through the reading head 162, the tape being stationary for intervals of .06 seconds while each tape row is aligned with the hole-sensing elements.

When the tape 90 is stationary, the output signals corresponding to the holes in the particular row being read appear on the output terminals CH1 through CH8. Such signals are passed to an address decoder 174 which becomes operative only when an enabling signal appears on a gate line 175. The gate line is energized by the output of an OR circuit 176 having inputs connected to the R6, R7 and R8 terminals of the counter 170. Thus, the decoder 174 functions to produce a signal on its EB, minus, X,Y,J, or No output terminals during a 0.03 second interval within successive ones of the 0.1 second cycles measured off by the counter 170 —assuming that the tape row then being sensed represents the character EB, minus, X,Y,J or any of the decimal numbers 0—9, respectively.

The output terminals CH1 through CH4 of the reader head 162 are connected to a multiple or four-part gate 178 which is opened only when an enabling signal is received on a line 179 connected to the No terminal of the decoder. The output lines from the gate 178 are "number buses" since by their potentials they will represent in binary coded decimal notation the values of any single digit decimal number 0 through 9 represented by one row of holes on the tape 90. For completeness, the well-known binary coded decimal notation is illustrated by the following table:

TABLE II

| | $2^0$ "1" Place | $2^1$ "2" Place | $2^2$ "4" Place | $2^3$ "8" Place |
|---|---|---|---|---|
| Decimal No. value: | | | | |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

NOTE:
0=No hole in tape, or no signal (0 volts) on conductor.
1=Hole in tape or signal (−12 volts) on conductor.

From the foregoing, it will be understood that columns 1, 2, 3 and 4 (channels 1 through 4) in certain rows on the punched tape 90 (FIG. 5c) carry binary indicia, that is, holes or no holes, which collectively represent any decimal value between 0 and 9. When such a decimal number is represented by holes in a given row of punched tape, an additional hole may appear in the fifth column for purposes of parity checking. But if holes appear in different combinations of columns beyond columns 1 through 4, then that particular row can represent various other alphabetical characters or symbols.

With the foregoing in mind, it will be understood that the number buses labeled 1, 2, 4, 8 shown in FIG. 6a as output lines from the gate 178 will have potentials thereon which represent any number 0 through 9 which is recorded in a particular row of holes on the tape which at that instant is being read. In the particular system here described, a number bus is considered to have a binary 1 signal thereon when that bus is at a −12 volt potential, and is considered to have a binary 0 represented thereon when it is at 0 volts.

This arbitrary convention is followed throughout the exemplary system here disclosed, and it may be helpful to indicate here the manner in which binary 1's and 0's are processed by the gates, flip-flops and OR circuits used in various components of a system. In particular, a flip-flop in the present system is "set" or "reset" in response to a binary 1 signal or −12 volt potential supplied to its set or reset terminal S or R, respectively. When a flip-flop is in the "set" or "reset" state, its 1 output terminal signals a binary 1 or a binary 0 by residing at −12 volts or 0 volts, respectively. The opposite output terminal of the flip-flop, represented by the symbol for "not one," i.e., $\overline{1}$, resides at complemental voltage levels. The various gates which will be referred to hereinafter will pass to their output terminals a −12 volt potential representing a binary 1 when all inputs to that gate receive a binary 1 or −12 volt input signal. And, the various OR circuits will create a binary 1 or −12 volt output signal when any one of their several inputs receive a binary 1 or −12 volt input signal.

In the present instance, there is a maximum of seven rows or seven places in each word which appears within a given block on the punched tape 90. For example, the X position command exemplified in FIG. 5c is X + 1.2345, i.e.; occupies seven rows or places. In order to differentiate between numbers which appear in the units, tenths, hundredths or lower order places of a multidigit decimal number within a given word, a scale-of-seven ring counter 181 has its input connected to the output terminal R9 of the first ring counter 170. Thus, the second counter 181 receives input signals at a frequency of 10 p.p.s. and it undergoes a complete counting cycle in response to each group of seven input signals. It requires seven-tenths of a second for the counter 181 to complete one full counting cycle, and during this period one complete "word" is read from the punched tape and placed in

75 storage, as will become apparent. During each cycle of the counter 181, the terminal T1 will receive an output signal during the first 0.1 second interval, and terminal T2 will receive an output signal during the second 0.1 second interval, and so on. It is during these successive intervals that the information represented by successive rows on the punched tape is read and transmitted into appropriate storage devices.

Before describing the sequence of reading a block of information from the tape 90 into storage, it will be helpful to consider in more detail the nature of the X, Y, and J command storage devices 92, 94 and 96 previously mentioned in connection with FIG. 5a. As shown in FIG. 6b, the sign and the values of five successively lower order digits of an X command number may be digitally represented by the states of a sign storage flip-flop $Xs$ and five decade storage devices XA, XB, XC, XD, and XE. Thus, in the present example here illustrated, a five-digit X command number $\pm A$. BCDE may be stored and represented by the X command storage 92.

Each of the decimal digit storage devices XA through XE may be substantially identical. As shown in FIG. 6c, the device XA includes four bistate elements or flip-flops, one for each of the 1, 2, 4 and 8 bits of a binary decimal code. All such flip-flops may be reset to the 0 state in response to a reset signal applied to a common reset line; and they may be selectively set to the 1 state by signals passed through four individual gates within a multiple gate $Gx3$ (when the latter is opened by two enabling signals simultaneously appearing on a control line T3 and a "read in" line) according to potentials then existing on the 1, 2, 4 and 8 number buses.

Although for the sake of brevity the storage of only a five digit X command number has here been illustrated, it will be apparent that the apparatus may be expanded to accommodate any desired number of digit places. In the present example, the XA device stores the units order decimal value, the XB device stores the tenths order decimal value, and the XC, XD and XE devices respectively store the hundredths, thousandths and ten thousandths order decimal values. Thus, the binary values (0 or 1) represented by 0 or $-12$ volt potentials on the 20 output lines from decade storage devices XA through XE may represent in binary coded decimal notation any multidigit decimal number between 0.0000 and 9.9999. For convenience of understanding, each output line of the X command storage device 92 has been labeled with three identifying symbols, such as XA8 or XB2, where the first letter X designates the nature of the number (an X command), the second letter designates the decimal order (A, B, C, D or E), and the third suffix numeral designates the bit value according to the binary code. As an example, the X command number of 1.2345 shown on the tape 90 in FIG. 5c may be stored and represented as follows:

TABLE III

| Terminal: | Binary signal | Decimal order | Value |
|---|---|---|---|
| XA8 | 0 | | |
| XA4 | 0 | Units (10⁰) | 1 |
| XA2 | 0 | | |
| XA1 | 1 | | |
| XB8 | 0 | | |
| XB4 | 0 | Tenths ($10^{-1}$) | 2 |
| XB2 | 1 | | |
| XB1 | 0 | | |
| XC8 | 0 | | |
| XC4 | 0 | Hundredths ($10^{-2}$) | 3 |
| XC2 | 1 | | |
| XC1 | 1 | | |
| XD8 | 0 | | |
| XD4 | 1 | Thousandths ($10^{-3}$) | 4 |
| XD2 | 0 | | |
| XD1 | 0 | | |
| XE8 | 0 | | |
| XE4 | 1 | Ten thousandths ($10^{-4}$) | 5 |
| XE2 | 0 | | |
| XE1 | 1 | | |

In any five digit decimal number, the decimal point is assumed to follow the first or A decimal digit, so that it is unnecessary to separately signal and store the presence of decimal points.

The sign of the X command number is assumed to be positive unless indicia representing a negative sign appears on the punched tape preceding the decimal digits. In the present instance, the sign is stored in the flip-flop $Xs$, which represents a positive sign when in the reset state and a negative sign when in the set state. If the output terminal XM of the flip-flop $Xs$ is a binary 0 or 1 level, then the stored sign is positive or negative, respectively.

The apparatus 94 for storing a Y number and its sign, i.e., Y-axis commands, is shown in FIG. 6b as substantially identical to that for storing X numbers. It will be seen that the sign of the Y number is stored by a flip-flop $Ys$ and is indicated as being negative when a potential representative of a binary 1 appears on the flip-flop output terminal YM. The values of the successively lower order digits of a five digit decimal number included in a Y command are represented on 20 output lines leading from five decade store devices YA through YE. It will be apparent that any five digit Y command number can be represented in binary coded decimal notation according to the potential levels on the 20 output lines YA8 through YE1.

Similarly, any selection code or J number (which has no sign) between 00 and 99 may be stored in the J storage device 96 which here includes decade storage devices JA and JB. The latter can be reset and then set according to selection code data read from the punched tape in the same way as X and Y numbers are stored.

It will be apparent from FIG. 6b that the 1, 2, 4 and 8 number buses lead through multiple gates $Gx$ 3—7, $Gy$ 3—7, and $Gj$ 2,3 to the input terminals of the respective X, Y, and J storage devices. The gates $Gx$ 2—7 are all partially enabled by the output signal which they receive from an address flip-flop FFx when the latter is set to its 1 state; and the gates $Gy2-7$ and $Gj2, 3$ are respectively partially enabled in response to setting of address flip-flops FFy and FFj to their 1 states.

However, it will be seen that the gates $Gx2$ and $Gy2$ associated with the sign storage flip-flops $Xs$ and $Ys$, and the gate $Gj2$ associated with the first order J storage decade $Ja$, are also controlled by connections to the T2 output line of the ring counter 181. Further, the gates $Gx3-7$ and $Gy3-7$ associated with the successively lower order decade storage devices are respectively controlled by signals appearing on the ring counter output lines T3 through T7.

Assume now that one set of data held in the X, Y, and J storage devices has served its purpose, and a new block of information is to be stored. The apparatus shown in FIG. 6a is started by setting the flip-flop 165 to its one state (either by momentary closure of the switch ST or an output from a gate 184, as later described) so that the tape 90 is advanced row-by-row in response to each cycle of the ring counter 170, as noted above. Assume further that the first seven rows thus sensed on the tape represent the word X + 1.2345, as exemplified in FIG. 5c.

During the first cycle of the counter 170, and the 0.1 second interval that a signal appears on the output line T1 of the counter 181, an output signal will appear on the X terminal of the decoder 174 (as a result of reading the X row of the tape) during the 0.03 second interval when the terminals R6, R7, or R8 of the counter 170 have outputs thereon. This X signal is therefore passed through a gate 185 (which receives an enabling signal from the terminal T1) to an X address line 186. As shown in FIG. 6b, the latter conductor connects to the set terminals of an address flip-flop FFx and also to one input of a reset gate 188.

During the shorter 0.01 second interval when signals appear simultaneously on the T1 terminal of the counter 181 and the R6 terminal of the counter 170, another gate 189 produces a timing signal here labeled T1, R6 on a conductor 190. This conductor, as shown in FIG. 6b connects to the other input of the gate 188 as well as to inputs of similar reset gates 191 and 192 associated with the Y and J storage devices. Since signals are appearing simultaneously on the X address line 186 and the timing signal line 190, only the gate 188 will produce an output signal, and the latter will pass to all of the X command sign and storage units to reset the latter to their 0 states, thereby removing any previously stored X number.

The timing signal T1, R6 appearing on the conductor 190 is fed also as one input to another gate 194 (FIG. 6a), which has a second input from an OR circuit 196 responsive to signals appearing on the X, Y, and J output terminals of the decoder 174. Since an X is being signaled by the decoder 174 during the time interval T1, and at the instant the .01 second timing signal appears on the conductor 190, the gate 194 passes a reset signal to an address reset line 198 which leads to the reset terminals of all three address flip-flops FFx, FFy and FFj. This latter signal resets any of the address flip-flops which were previously set, and disables all of the gates Gx2—7, Gy2—7, and Gj2,3. However, the signal appearing on the X output line 186 persists for .02 seconds after the address reset signal on line 198 disappears, so that the flip-flop FFx will be set, and its output potential will partially enable all of the X storage gates Gx2—7. The apparatus is now conditioned to receive and store a new X command number and sign.

When the counter 170 begins its second cycle of operation, and during which the counter 181 produces a signal on its T2 output line, the tape reader will be sensing the second row of the tape (which, as shown in FIG. 5c represents a plus sign). Such a plus sign is represented by no response from the address decoder 175. Thus, during the time that a signal appears on the terminal T2 leading to the gate Gx2 associated with the sign storage flip-flop Xs, the gate will be enabled, but no response will be transmitted to the flip-flop Xs because no signal will appear on a conductor 200 leading from the minus output terminal of the decoder to the input of the gate Gx2. Thus, the flip-flop Xs will be left in its reset state, to signal on the terminal XM that the X number being read has a positive sign.

When the counter 170 goes through its third counting cycle, and the counter 181 is producing an output signal on its T3 terminal to thereby enable the multiple gate Gx3 associated with the storage device XA, the next row of the tape representing a decimal 1 will be read. The gate 178 (FIG. 6a) will be opened by a signal on the No terminal of the decoder 174, and the number buses 1, 2, 4, 8 will have binary values of 1, 0, 0, 0 respectively signaled thereon. The 1 signal from the 1 bus will thus pass through the enabled gate Gx3 to set the storage device XA so that it represents a decimal 1 in the binary code.

As the counter 170 goes through its fourth complete counting cycle, and the terminal T4 of the counter 181 receives an output signal, the gate Gx4 associated with the XB storage device will be enabled, and when the decimal number 2 is represented by potentials on the number buses 1, 2, 4, 8, the XB storage device will be set to store that decimal value, specifically be causing the XB2 output line to reside at +12 volts, while the output lines XB8, XB4, and XB1 remain at 0 volts.

Similarly, as the counter 170 goes through its fifth, sixth and seventh complete counting cycles and the output terminals T5, T6 and T7 of the counter 181 to successively enable the last three gates Gx5—7 associated with the storage devices XC, XD and XE, the values of the decimal numbers read from the punched tape for the C, D, and E orders of the X command number will be set into the storage devices XC, XD, and XE. Since, in the example given above, the last three digits of the X command number have values of 3, 4, and 5, the storage devices XC, XD, and XE will be set to store in binary code notation the values of 3, 4, and 5. In this manner the 21 output terminals XM and XA8 through XE1 for the X storage apparatus will be conditioned to represent the number +1.2345 in the manner indicated by Table III, supra.

After the X command number contained within a given block of the tape 90 has been read and stored, the sequence of reading the next seven rows of the tape continues. However, this sequence will begin with the reading of a Y code during the first cycle of the counter 170 and when the terminal T1 of the counter 181 receives an output signal. Thus, during this second T1 interval, the decoder 174 will produce an output signal on its Y terminal, but none on its X terminal. A signal will be passed through a gate 201 to a Y output line 202 which connects both to the set terminal of the Y address flip-flop FFy and to one input terminal of the reset gate 191. While that Y output signal exists on line 202, the timing signal T1, R6 will appear on the conductor 190 so that the reset gate 191 passes a signal which will reset the flip-flop Ys and all of the Y storage devices YA through YE. Thus, any previously stored Y command number will be wiped out.

Moreover, when the T1, R6 timing signal appears on the conductor 190 and is passed as one input to the gate 194 (FIG. 6a), the latter now receiving a second input from the OR circuit 196 as a result of receiving a Y signal from the decoder 174, a reset signal will appear on the conductor 198 and will pass to the reset terminal of the X address flip-flop FFx, resetting the latter and disabling all of the X read in gates Gx. The flip-flop FFy will tend to be reset by this same signal on the conductor 198, but when that signal disappears, the Y output signal will remain on conductor 202, so that the address flip-flop FFy will be set, and its output potential will partially enable all of the Y-axis read in gates Gy. Thus, in response to the reading of a Y character, the read in gates for the X-axis are disabled, the previously stored Y command number is erased, and the Y read in gates are conditioned in readiness to supply new numerical information into the Y-axis storage devices.

As the ring counter 170 goes through its next complete counting cycle, during which an output signal appears on the terminal T2 of the ring counter 181, to thereby fully enable the gate Gy2, the tape reader will be sensing a row of holes representing a minus sign (see the tape in FIG. 5c). As a result, a minus signal will appear on conductor 200 and be supplied as one input to the gate Gy2 so that the flip-flop Ys will be set to its 1 state, and its output terminal YM will be made to reside at a binary 1 or −12 volt level, signaling and storing a minus sign for the new Y command number.

Then, as the counter 170 goes through another full cycle and the terminal T3 of the counter 171 receives a signal thereon, the gate Gy3 associated with the storage device YA will be fully enabled and it will transfer into that storage device the decimal value signaled by potentials on the 1, 2, 4, 8 number buses. In the present example, this first or units order digit for the Y command number has a value of 2, so that the YA storage device will be conditioned to produce a binary 1 or −12 volt potential on its output terminal YA2.

As the counter 170 goes through succeeding full cycles and the counter 181 completes a full cycle so that its terminals T4, T5, T6 and T7 successively receive output signals, the gates Gy4—7 associated with the storage devices YB YC, YD, and YE will be successively enabled to permit read in from the number buses and storage of the decimal values 3, 8, 9 and 0. In this manner, the complete word representing the sign and value of a multidigit Y command number is placed in storage and is signaled on the 21 output terminals associated with the Y-axis storage apparatus.

The next row of tape represents the selector code prefix J. Thus, when the ring counter 181 begins its next cycle of operation, and its terminal T1 receives an output signal, an output signal will also appear on the J terminal of the decoder 174 during the interval when the terminals R6, R7, and R8 of the counter 170 produce output signals. A J signal is thus passed by a gate 205 to a J address line 206. During the early portion of this latter interval, a timing signal T1, R6 will appear on the conductor 190, so that the reset gate 192 will receive two simultaneous inputs and thus will supply a reset signal to the selector code storage devices JA and JB. Also, when the timing signal T1, R6 appears on the conductor 190, the gate 194 will simultaneously be receiving a second signal from the OR circuit 196, so that a reset signal will appear on the reset conductor 198, thereby resetting the address flip-flop FFy and disabling all of the Y-axis read in gates Gy. After this reset signal on conductor 198 disappears, the J signal passed by the gate 205 to the conductor 206 will remain, and will thus set the address flip-flop FFj so that the output of the latter partially enables the gates Gj2 and 3. During the following two cycles of the ring counter 170 and when the terminals T2 and T3 of the ring counter 181 receive output signals, the two gates Gj2 and Gj3 will be respectively fully enabled, and therefore they will transmit from the number buses to the storage devices JA and JB the values of the decimal numbers represented by the two succeeding rows of the punched tape. As shown in FIG. 5c, it has been assumed that these latter two rows on the tape represent the decimal values 2 and 1 (signifying the decimal number 21) so that the storage devices JA and JB will be conditioned to represent on their output terminals JA8 through JB1 the decimal number 21. In this manner, a selection code, here exemplified as the decimal number 21 and following a prefix J, is read into storage.

As noted above, the last row of holes in one block on the punched tape represents the "end of block" code EB. When this latter row of holes is sensed by the tape reader, an output signal appears on the EB terminal of the address decoder 174 (FIG. 6a). This output signal passes to the reset terminal of the flip-flop 165, resetting the latter so that the gates 166 and 168 are both closed. The EB signal also passes through the OR circuit 196 and the gate 194 to produce a signal on the line 190 thereby resetting any previously set address flip-flop FFx, FFy or FFj. As a result, further operation of the tape reader is terminated, and the tape reader remains dormant until it is restarted in a manner to be described below.

Thus, it will be seen that the apparatus described with reference to FIGS. 6a and 6b constitutes means for reading successive sets or blocks of numerical information from a record device such as a punched tape and digitally representing and storing both the sign of a first or X-axis command number and the values of the successively lower order digits therefor. Similarly, the apparatus includes means for digitally representing and storing the sign and the value of the successively lower order digits of a second or Y-axis multidigit command number; and means for digitally representing and storing a selection code here exemplified as a two digit J number.

DECODING OF SELECTION CODES AND STORAGE OF CORRECTION DISTANCES

In order to perform a desired sequence of positioning the cutter 60 relative to the work piece 59 (FIG. 1) by movement of the latter along the X- and Y-axes, and to carry out a desired sequence of machining operations, a technician originally makes up a "program" of successive sets of numerical data which are recorded in successive blocks of the punched tape. When the tape is read, and positioning or machining operations effected in response to each block thereon, it may happen that the relative positions of the work piece and cutter, and the dimensions or coordinates of a machined surface or bore, will not agree precisely with the blueprint design of the desired final work piece. This may arise through no fault of the numerical control system, but it may occur due to unforeseen factors which the programmer cannot take into account when he prepares the original program of numerical information for application to the punched tape. For example, if a milling cutter utilizing during certain steps of an overall program has been sharpened and is thus slightly smaller in radius than that assumed by the programmer, the depth of the milling cut and the location of the milled surface on the workpiece will be in error by an amount equal to the difference between the assumed and actual cutter radii. Cutter and spindle deflection under load, although slight, is different on various individual machine tools, and cannot be taken into account by the programmer.

It has previously been proposed to provide a plurality of adjuster devices which will effect offsets or corrections from the originally programmed positions, and to render a different one of such devices effective during execution of certain critical steps of the program. When the first one of a series of identical workpieces is being machined, the operator may stop the automatic progress of the program to measure the workpiece, and then set any necessary correction distance on the particular adjuster device which is then effective. When this has been done, the cutter and workpiece will be relatively moved, not to the tape-commanded position, but to an adjusted command position which compensates for any unforeseen factors not taken into account in the original program of numerical information. Because the same adjuster device will be selected and rendered effective during the same steps of a program as that program is repeated for another workpiece, the same corrections for different individual steps of the program will automatically be repeated.

To permit such individual corrections for various ones of the programmed steps, a relatively great number—say, 20 to 100—of the adjusters 93 may be employed. Merely by way of example, only eight such adjusters are shown in FIG. 1, and only four have been illustrated in detail by FIG. 8. The adjusters are assigned individual code numbers from 0 to 99, and can be selectively rendered effective during different program steps by including in the corresponding block of the punched tape a selector code, in this instance designated by the prefix J. Thus, reading and storage of any selector code J0 to J99 contained within a block on the tape will render the corresponding one of the adjusters 93 effective during the execution of the positioning operation called for by that block. The amount of the offset correction produced by the selection of a given adjuster depends, however, on the setting or correction distance manually determined or "dialed in" to that adjuster by the operator of the machine tool. In the present system, the operator-determined correction distance is termed an N number, and it is represented in digital binary coded decimal notation. Because the range of correction distances need not be as great as the total position range, such N numbers can be set by the operator to have any value between ±0.0999 inches.

To selectively render effective a different one of the plurality of adjuster devices 93 in response to reading and storing each of selection codes J00 through J99, a J decoder 98 (FIG. 5a) is responsive to stored J numbers represented on the terminals JA8 to JB1 in FIG. 6b. The J decoder 98 is detailed in FIG. 7 sufficiently so that its overall organization will be readily understood. As there shown, tens order decoder gates 220, 221, 222 and 223 are connected to receive the JA8, JA4, JA2, JA1 signals in a manner such that they signal on their respective output lines 220a—223a when the tens order value of the stored J number is 1, 2, 5 or 7, respectively. For this purpose, the four-input gate 220 has one input connected directly to the line JA1, and its remaining three inputs connected through NOT circuits to the lines JA8, JA4, JA2. It will be apparent, therefore, that a binary 1 level appears on the gate output line 220a only when the tens order digits of the stored J number has a value of 1. Similarly, the gate 221 is connected so that its output line 221a signals a binary 1 level only when the tens order digit of the stored J number has a value of 2. In like manner, it will be apparent that the connections of the inputs for the gates 222 and 223 to the JA storage lines will result in those gates producing output responses on their lines 222a and 223a only when the tens order digit of the stored J number has a value of 5 or 7, respectively. Thus, the four conductors 220a—223a will uniquely signal whether the first order digit of a stored J number is 1, 2, 5 or 7—and irrespective of the particular value of the units order digit place of the stored J number. For this reason, these four gate output conductors have been labeled J1*, J2*, J5*, and J7*, indicating that the value of the units digit place is indeterminate from these signals alone. In other words, a signal appearing on one of the lines 220a—223a indicates that the stored J code has a value between 10—19, 20—29, 50—59 or 70—79, respectively.

In order to produce fully decoded J signals, the value of the units order digit place of the stored J number is utilized as shown in FIG. 7. In particular, the units place J code storage lines JB8, JB4, JB2, JB1 are connected through respective sets of four gates 225, 226 227 to the inputs of respective BCD-to-decimal decoder 230, 231, and 232. The four gates 225 will be enabled only if the line 220a has a signal thereon; whereupon the coded binary representation of the units digit of the stored J code number is passed to the input of the decoder 230. Such a BCD-to-decimal decoder is well known in the art and need not be described in detail. It will suffice to observe that the decoder has ten output terminals J10 through J19 and that one of these terminals will receive an output signal when the stored J number has the corresponding value of 10 through 19.

In like manner, the four gates 226 will be open only when the line 221a receives an output signal thereon indicating that the stored J number is between 20 and 29. When this occurs, the value of the units place of the J number is passed in binary coded notation through the gates 226 to the input of the decoder 231, and the latter will therefore produce an output signal on one of its 10 output terminals J20—J29 corresponding to the value of the stored J code selection number.

For a purpose to be explained later, the output terminals of decoder 232 may signal the value of a J code number in either the 50 or 70 series. To accomplish this, the outputs of the gates 222 and 223 are supplied to an OR circuit 234 which in turn passes a signal to the four gates 227. Thus, the latter gates will be open to transmit to the input terminals of the decoder 232 the value of the units digit of a stored J number when that number lies either within the values of 50 to 59 or 70 to 79. Accordingly, one of the 10 output terminals of the decoder 232 will receive a signal thereon indicating that the stored J number has a particular value of J50 to J59 or J70 to J79.

While FIG. 7 has, in the interest of brevity, been drawn to show only decoding of J numbers lying within the teens, twenties, fifties or seventies series, it will be readily apparent to those skilled the art that the same rationale may be followed to produce decoding of stored J numbers between 0 and 99 on 100 different output terminals, thereby making it possible to employ as many as 100 different adjuster devices.

In keeping with the present invention, the decoded selection signals are caused to render effective a corresponding one of a plurality of adjuster devices. Merely by way of example, four such adjuster devices are illustrated in FIG. 8. These four adjusters have, for purposes of explanation, been designated as 93 (11), 93 (21), 93 (51 or 71) and 93 (58 or 78). It will be seen that each of the four adjuster devices has an input terminal J11, J21, J51 or J71, and J58 or J78 which connects to the output of an amplifier associated with the corresponding decoder output terminal shown in FIG. 7. Thus, if the stored J code is J11 and an output signal appears on the J11 terminal of the decoder 230, a negative voltage will appear on the input terminal J11 (FIG. 8) and the remaining input terminals J21, J51 or J71, and J58 or J78 will remain at a 0 volt potential. On the other hand, if the stored J number is J21, then a negative potential will appear on the J21 input terminal in FIG. 8. And, if the stored J code number is J51 or J71, a negative potential will appear on that corresponding input terminal in FIG. 8. Finally, if the stored J number is J58 or J78, a negative voltage will be applied to the corresponding input terminal in FIG. 8.

When a negative voltage appears on one of the input terminals at the left side of FIG. 8, then the corresponding adjuster device will be rendered effective, in a manner which will now be explained. Referring for the moment to the adjuster 93 (21), the latter comprises three 10-point decade switches Cs, Ds, and Es, each movable to engage any one of 10 associated stationary contacts 0—9. The operator of the machine tool may thus manually "dial in" or set switches so that they respectively represent the value of the hundredths, thousandths, and ten thousandths order digits of any three-digit decimal correction number between 0.0000 and 0.0999. As here shown, these three switches have been positioned to represent a decimal correction number of 0.0260.

For digitally representing such a "dialed in" correction number by electrical signals in coded binary notation, the ten stationary contacts associated with the switch Cs are connected through a coding matrix to four correction number buses NC1, NC2, NC4 and NC8. This coding matrix includes diodes 236 (represented in most instances simply by diagonal lines) located so as to produce a negative potential on a particular coded combination of the four output lines for each of the 10 positions of the switch Cs. Similar connections are made from the stationary contacts 0—9 associated with the switches Ds and Es to correction number buses ND1, ND2, ND4, ND8 and NE1, NE2, NE4, NE8, respectively. From the pattern of these diode connections, it will be apparent that if, and only if, the input terminal J21 is at a negative potential, then different combinations of the C, D, E order correction number buses will be placed at negative potentials (signaling a binary 1) so as to represent in coded binary notation the values of the positions 0—9 to which the switches Cs, Ds and Es have been set. On the other hand, if the input terminal J21 does not receive a negative potential from the corresponding decoder output terminal in FIG. 8, then the adjuster 93 (21) is ineffective and the switches Cs, Ds, Es, produce no signal on the correction number buses.

The correction to be made to a command number read from the punched tape may be either positive or negative. To signal and represent the sign of a "dialed in" correction number, the adjuster 93 (21) includes a two position sign switch Ss which the operator may manually set in either a + or − position. When in the + position, the sign switch Ss produces no signal on an N sign bus here labeled N−, and the latter is thus at a binary 0 level indicative of a plus sign. On the other hand, when the sign switch Ss is set to its − position, it connects the input terminal 21 through an isolating diode 237 to the sign bus N−, placing the latter at a −12 volt potential, signifying a binary 1 and a negative sign for the correction number.

The adjuster devices 93 (11), 93 (51 or 71) and 93 (58 or 78) are all substantially like the device 93 (21), and so need not be described in detail. For reasons to be explained below, the adjusters 93 (51 or 71) and 93 (58 or 78) do not have sign switches like that shown at Ss for the adjuster 93 (21).

In review, it will be seen that only one of the four adjusters shown in FIG. 8 (and exemplifying a larger plurality, not shown) will be rendered effective during the execution of a given step of a program, the effective one being selected according to the value of a stored J code number which is decoded by the apparatus of FIG. 7. If any of the adjusters is so rendered effective, then the value of a three digit correction number will be represented in binary coded form by signals appearing on a common set of number buses N− and NC8 through NE1. In the discussion which follows, the correction number so stored and represented according to the setting of a selected adjuster device will be identified by the prefix letter N, the order place being represented by a second letter (C, D or E), and the bit place within the four place binary code being represented by the suffix numeral 1, 2, 4 or 8. This is the notation which is applied to the number buses at the bottom of FIG. 8. The utilization of the correction number, so stored and represented by the selected one of the adjusters will be described below.

DIGITAL REPRESENTATION AND STORAGE OF ADJUSTED COMMAND NUMBERS

In accordance with one feature of the present invention, the stored desired position commands (X and Y numbers, and signs therefor, represented on the X-and Y-axis storage output lines in FIG. 6b) are algebraically combined with the stored and represented correction number (an N number and sign represented on the correction number buses in FIG. 8). The resulting numbers represent modified or "adjusted" commands designating desired positions which may be somewhat different from original positions represented by numbers read from the punched tape.

By way of example, suppose a given block on the punched tape 90 (FIG. 5c) calls for an X-axis position of +1.2345 inches (represented by the point Pd in FIG. 4), and that such number is read from the tape and stored as an X number in the apparatus of FIG. 6b. If the block on the tape contains a selection code J21 which renders the adjuster 93 (21) in FIG. 8 effective, an N number of +0.0260 will be represented on the N buses. The sum of the commanded positions and the correction distance would be +1.2345+0.0260=+1.2605 inches. Thus, the adjusted position Pi (FIG. 4) to which the table 58 is to be moved is +1.2605 inches along the X axis scale.

In carrying out the present invention, means are provided not only to compute adjusted command numbers (hereinafter called X' and Y' numbers) and their signs, but also to store and digitally represent such adjusted numbers in binary coded decimal form. Referring to FIG. 9, the X' and Y' adjusted storage devices 99 and 100 (shown generally in FIG. 5a) are there illustrated in some detail. It will be seen that the sign of the adjusted X' number may be represented by a flip-flop 240 which in the reset state produces no signal on its 1 output terminal labeled X'M. The absence of a signal here designates that the sign of the adjusted number X' is positive. However, when the flip-flop 240 is set, the same output terminal is switched to a binary 1 level, indicating that the sign of the adjusted number X' is negative. The complementing terminal $\overline{1}$ of the flip-flop 240 resides at opposite binary levels from that of the 1 output terminal, and is here labeled X'M.

In order to store and digitally represent in binary decimal code the values of the successively lower order digits A.BCDE of an adjusted X' number, a plurality of decade storage units are shown in FIG. 9 and respectively labeled X'A, X'B, X'C, X'D, and X'E. Each of these storage units may contain four bistate devices or flip-flops, and thus may be similar to the storage unit XA shown in FIG. 6c. The four flip-flops within each such storage unit may be individually set to 1 or 0 states so as to represent the value of a decimal digit according to the binary decimal code. Each such storage unit as shown in FIG. 9 has four output terminals, making a total of 20 which are here labeled X'A8 through X'E1. Depending upon the binary levels of these 20 X' terminals, any decimal number between 0 and 9.9999 may be represented in binary coded notation.

The X' sign storage flip-flop 240 and the five X' storage units X'A through X'E may be set to conditions representing any desired X' number by signals transferred through associated gates to their input terminals. However, the manner in which this setting of information into the X' storage device 99 takes place will be described more fully below.

The Y' adjusted command storage device 100 shown in FIG. 9 is substantially identical to that for storing X' numbers. It comprises a sign storing flip-flop 241 and five decade storage units Y'A through Y'E. These latter units each have four output lines adapted to reside at either of two binary potential levels, the 20 lines here labeled Y'A8 through Y'E1 thus being capable of a signaling in binary decimal code any number between 0 and 9.9999. The flip-flop 241 when in its set or reset states signal on the line Y'M that such Y' number has a negative or positive sign. Read in of information into the five storage units Y'A through Y'E is accomplished by means of gates associated with their input terminals, as will be more fully treated below.

For the present then, it will suffice simply to understand that the storage devices 99 and 100 are adapted to digitally store and represent on the output terminals at the right and left in FIG. 9 the sign and value of adjusted command numbers X' and Y', each such stored number having a sign and five decimal digit places A.BCDE.

DIGITAL REPRESENTATION AND DYNAMIC STORAGE OF ACTUAL POSITION NUMBERS

As one part of the present invention, means are provided to digitally represent and store multidigit numbers indicative of the actual positions of the movable elements, i.e., the table 58 and saddle 55, along the X- and Y-axes. Such positions numbers are here called XP and XP numbers, and they are represented in binary coded decimal form. As movement of the elements along the X- and Y-axes occurs, these binary coded numerical representations are rapidly changed so that they instantaneously or dynamically correctly signify the actual positions. It will be helpful in understanding such dynamic actual position storage means to first have in mind the organization and operation of reversible binary coded decade counters, and thus coded binary decade counting stages will first be described.

A. Coded Binary Decade Counting Stages

FIG. 10 illustrates a binary coded decade counting stage which represents and stores the decimal numbers 0 through 9 in response to the receipt of successive ones of ten input pulses. This counting stage is shown as including four bistate devices or flip-flops FF1, FF2, FF4, FF8. When set to the 1 state, these flop-flops respectively represent a binary 1 in the 1, 2, 4, and 8 bit places of a four bit binary code which can represent any decimal number between 0 and 9.

The counting stage of FIG. 10 counts in response to an input voltage wave (shown at 250 in FIG. 11) applied to an input terminal 251 and passed through a differentiator 252 so that the switch input terminal SW of the first flip-flop FF1 receives in response to each cycle of the input wave a positive-going voltage pulse at the instants labeled 1, 2, 3....10 in FIG. 11. In response to each such input pulse, the first flip-flop FF1 switches successively from one state to the other, and thus the voltage at its 1 output terminal has the form illustrated at 254 in FIG. 11.

So long as the flip-flop FF8 is in the 0 state, the potential supplied from its $\overline{8}$ output terminal via a conductor 255 enables a gate 256 so that the latter transmits the voltage shown at 254 in FIG. 11 through a differentiator 258 to the switch input SW of the flip-flop FF2. The latter thus produces on its 2 output terminal a voltage which varies as shown at 259 in FIG. 11, and this voltage is passed through a differentiator 260 to the switch input SW of the third flip-flop FF4. Thus, positive going transitions in the waveform 259 result in switching of the flip-flop FF4 from one state to the other, so that the output voltage at the 4 terminal of the latter flip-flop has the form illustrated at 261 in FIG. 11. This latter voltage is transmitted through a differentiator 262 to the set input terminal S of the flip-flop FF8, and thus the latter will be switched from its 0 to its 1 state in response to the eighth cycle or pulse applied to the input terminal 251.

Assuming that the decade counting stage of FIG. 10 initially has its four flip-flops all in the 0 state, representing the binary word 0000 and the decimal value of zero, (as indicated by the first line in FIG. 12), the decade counter responds to the first nine input signals or cycles of the wave 250 by counting in standard, well known binary fashion. The states of the four flip-flops and the value of the stored or represented decimal number are illustrated by the waveforms of FIG. 11 and the first eight lines in the table of FIG. 12. However, when the decade counter stage reaches a count of eight and the flip-flop FF8 is set to its 1 state, the gate 256 is disabled, and a second gate 264 is enabled. The ninth input pulse applied to the terminal 251 serves merely to switch the first flip-flop FF1 to its 1 state, so that the four flip-flops then represent the binary word 1001, equal to the decimal value 9. When the tenth input pulse is received, the first flip-flop FF1 resets to the 0 state, and this produces no effect on the second flip-flop FF2 because the gate 256 is now closed. The positive-going voltage transition at the output of the flip-flop FF1, however, passes through the now-enabled gate 264, and through a differentiator 265 to the reset terminal R of the fourth flip-flop FF8, restoring the latter to its 0 state. Thus, the tenth input pulse results in all four flip-flops being returned to their 0 state so that the decade stage now represents the decimal value of zero (see the next to last line in FIG. 12).

Thus, the binary decade counting stage of FIG. 10 repeatedly counts through one complete cycle in response to 10 successive input signals applied to its input terminal 251. After each such input signal is received, the four flip-flops by their binary states and the output potentials therefrom represent in the 1, 2, 4, 8 binary code the proper decimal value between 0 and 9. It will be seen that each time the decade stage of FIG. 10 returns to the decimal 0 state in response to a tenth input pulse, a voltage drop, representative of a binary 1, appears at a carry output terminal 266, the potential of the latter being represented by the waveform 268 in FIG. 11. This carry output pulse may be supplied as the input to a succeeding, identical decade counting stage, so that the latter counts according to the tens order of the total number of input pulses applied to the input terminal 251.

FIGS. 13—15 illustrate the organization and operation of a similar decade counting stage, but one which counts backwards or reversely in response to input signals applied to an input terminal 270. In other words, as each input signal is received, the decimal value of the count stored in the decade stage of FIG. 13 becomes one less than it was before.

The reverse-counting stage in FIG. 13 also includes four flip-flops FF1, FF2, FF4, FF8. In this case, however, the $\bar{1}$ output terminal of the flip-flop FF1 is connected through a gate 271 and a differentiator 272 to the switch input SW of the second flip-flop FF2; the $\bar{2}$ output terminal of the flip-flop FF2 is connected through a differentiator 274 to the switch input SW of the third flip-flop FF4; and the $\bar{4}$ output terminal of the latter flip-flop is connected through a differentiator 275 to the reset input terminal R of the fourth flip-flop FF8. This latter flip-flop is set to its 1 state in response to an output received from a four-input gate 276 and passed through a differentiator 278 to its set terminal S.

The gate 276 produces a 1 output only when its four inputs are at a binary 1 potential value, and since these four inputs are connected to the $\bar{1}, \bar{2}, \bar{4},$ and $\bar{8}$ output terminals, the gate 276 will produce a binary 1 output only when the decade stage switches from a representation of the decimal number 0 to a representation of the decimal number 1. An additional gate 279, on the other hand, is connected to receive three inputs from the $\bar{8}, \bar{4},$ and $\bar{2}$ output terminals. This latter gate will thus produce a 1 output potential only when the flip-flops FF8, FF4, and FF2 are all in the 0 state, indicating that the stored decimal count is either 0 or 1. The output of the gate 279 is passed through an inverter 281 to a control terminal of the gate 271, so that the latter will be enabled only when the stored decimal count is either 0 or 1.

The potentials appearing on the output terminals 1, 2, 4, and 8 of the respective flip-flops as ten input pulses or cycles are applied to the terminal 270 are illustrated at 273a, 273b, 273c, and 273d in FIG. 14.

If the four flip-flops in FIG. 13 initially represent the binary word 0000, equivalent to the decimal value 0 (as indicated by the first line in FIG. 15), the first cycle of the input wave 285 (FIG. 14) applied to the input terminal 270 will cause a differentiator 286 to apply a positive pulse to the switch input terminal SW of the first flip-flop FF1, switching the latter from its 0 to its 1 state. This drives the $\bar{1}$ output terminal of the first flip-flop to the binary 0 potential level, so that the output of the gate 276 switches from a binary 1 to a binary 0 level (e.g., from −12 volts to 0 volts), thereby causing the differentiator 278 to apply a positive pulse to the set terminal S of the flip-flop FF8, and setting the latter to its binary 1 state. Thus, after a first input signal is received, the four flip-flops represent the binary word 1001 to indicate a decimal value of 9, as indicated in the second line of FIG. 15.

In response to the second input signal applied to the terminal 270, the flip-flop FF1 is simply reset to its 1 state, so that the decade stage represents the decimal value of 8, as illustrated by the third line in FIG. 15.

Because the flip-flop FF8 is now in the 1 state, its $\bar{8}$ output terminal supplies binary 0 to the input of gate 279, the latter produces a binary 0 output, and the inverter 281 produces a binary 1 input to the gate 271, enabling the latter. Thus, when the third input pulse is received on terminal 270, the first flip-flop FF1 is set to its 1 state, the voltage transition at its $\bar{1}$ output terminal passes through the gate 271 and the differentiator 272 to switch the second flip-flop FF2 to its 1 state. The voltage transition at the $\bar{2}$ output terminal passes through the differentiator 274 to switch the flip-flop FF4 to its 1 state. The voltage transition at the $\bar{4}$ output terminal passes through the differentiator 275 to the reset terminal of the flip-flop FF8, switching the latter to its 0 state. Accordingly, after the third input pulse is received, the four flip-flops represent the binary word 1110, equal to the decimal value of 7 as illustrated by the fourth line in FIG. 15.

The fourth input signal applied to the terminal 270 merely switches the first flip-flop FF1 to its 0 state, so that the decade stage now represents the decimal value of 6. The fifth input pulse applied to the input terminal 270 switches the flip-flop FF1 to its 1 state, and the latter in turn supplies a signal through the enabled gate 271 to switch the flip-flop FF2 to its 0 state. The decade counting stage now represents the decimal value of 5.

The sixth input pulse applied to the terminal 270 merely switches the flip-flop FF1 to its 0 state, so that the decimal number 4 is stored and represented, as illustrated by the seventh line in FIG. 15.

The seventh input pulse applied to the terminal 270 switches the first flip-flop FF1 to its 1 state, and the carry through the enabled gate 271 switches the second flip-flop FF2 to its 1 state, so that the carry through the differentiator 274 switches the flip-flop FF4 to its 0 state. The decimal number 3 is now represented in binary code as shown by the eighth line of FIG. 15.

When the eighth input pulse is received, the flip-flop FF1 is reset to its 0 state, so that the decimal value 2 is represented and stored.

When the ninth input pulse is received, it switches the first flip-flop FF1 to its 1 state, and the carry through the now-open gate 271 switches the second flip-flop FF2 to its 0 state, there being no carry from the flip-flop FF2 to the flip-flop FF4. The four flip-flops now represent the decimal value of 1. Since the last three flip-flops are all in their 0 states, the three inputs to the gate 279 are now at the binary 1 level, the output of the latter gate is at a binary 1 level, and the output of the inverter 281 is at a binary 0 level, thereby disabling the gate 271. Accordingly, when the tenth input pulse is received, its only effect is to switch the flip-flop FF1 to its 0 state, restoring the decade stage to its original condition with all flip-flops in the 0 state, thus representing the decimal value of 0. As the eleventh input pulse is received, the sequence of operations described begins to be repeated.

From the foregoing, it is apparent that the decade counter stage shown in FIG. 13 counts backwards in response to successive input signals applied to its terminal 271. As each successive input pulse is received, the states of the four flip-flops are changed so that the potentials on their output terminals represent in the binary coded decimal form a decimal value which is one less than that previously represented. It may also be noted that the output of the gate 276 falls from a binary 0 level to a binary 1 level when the tenth input pulse is received, as illustrated by the waveform 284 in FIG. 14. Thus, a terminal labeled B and Z in FIG. 13 has a binary 1 potential applied thereto each time that the decade stage completes one full counting cycle, and (e.g., potential of this terminal may be applied to the input of a succeeding stage so as to count reversely the tens order of input pulses applied to the terminal 270. In the following description, therefore, the label B or Z for a terminal associated with a reverse-counting decade stage may be considered as a borrow terminal which may be connected to the input of a succeeding decade stage and which also may be considered as a "zero output" terminal since it will fall to a low potential (e.g., −12 volts) only when that decade stage is in a state representative of the decimal value of 0.

Having in mind the organization and operation of the coded binary decade counter stages which respectively "count up" or "count down," as described with reference to FIGS. 10 and 13, a reversible coded binary decade counter stage illustrated in FIG. 16 will be more easily understood. The latter is a four-bit coded binary decade counter stage which may either (a)

count up, (b) count down, or (c) be preset to store and represent a desired number or count. Such up, down, presetable counter stages are employed in the X and Y position storage devices 101 and 102 (FIG. 5a) which will later be described in detail.

Referring to FIG. 16, the decade counter there shown includes four bistate devices or flip-flops FF1, FF2, FF4, FF8. These are interconnected with gates controlled by complemental potentials applied to up inhibit and down inhibit terminals UI and DI, such that the decade counter either counts down or counts up in response to input signals received on a common input terminal 300.

Several "pulse gates" PG are shown in FIG. 16. In essence, these are gate-controlled differentiators which produce positive-going output pulses in response to positive-going transitions of a square wave applied to one input only if the other input is at a predetermined one of two potential levels. As shown in FIG. 16a, each such pulse gate PG comprises an inhibit terminal 301 connected through a resistor 302 to a junction 303, and an input terminal 304 connected through a capacitor 305 to the same junction. A diode 306 is connected as shown from the junction 303 through a load resistor 308 to a point of 0 volt potential (ground), with an output terminal 309 connected to the upper end of that load resistor. Now, if the inhibit terminal 301 is held at a binary 1 potential level (e.g., −12 volts), then as a square wave applied to the input terminal 304 changes between 0 volt and −12 volt levels (representing binary 0 and 1, respectively), no current is passed by the diode 306, and no response appears on the output terminal 309. However, if the inhibit terminal 301 is held at a binary 0 level (0 volts), the charging and discharging of capacitor 305 in response to a square wave applied to the input terminal 304 will result in a positive-going pulse at the output terminal 309 only in response to the positive-going transitions in that square wave. In other words, when the inhibit terminal 301 is at a binary 0 level, an output pulse is produced on the terminal 309 only when the input terminal 304 is switched from a binary 1 to a binary 0 level. The pulse gate PG is "open," therefore, only if its control terminal 301 is at a binary 0 level, and it differentiates the input wave to produce a positive-going output pulse which may serve to set, reset or switch a bistate flip-flop device.

Referring again to FIG. 16, when the up inhibit terminal UI is at a binary 0 potential (and the down inhibit terminal DI is at a binary 1 potential), the counter stage is "inhibited" from counting down, and it thus will count up. Under these conditions, those gates and connections shown by heavy lines in FIG. 16 will be operative. A comparison of FIGS. 10 and 16 will reveal that the operative pulse gates 252', 258', 260' and 262' in the latter FIG. correspond in location and function to the differentiators 252, 258, 260 and 262, respectively, in FIG. 10. The gates 256' and 264' in FIG. 16 are thus connected and function in the same way as the gates 256 and 264 in FIG. 10. Because the down inhibit terminal DI is at a binary 1 potential, those components identified in FIG. 16 by circled reference numerals will be ineffective. Therefore, in response to each input signal applied to the terminal 300, the four flip-flops FF1, FF2, FF4, FF8 in FIG. 16 will scale or count in the same way as those flip-flops previously described in connection with FIG. 10. In other words, the counter stage of FIG. 16 will count up in repetitive cycles of 10, and at any instant the output terminals 1, 2 4, 8 will represent in coded binary notation the decimal value 0—9 of the stored count. Each time that the counter stage completes a full counting cycle, a carry signal will appear on the carry output terminal C.

To make the counter stage of FIG. 16 count down or in a reverse sense, the control terminals UI and DI are respectively placed at binary 1 and 0 potentials. The binary 1 applied to terminal UI signifies "up inhibit" and therefore indicates that the counter stage will count down. Under these conditions, the pulse gates shown in heavy lines by FIG. 16 will be ineffective to pass any signals, but those pulse gates and other components designated by circled reference numerals will be operative. Comparison of FIGS. 13 and 16 will reveal that the pulse gates 286', 272', 274', 275', and 278' in the latter thus correspond in location and function to the differentiators 286, 272, 274, 275, and 278, respectively, in FIG. 13. Moreover, the three gates 271' and 276' and the inverter 281' in FIG. 16 correspond to the gates 271, 279, 276 and the inverter 281 in FIG. 13. Therefore, when conditioned by an "up inhibit" −12 volt potential applied to the terminal UI, the counter stage of FIG. 16 will count down in the same manner as previously described with reference to FIG. 13. As each input signal or cycle is received on the terminal 300, the four flip-flops in FIG. 16 will count reversely, and the potentials on the output terminals 1, 2, 4, 8 will represent and store in binary coded decimal notation the values 0—9 of a decimal digit which is reduced by one in response to each input signal. As each group of 10 signals is received and the counter of FIG. 16 returned momentarily from its decimal 0 state, a negative-going signal will appear on its borrow terminal B. And, so long as the counter stage remains in its 0 state, the terminal Z will reside at a binary 1 (−12 volts) potential.

For purpose which will later be made clear, it is desirable to preset or condition the counter stage of FIG. 16 so it is switched from any condition, representing 0—9, to a desired condition representing a particular decimal number. This is accomplished as shown in FIG. 16 by interposing four gates 311—314 between presetting input terminals U1, U2, U4, U8 and the set input terminals S of the four flip-flops FF1, FF2, FF4, FF8. The outputs of these four gates also pass through NOT circuits 311a-314a to the reset terminals R of the same four respective flip-flops. Thus, if a given decimal number between 0 and 9 is represented by high and low potentials designating binary 0 and 1 levels on the presetting input terminals U1, U2, U4, U8, and an enabling signal is applied to a control terminal PC to thereby open the gates 311—314, the four flip-flops of the counting stage will be set to states so that they represent the same number which is represented on the presetting input terminal U1, U2, U4, U8. In other words, if those four input terminals receive signals indicative of the binary word 0110 (signifying a decimal value of 6), then when an enabling signal is applied to the terminal PC, the four flip-flops FF1, FF2, FF4, and FF8 will be set or reset (regardless of their previous states) to the 0, 1, 1, and 0 states, respectively, so that the counter stage of FIG. 16 stores and represents the decimal value of 6.

STORAGE AND NUMERICAL REPRESENTATION OF ACTUAL POSITIONS ALONG THE X AND Y AXES

The X position storage device 101 (FIG. 5a) is shown in FIG. 17 as including four tandemly connected up, down, presettable decade counting stages 320A—D, each being identical to the decade stage previously described with reference to FIG. 16. Each of the four counting stages is shown in FIG. 17 only in block form, but the organization and operation thereof will be apparent inasmuch as the several input, output or control terminals for each block is labeled in FIG. 17 are identified with the same symbols employed in FIG. 16. The four decade counting stages 320A—D of FIG. 17 together make up a multidecade reversible and presetable counter, the lowest order decade 320D being arranged to receive input pulses on a terminal 300 and supplying its carry or borrow pulses to the input of the next higher order decade counter 320C. The latter in turn supplies carry or borrow pulses to the input of the decade stage 320B which in turn supplies its carry or borrow signals to the input of the fourth decade stage 320A. Thus, the binary signals on the output terminals 1, 2, 4, 8 of the decade stage 320A represent the decimal value of the units digit of a four digit decimal number A.BCD. The counter stages 320B, 320C, and 320D store and represent the decimal value for the tenths, hundredths, and thousandths order places of that four digit decimal number. Such a four digit decimal number A.BCD represents the actual position of the element movable along the X axis to an accuracy of $(n-1)$ places or four-place accuracy, in comparison with the stored X command number (see FIG. 6b) which is represented to an accuracy of $n$ decimal places (here, five for the decimal number A.BCDE). The reason for this lesser degree of accuracy for actual position numbers will become apparent as the present description proceeds.

For the present, it will suffice simply to note that the four place decimal number representing the actual position of the table 58 along the X-axis scale to the nearest thousandths of an inch is represented in binary coded decimal form by the potentials appearing on the sixteen output lines labeled XPA8 through XPD1 in FIG. 17. Another output terminal labeled XPM in FIG. 17 represents the sign of the X position number by residing at a binary 0 or binary 1 level to signify a plus or minus sign, as hereinafter explained.

The multistage reversible counter 101 in FIG. 17 is supplied with pulses from a rotary transducer or pulse generator PGx through a counter control 320 (see also FIG. 5a). The latter supplies the proper control signals via lines 321, 322 to the up inhibit and down inhibit terminals UI and DI of all four tandemly-connected counter stages 320D, 320C, 320B, 320A. The counter control 320 also supplies one input pulse via a line 324 to the first input terminal 300 of the multidecade counter 101. The rotary transducer, in a manner to be explained below, produces one "count" pulse for each increment of rotation of the associated lead screw 66 (see FIG. 2) which equals .001 inches of linear motion of the table 58. To give a specific example, assume that the table 58 is at a position of +1.2345 inches along the X axis and that the counter stores the number +1.234. If the table moves to the right or left (in a positive or negative direction) through a distance of .100 inches, one hundred pulses will be supplied to the input terminal 300, and the counter 101 will count up or down until it stores and represents the number 1.334 or 1.134 by the potentials on its 16 output lines. In other words, as the table moves through each increment $i$ (which in the present example is .001 inches), the count stored in the counter 101 is increased or decreased by one such increment (.001), so that the output terminals at the bottom of FIG. 17 dynamically or substantially instantaneously represent the actual numerical position of the element movable along the X-axis.

The Y-axis position storage 102 (FIG. 5a) is shown in more detail by FIG. 18, and because it is substantially identical to the X-axis position storage 101 of FIG. 17, it need not be described in detail. It will be observed only that the position of the saddle 55 along the Y-axis is represented by a four place decimal number A.BCD which is dynamically signaled in binary coded decimal notation by the potentials on the 16 output lines at the bottom of FIG. 18. Each of these latter terminals is identified with the prefix letters YP to signify that they represent numerically an actual position along the Y-axis; by a letter A, B, C, or D to signify the decimal digit order with which that output terminal is associated; and by a suffix number 1, 2, 4, or 8 to signify the bit place in the binary code. The sign of the Y-axis actual position number is represented by the binary potential on an output line YPM. As the saddle 55 is moved along the Y-axis, the pulse generator PGy working through a counter control 329 causes the multidecade reversible counter 102 to count up or down by .001 for each distance increment of 0.001 inches through which the saddle travels. Therefore, the sign and actual position of an element movable along the Y-axis are continuously represented in numerical form by the signals which appear on the 16 output terminals YPA8 to YPD1 in FIG. 18.

THE COUNTER CONTROLS

In the exemplary embodiment of the invention here illustrated, the multidecade counters 101 and 102 are controlled so that they count in the proper direction, either up or down, in response to pulses received from the transducers PGx and PGy, depending upon the signs of the then existing actual positions of the movable elements 58 and 55 and upon the direction in which the latter are moving. This function, as well as that of signaling the sign of the actual position numbers, is served by the respective, substantially identical counter controls 320 and 329. A more detailed description of one such counter control with reference to FIGS. 19 and 19a will suffice for both.

A. Pulse Generation And Motion Direction Signaling

The pulse generator PGx may take a variety of forms, and that shown diagrammatically in FIG. 19 is one currently being sold under the trade name "Rotopulser" by the Dynapar Corporation of Skokie, Illinois. To establish a digital feedback connection between the movable element or table 58, the lead screw 66 is coupled to drive a disc 335 having spaced apertures or notches (not visible) in its periphery. Light from a lamp 336 disposed on one side of the disc is alternately transmitted to or blocked from a pair of photocells 338 and 339 coupled through amplifiers 340 and 341 to output terminals 342 and 343. Briefly stated, as the disc 335 rotates, a first signal on the output terminal 342 varies as a square wave with one cycle of variation being produced for each angular increment of disc motion corresponding to .001 inches of movement of the table 58. A second signal on the output terminal 343 varies in the same manner. However, the first signal either leads or lags the second signal by 90° in phase when the disc 335 is rotating in a clockwise or counterclockwise direction, respectively, and the table 58 is moving in a positive or negative direction, i.e., toward the right or toward the left as viewed in FIG. 4. Thus, if the motion is positive, the first and second output signals have the square waveforms and phase relationship shown at 344 and 345 in the left portion of FIG. 19a; and if the motion is in a negative direction, these first and second output signals have the wave shapes and phase relationships shown at 344' and 345' in the right portion of FIG. 19a.

These first and second signals are applied to the switch input terminals SW of first and second follower flip-flops $FF_A$ and $FF_B$. The latter are constructed such that they switch to the 1 state in response to a high input potential and to their 0 states in response to a low input potential. Thus, the flip-flop output terminals A and B in FIG. 19 have signal variations thereon which are the same in form as those illustrated at 344, 344' and 345, 345' in FIG. 19a. The $\overline{A}$ and $\overline{B}$ output terminals of these two flip-flops have potentials which vary complementally, and thus which have the forms illustrated at 346 and 347 in the left portion of FIG. 19a when motion is in a positive direction; but they have the waveforms and phase relationships shown at 346' and 347' in the right portion of FIG. 19a when motion is in a negative direction.

To sense and electrically signal whether the table is moving in a positive or negative direction, the A and $\overline{A}$ terminals of the flip-flop $FF_A$ are supplied respectively to trigger two monostable or "one shot" multivibrators 350 and 351. The latter trigger and produce a short negative-going pulse each time their input signals have a positive-going transition. Thus, the pulse outputs of the one shot multivibrators 350 and 351 have the form illustrated at 354 and 355, respectively, when the motion is in a positive direction; and they have the form illustrated at 354' and 355' (left portion of FIG. 19a) when motion is in a negative direction. The outputs of the one shot devices 350 and 351 are supplied as inputs to two respective gates G− and G+, while both of the latter are controlled by the signal from the $\overline{B}$ output terminal of the flip-flop $FF_B$.

With reference to FIGS. 19 and 19a, it will be apparent that if the table is moving in a positive direction (see left portion of FIG. 19a), then the gate G+ will receive a binary 1 signal from the $\overline{B}$ terminal at those instants when the output pulses are produced by the one shot device 351. As a result, pulses will be passed by the gate G+ to a positive motion conductor +MOT. These latter pulses are shown at 356 in FIG. 19a. The gate G−, on the other hand, will pass no pulses, as indicated at 358 in FIG. 19a.

In contrast, when the table is moving in a negative direction so that the output wave on terminals 343 lags the output wave on terminal 342 as shown at 344' and 345' in FIG. 19a, the gate G— will receive a binary 1 input from the $\bar{B}$ terminal at those instants when the one shot device 350 produces negative going pulses. Accordingly, the output of the gate G— is a series of pulses (shown at 358' in FIG. 19a) appearing on a negative motion conductor —MOT (FIG. 19). Under these conditions, there is no output from the gate G+, as indicated at 356' in FIG. 19a.

The outputs from both of the gates G+ and G— are passed through an OR circuit 360 to the "count" terminal of the counter control 320. Since only one or the other of the gates G+ and G— produces a series of pulses, that same series of output pulses will appear on the count terminal. It will be readily observed from FIG. 19a that there is one such output pulse passed to the count terminal for each cycle of the input wave 344 or 344'. In other words, for each increment of .001 inches moved by the table 58, one and only one pulse is passed to the count terminal. In this way, there is a straight digital feedback connection from the table 58 to the input of the actual position counter 101, as will be apparent from FIG. 17. Yet, when the table is moving in one direction or the other, such output pulses also appear either on the positive motion conductor +MOT or the negative motion conductor —MOT.

B. XP Number Sign Representation

In order to signal the sign of the actual position or XP number, a flip-flop 365 is included in the counter control 320, as shown in FIG. 19. When this flip-flop is in its 0 or 1 states (and a binary 0 or 1 potential appears on its 1 output terminal XPM), the sign of the XP number is represented as + or —, respectively. The sign flip-flop 365 is controlled by OR circuits 368 and 369 having their outputs connected to the set and reset terminals S and R. One input to the OR circuit 368 comes from the output of a gate 370, and one input to the OR circuit 369 comes from a gate 371. The gate 370 has one input connected to the negative motion conductor —MOT, and the gate 371 has one input connected to the positive motion conductor +MOT. Both of these gates have their second inputs connected to a conductor XZ which leads from the XZ input terminal of the counter control. As shown in FIG. 17, this XZ input terminal is connected to all of the Z output terminals of the four counter stages 320A—D. This means that only when the decimal number stored in the four decade stages is zero (i.e., when all four decade stages store the decimal digit 0), the terminal YZ receives a low or binary 1 level of potential. Thus, as plainly indicated in FIG. 19, the gates 370 and 371 will pass pulses from the —MOT or +MOT conductors only when the actual position number XP held in the position storage counter 101 is zero.

Now, if it is assumed that the table 58 is in a positive region along the X axis, and the flip-flop 365 is in its 0 state, so that the potential on the output terminal XPM represents a binary 0 and signals a positive sign, the sign of the actual position number XP will remain the same as the table moves either in a positive or a negative direction—so long as the table does not reach its zero position along the X axis. However, if the table moves in a negative direction sufficiently to reach the zero position, and then continues moving in a negative direction, at the instant the table reaches a zero position the gate 370 will be enabled so that the next pulse appearing on the conductor —MOT will pass through the gate 370 and the OR circuit 368 to set the flip-flop 365 to its 1 state. This, in turn, results in a binary 1 potential on the output terminal XPM, indicating that the actual position number is now negative in sign.

Similarly, if the table then begins moving from a negative region in a positive direction toward the zero point along the X axis, pulses will be appearing on the +MOT conductor. When the table finally reaches the actual zero position, the next pulse appearing on the positive motion conductor +MOT will pass through the enabled gate 371 and thence through the OR circuit 369 to the reset terminal R of the flip-flop 365. This will restore the latter to its 0 state, so that a positive sign for the actual position number XP will thereafter be signaled on the terminal XPM. Thus, in this way the proper sign of the number representing the actual position of the movable element is always stored and represented on the terminal XPM, as indicated in FIG. 19.

As will be explained hereinafter, the actual position number held by the counter 101 in FIG. 17 may be preset to agree with any desired value. When this is done, it is desirable also to set the sign storage means to represent the desired sign. In order to preset the flip-flop 365 so that it agrees with the stored sign X'M of an adjusted command number (for purposes to be more fully explained below), the X' sign signal X'M is applied from FIG. 9 directly to the input of a gate 374 and through a NOT circuit 375 to a second gate 376. Both such gates receive an enabling signal from a presetting terminal XPC as shown in FIG. 19. When that enabling pulse appears on the terminal XPC, the gate 374 will produce an output if the X'M signal is at a binary 1 level; and the gate 376 will produce an output if the X'M signal is at a binary 0 level. In the former case, the output of the gate 374 will pass through the OR circuit 368 to set the flip-flop 365 so that the latter stores and represents a negative sign for the actual position XP number. In the latter case, however, if the X'M signal is indicative of a positive sign, the gate 376 will produce an output which is transmitted through the OR circuit 369 to reset the flip-flop 365, so that the potential on the XPM output terminal indicates a positive sign for the actual position XP number. In this way, the sign stored and represented for the actual position number can be preset or reset when desired to agree with that represented by an X'M signal.

C. Counter Up-Down Control

The purpose of the up-down control portion of the counter control 320 is to create the proper complemental potential levels on the down inhibit and up inhibit terminals DI and UI which are connected via the conductors 322 and 321 (FIG. 17) to the down inhibit and up inhibit control terminals DI and UI of all four decade counter stages in the actual position counter 101. In other words, when that counter must count up in response to pulses received on its input terminal 300, the down inhibit terminal 322 must receive a potential representative of binary 1, and the conductor 321 must receive a potential representative of binary 0. On the other hand, when the counter 101 is to count down or reversely, the up inhibit conductor 321 must receive a binary 1 potential and the down inhibit conductor 322 must receive a binary 0 potential.

In order to produce these control potentials on the lines 321 and 322, the counter control 320 as shown in FIG. 19 includes a bistate flip-flop 380 having its 1 output terminal connected to the down inhibit terminal DI and its $\bar{1}$ output terminal connected to the up inhibit terminal UI. The flip-flop 380 is set or reset in response to signals received from first or second circuits $OR_1$ or $OR_2$. It signals that the counter is to count up when it is in the 1 state, or is to count down when it is in the 0 state.

In accomplishing the desired objective, four gates G1, G2, G3, G4 are employed. As shown in FIG. 19, the first two gates G1 and G2 both receive as inputs the pulses which appear on the +MOT conductor only when the movable element or table 58 is moving in a positive direction. On the other hand, the two gates G3 and G4 both receive as inputs the pulses which appear on the conductor —MOT only when the table 58 is moving in a negative direction. Further, the gates G1 and G3 receive as second inputs thereto the potential appearing on the $\bar{1}$ output terminal of the sign flip-flop 365; that is, they receive signals $\overline{XPM}$ which will be at a binary 1 level when the sign of the actual position number is positive. Finally, the gates G2 and G4 both are connected to receive as second inputs the XPM signal produced at the 1 output of the sign storage flip-flop 365, and these inputs to the gates G2 and G4 will be at a binary 1 level when the stored sign of the actual position number is negative.

Before describing the operation of the up-down control apparatus as it is shown in FIG 19, it will be helpful to recognize that these are four possible cases dictating whether the counter of FIG. 17 should count up or down. First, if the movable element is in a positive region of the X-axis and is moving in a positive direction, then the digital feedback pulses which appear on the counter terminal 300 must cause the counter of FIG. 17 to count up so that the stored number increases and dynamically represents the actual position of the movable element. Secondly, if the movable element is in a positive position, but is moving in a negative direction, then the counter must count down in order to accurately and dynamically represent the actual position of the movable element. Thirdly, if the movable element is in a negative position along the X-axis and is moving in a negative direction, then each digital feedback pulse must cause the counter to count up so that the stored negative number becomes larger as the motion continues. Fourthly, if the movable element is in a negative position, but is moving in a positive direction toward the zero position, then the digital feedback pulses must cause the counter of FIG. 17 to count reversely so that the stored actual position number is reduced by one for each increment of traversed distance. These four cases may be tabulated as follows: Case I: Movable Element In + Position; Motion In + Direction Case II: Movable Element In + Position; Motion In − Direction Case III: Movable Element in − Position; Motion In − Direction Case IV: Movable Element In − Position; Motion In + Direction The gates G1—G4 in FIG. 19 receive inputs which are indicative of the sign of the actual position of the movable element or table 58. That is, the XPM and $\overline{\text{XPM}}$ inputs to these gates represent the sign of the actual position stored number and therefore indicate whether the movable element is in a positive region or a negative region relative to the origin along the X-axis. Moreover, the gates G1—G4 also receive signals which are indicative of the direction in which the movable element or table 58 is moving. When it is moving in a positive direction (to the right) pulses appear on the +MOT conductor; and when it is moving in a negative direction (toward the left) pulses appear on the −MOT conductor. With these relationships in mind, therefore, the operation of the up-down counter control portion of FIG. 19, and particularly the operation produced by the gates G1—G4 on the up-down control flip-flop 380, may be understood readily from the following table:

the OR₂ circuit to the reset terminal of the flip-flop 380. The first one of these pulses will reset the flip-flop, placing the up inhibit terminal UI at a binary 1 level and the down inhibit terminal DI at a binary 0 level. In this manner, the counter 101 of FIG. 17 is conditioned so that it counts reversal in response to each pulse supplied to its input terminal 300, as required for case II.

Under the conditions of case III, as shown by table IV, supra, when the table 58 is in a negative region and is moving in a negative direction, the gate G4 passes pulses repeatedly through the OR₁ circuit to the set terminal S of the flip-flop 380. The latter is thus set in its 1 state, so that the terminal DI is at a binary 1 level and the terminal UI is at a binary 0 level. The counter of FIG. 17 thus counts upwardly in response to each digital feedback pulse. This satisfies the requirements for case III.

Finally, when the movable element is in the negative region, but is moving in a positive direction (case IV), then the gate G2 is conditioned to pass pulses through the OR₂ circuit to the reset terminal of the flip-flop 380. Thus, the latter is reset so that the up inhibit terminal UI is at a binary 1 potential and the down inhibit terminal is at a binary 0 potential. The counter of FIG. 17 is conditioned so as to count downwardly, thereby satisfying the requirements of case IV.

It will be apparent, therefore, that the counter control 320 as shown in FIG. 19 so cooperates with the multidecade reversible counter 101 of FIG. 17 so that the latter counts either upwardly or downwardly in response to positive or negative motion of the movable element or table 58, and in a manner such that the number stored by the counter and represented on its output terminals at all times numerically represents the actual position of the table 58 along the X-axis. As explained previously, the sign storing flip-flop 365 is automatically controlled and either set or reset so that the sign of this actual position number is signaled on the sign terminal XM.

A moment's reflection will confirm that whenever the counter of FIG. 17 is counting reversely and reaches a zero count, it must thereafter begin counting upwardly. In order to assure that this transition from downward to upward counting always transpires when the count reaches zero, a connection is made from the XZ terminal in FIG. 19 to an input of the OR₁ circuit. Thus, even if the movable element or table 58 should be brought to a stop in a zero position along the X-axis, a signal will be supplied from the XZ or "zero" terminal in FIG.

TABLE IV

| Case: | Position sign | XPM | $\overline{\text{XPM}}$ | Motion direction | Pulses on— | | Output of— | | | | | | FF 380 | UI | DI |
|---|---|---|---|---|---|---|---|---|---|---|---|---|---|---|---|
| | | | | | +MOT | −MOT | G1 | G2 | G3 | G4 | OR₁ | OR₂ | | | |
| I | + | 0 | 1 | Right (+) | Yes | No | 1 | 0 | 0 | 0 | 1 | 0 | Set | 0 | 1 |
| II | + | 0 | 1 | Left (−) | No | Yes | 0 | 0 | 1 | 0 | 0 | 1 | Reset | 1 | 1 |
| III | − | 1 | 0 | Left (−) | No | Yes | 0 | 0 | 0 | 1 | 1 | 0 | Set | 0 | 0 |
| IV | − | 1 | 0 | Right (+) | Yes | No | 0 | 1 | 0 | 0 | 0 | 1 | Reset | 1 | 0 |

Table IV indicates with reference to FIG. 19 that when the stored sign of the actual position number is positive and the table 58 is moving in a positive direction, the gate G1 supplies a binary 1 output which is passed through the OR₁ circuit as each pulse appears on the +MOT conductor. Thus, the flip-flop 380 receives repeated pulses on its set terminal S, but it is set in response to the first such pulse, and the succeeding ones have no effect. When the flip-flop 380 is in its set state, a binary 1 potential appears on the down inhibit terminal DI and a binary 0 potential appears on the up inhibit terminal UI. Thus, the multidecade counter 101 in FIG. 17 is conditioned to count upwardly in response to each pulse produced on the count terminal of the counter control 320 and supplied to the input terminal 300. This satisfies the requirement for case I, as noted above.

On the other hand, when the table is in a positive region along the X-axis and the sign storage flip-flop 365 is in its 0 state, and if the table is moving in a negative direction, then the gate G3 is conditioned to pass pulses repeatedly through 19 to the OR₁ circuit to set the flip-flop 380 and thus create potentials on the control terminals DI and UI which will cause the reversible counter of FIG. 17 then to begin counting upwardly when motion is resumed.

It will be understood that the counter control 320 shown in FIG. 17 and in more detail by FIG. 19 is substantially identical to the counter control 329 which is shown in FIG. 18 as cooperating with the multidecade reversible counter 102 which dynamically stores and numerically represents the actual position of the saddle 55 movable along the Y-axis. It will therefore be unnecessary to describe the Y-axis actual position storage counter 102 and its control 329 in more detail, except to note that they respond to digital feedback pulses from the pulse generator PGy in a way to store and dynamically represent in binary coded decimal form the sign and value of the XP number which is indicative of the actual position of the element or saddle 55 movable along the Y-axis.

In review, it will be apparent that the apparatus as thus far described includes apparatus to numerically store and represent in binary coded numerical notation the decimal numerical value of the actual positions of the movable elements 58 and 55 as they travel along the X- and Y-axes, respectively. Such dynamic and substantially instantaneous representation of the signs and numerical values of actual positions are here obtained by employing reversible counters responsive to digital feedback means, the latter here being described as motion-to-pulse transducers PGx and PGy which act through the counter controls 320 and 329 to govern the operation of reversible multidecade counters 101 and 102.

ALGEBRAIC COMBINATION OF MULTIDIGIT NUMBERS

From what has been described above, it will be understood that the signs and values of seven multidigit numbers are stored and digitally represented in binary coded decimal form. These are the X- and Y-axis command numbers X and Y (see FIG. 6b); the correction distance number N stored and represented by the selected one of a plurality of adjusters (see FIG. 8); the adjusted command numbers X' and Y' (see FIG. 9); and the actual position numbers XP and YP (FIGS. 17 and 18). In carrying out the present invention, different pairs of these numbers are algebraically combined to compute sums or differences, and this is accomplished by the use of a single multidigit full adder-subtracter 105 (FIG. 5b). As a prelude to considering this complete operation with reference to the seven stored numbers, the organization and operation of components employed in the adder-subtracter will first be described.

A. One Bit Half Adder

The complete adder-subtracter 105 (FIGS. 5b and 26) includes several subcomponents or systems, among which are half adders, half adder-subtracters and one decimal digit place full adder-subtracters which can handle four bit binary words each representing a one place decimal number between 0 and 9. A one bit half adder HA is shown in FIG. 22 as having two input terminals G and H, an output terminal S, and a carry terminal C. It operates according to the following table:

TABLE V

| Input | | Output | |
|---|---|---|---|
| G | H | S | C |
| 0 | 0 | 0 | 0 |
| 1 | 0 | 1 | 0 |
| 0 | 1 | 1 | 0 |
| 1 | 1 | 0 | 1 |

From inspection of FIG. 22, when both inputs G and H are zero, none of three gates 390, 391, 392 in the half adder HA passes a binary 1, and thus the S and C outputs are both 0. However, if either input G or H receives a binary 1 signal, and the other input receives a binary 0 signal, then one or the other of the two gates 390, 391 passes a binary 1 signal through an OR circuit 394 to the S output terminal. Only if both inputs to the G and H terminals are binary 1's is a signal passed through the gate 392 to the carry terminal C. Thus, it will be recognized that the half adder of the FIG. 22 functions to carry out the arithmetic logic for adding two binary bits according to table V, supra.

B. One Bit Half Adder-Subtracter

Another component employed in the full adder-subtracter is a one bit half adder-subtracter HAS shown in FIG. 23. In general terms, the half adder-subtracter constitutes means for either adding or subtracting two binary bit inputs, depending upon whether a signal applied to a control terminal D is a 1 (calling for addition) or a 0 (calling for subtraction). The half adder-subtracter HAS as illustrated in FIG. 23 has two input terminals G and H, a control terminal D, an output terminal S and a carry or borrow terminal C. It is assumed that device HAS is employed for subtraction, the bit signal applied to the terminal G is a part of multibit binary number that is the minuend, and the bit signal applied to the terminal H is a part of a multibit binary number which is the subtrahend. The device HAS operates according to the following truth table:

TABLE VI

| | Inputs | | | Outputs | |
|---|---|---|---|---|---|
| | D | G | H | S | C |
| Add | 1 | 0 | 0 | 0 | 0 |
| | 1 | 1 | 0 | 1 | 0 |
| | 1 | 0 | 1 | 1 | 0 |
| | 1 | 1 | 1 | 0 | 1 |
| Subtract | 0 | 0 | 0 | 0 | 0 |
| | 0 | 1 | 0 | 1 | 0 |
| | 0 | 0 | 1 | 1 | 1 |
| | 0 | 1 | 1 | 0 | 0 |

The device HAS in FIG. 23 includes four gates 400—403. The first two gates 400, 401 are connected either directly or through NOT circuits to receive the input signals from terminals G and H, and these gates pass their output signals through an OR circuit 404 to the output terminal S. The second pair of gates 402, 403 are controlled jointly by the signals received on the input terminals, G, H, and by the control signal applied to the terminal D. These latter two gates pass their output signals through an OR circuit 405 to the carry-borrow terminal C. When the input applied to the control terminal D is a 1 calling for addition (and the gate 403 is disabled by the $\overline{D}$ input thereto), the half adder-subtracter HAS functions in the same manner as the half-adder HA of FIG. 22. This mode of operation is reflected in the first half of table VI.

However, when the input to the control terminal D is a 0 (calling for subtraction), the gate 402 is disabled. Under these conditions, the output signal on terminal S is a binary 1 only if the signals on terminals G and H are not the same, and the output on the carry-borrow terminal C is a binary 1 only if the G input signal is a 0 and the H input is a 1. In other words, there is a borrow from one bit place to the next only if it is necessary to subtract a 1 from a 0 in the particular bit place being handled by the half adder-subtracter HAS. Those skilled in the art will recognize that half adder-subtracter HAS of FIG. 23 and its operation as reflected by table VI results in logic operations corresponding to those required either for arithmetic addition or subtraction of two binary bits corresponding in order and place within a multibit binary number representation.

C. One Decimal Place Adder-Subtracter

It will be appropriate now to consider the organization of a one decimal place full adder-subtracter which adds or subtracts two decimal digits respectively represented in four-bit binary coded decimal notation. Referring to FIG. 24, such a full adder-subtracter is functionally represented by its four principal sections I, II, III, IV. Assume that two decimal digits are represented in four bit binary code by 1 or 0 signals on two sets of input terminals L1, L2, L4, L8 and K1, K2, K4, K8. A carry input terminal CI receives a binary 1 signal thereon when there is a carry (or borrow) from a lower order decimal place. A 0 signal on the terminal signifies no such carry (or borrow). Also, a control terminal D shown in FIG. 24 receives a binary 1 or 0 when the number represented on the K input terminal is to be respectively added or subtracted from the number which is represented on the L input terminals.

Section I in FIG. 24 serves as a means to add the K number represented on the four K input terminals to any carry or borrow received on the terminal CI from a lower order decimal place, and also to properly add any carry or borrow signals which occur between successively higher order bit places in section II. Section II of the one place full adder-subtracter receives as one input the decimal digit which is represented on the input terminals L1, L2, L4, L8 and receives as a second input the output of section I. Section II operates as a means to add or subtract the output of section I to or from the L input number. The provisional sum or difference value of the two inputs L and K, as affected by any carry on the terminal CI, appears as an output of section II.

Section III serves as a means to sense the provisional sum or difference signaled by the output of section II and to logically determine and signal whether there is a carry or borrow from the one place adder-subtracter to that in the next higher order decimal place. This carry-borrow signal is transmitted from section III to a carry output terminal CO. Moreover, if there is a carry or borrow to the next higher order decimal place as determined and signaled by section III, section III supplies a signal to section IV, and the latter in response to such a signal automatically adds or subtracts a decimal value of 6 to the provisional sum or difference signaled by the output of section II. Section IV in this manner produces the correct coded binary representation of the sum or difference value of the two input decimal digits L and K signaled on the input terminals at the left of FIG. 24. The sum or difference output appears as binary signals on the output terminals S1, S2, S4 and S8 at the right in FIG. 24.

With these general functions in mind, FIG. 25 may be readily understood, and the four sections I, II, III and IV of a one decimal place adder-subtracter have there been illustrated in more detail.

As shown in FIG. 25, section I of the one place decimal adder-subtracter includes four half adders HA1, HA2, HA4, HA8 for processing information in the 1, 2, 4, and 8 bit places of the binary code. Each of these half adders is identical to that previously described with reference to FIG. 22. The G input terminals of these four half adders are connected respectively to receive the input signals appearing on the K1, K2, K4, K8 input terminals. The carry-borrow input terminal CI is connected to the H terminal of the half adder HA1, and the carry output terminal C of each half adder is connected to the H terminal of the next higher bit half adder. Thus, if there is no carry or borrow from a lower order decimal place signaled on the terminal CI (and no carries in section II), the output terminals S of the four half adders will simply receive thereon the same signals which appear on the four K terminals. But if, for example, the K1, K2, K4, K8 terminals receive signals of 1100 (representing the decimal value 3), and a carry or borrow input appears on the terminal CI, then the half adder HA1 produces a carry to the H terminal of the half adder HA2, and the half adder HA2 produces a carry to the H terminal of the half adder HA4, so that the four half adder S terminals signal the binary word 0010 (equal to the decimal value of four).

Section II of the one place adder-subtracter shown in FIG. 25 includes four half adder-subtracters HAS1, HAS2, HAS4, HAS8, each of which is identical to that previously described in more detail with reference to FIG. 23. The four half adder-subtracters respectively receive on their G terminals the signals appearing on the input terminals L1, L2, L4, L8; and they receive on their H terminals the output signals appearing on the S terminals of the four corresponding half adders in section I. All of the half adder-subtracters have their control terminal D connected to receive the control potential on the main D terminal, so that they may operate either in an adding or subtracting mode, as previously described. Moreover, the carry-borrow terminal C of HAS1 is connected back to the H terminal of the next higher bit half adder HA2. Similar connections are made from HAS2 to HA4 and from HAS4 to HA8. In this way, the half adders of section I handle the carries or borrows generated by the half adder-subtracters in section II.

The add mode operation of sections I and II may be made clear by reference to a few examples from which it may be seen that any two decimal digit values represented on the K and L input terminals will be properly added.

Let it be assumed that:

a. The control terminal D receives a binary 1 signal so as to condition the apparatus of FIG. 25 for operation in its add mode;
b. The binary signals applied to the input terminals K1, K2, K4, K8 are 0100, representing the decimal value of 2;
c. The input terminals L1, L2, L4, L8 receive binary signals representing 1100 (equaling the decimal value of 3), and
(d) The terminal CI receives a binary 1 signal, indicating a carry from the next lower order place.

Accordingly, section I of the apparatus in FIG. 25 performs the addition:

$$\begin{array}{r} CI= \phantom{+}1 \phantom{0} 0 \phantom{0} 0 \phantom{0} 0=1 \text{ (carry from lower order)} \\ K=+0 \phantom{0} 1 \phantom{0} 0 \phantom{0} 0=2 \\ \hline 1 \phantom{0} 1 \phantom{0} 0 \phantom{0} 0=3 \end{array}$$

Thus, the output terminals S of the four half adders would normally signal thereon the binary word 1100 to represent the decimal value of 3. Under these circumstances, the section II half adder-subtracters perform the arithmetic addition:

$$\begin{array}{r} \text{L Input} \phantom{xxxxxxxxxx} 1 \phantom{0} 1 \phantom{0} 0 \phantom{0} 0=3 \\ \text{HA Output} \phantom{xxxxxxx} +1 \phantom{0} 1 \phantom{0} 0 \phantom{0} 0=3 \\ \hline 0 \phantom{0} 1 \phantom{0} 1 \phantom{0} 0=6 \end{array}$$

The carries represented by arrows are effected by the interconnections from the carry terminals C of HAS1 and HAS2 to the H terminals of HA2 and HA4. As a result of the operation described, therefore, the four output lines Q1, Q2, Q4 and Q8 of the respective half adder-subtracters are placed respectively at the binary levels of 0110 so as to represent and signal a provisional decimal sum equal to 6. In the present example involving no decimal carry, these same signals will be transferred to the output terminals S1, S2, S4, S8 so that the sum signal in binary code notation will represent the decimal value of 6.

By contrast, if the apparatus of FIG. 25 is supplied with signals representing two decimal digits whose sum is equal to or greater than 10, then the operation will be somewhat different because it is necessary to take into account the fact that a carry must be made to the next higher order decimal place. By way of example, let it be assumed:

a. That the carry input terminal CI receives a binary 1 signal indicating a carry from a lower order decimal place;
b. The decimal value represented by signals applied to the K input terminals is 6;
c. The decimal value represented by signals applied to the L input terminals is 8; and
d. A binary 1 signal is received on the D control terminals, calling for operation in the add mode. Under these circumstances, the following addition is performed by the half adders of section I:

$$\begin{array}{r} CI= \phantom{+}1 \phantom{0} 0 \phantom{0} 0 \phantom{0} 0=1 \\ K=+0 \phantom{0} 1 \phantom{0} 1 \phantom{0} 0=6 \\ \hline 1 \phantom{0} 1 \phantom{0} 1 \phantom{0} 0=7=\text{output of half adders.} \end{array}$$

With the decimal value of 7 represented on the output terminals of the half adders and supplied to the H terminals of the half adder-subtracters, the latter perform the following arithmetic operation;

$$\begin{array}{r} \text{HA Outputs}= \phantom{+}1 \phantom{0} 1 \phantom{0} 1 \phantom{0} 0= 7 \\ L=+0 \phantom{0} 0 \phantom{0} 0 \phantom{0} 1= 8 \\ \hline Q= \phantom{+}1 \phantom{0} 1 \phantom{0} 1 \phantom{0} 1=15=\text{output on Q terminals.} \end{array}$$

It will be seen that when the sum of the two decimal digits to be added exceeds the value 9, then the provisional sum represented on the terminals Q1, Q2, Q4, Q8 is not in itself accurate and directly useful. On the contrary, the decimal value of the provisional sum Q in the present example represents a value of 15, whereas the correct representation of the addition which has been performed should be a decimal value of 5 plus a carry of 1 to the next higher order decimal place.

Section III of the apparatus shown in FIG. 25 senses when a decimal carry must be made, and provides a carry output signal indicative of that fact. As here shown, the apparatus is constructed so that it signals a decimal carry on the carry output terminal CO when the provisional decimal sum represented on the Q terminals is greater than 9. This occurs in the add mode when any one of the following conditions exists:

a. There is a 8 and a 2 signaled in the provisional sum on the Q terminals;
b. There is an 8 and a 4 signaled in the provisional sum on the Q terminals;
c. There is a carry from the C terminal of the half adder HA8; or
d. There is a carry from the C terminal of the half adder-subtracter HAS8. To provide a carry output signal under any of these conditions, the apparatus of section III includes a first gate 410 having two inputs respectively connected to the Q2 and Q8 terminals, and a third input connected to the D control terminal. Further, a second gate 411 has two inputs connected respectively to the Q4 and Q8 terminals and a third input connected to the D control terminal. The outputs of these two gates are supplied as inputs to an OR circuit 412 whose output leads to the carry output terminal CO. Moreover, the OR circuit 412 has a third input connected to the carry output terminals C of both the half adder HA8 and the half adder-subtracter HAS8. In operation, therefore, section III of the apparatus shown in FIG. 25 signals a carry output whenever the provisional sum represented by the signals on the Q terminals is greater than 9, whenever the four half adder-subtracter produce a carry output from the highest order device HAS8, or whenever there is a carry output from the highest order half adder HA8. This carry output signal on the terminal CO may, of course, be supplied to the carry input terminals CI of an identical one place full adder-subtracter which operates to add digits in the next higher order decimal place.

As noted above, the provisional sum signaled on the Q terminals in FIG. 25 is not directly usable because it is not accurate in the binary code notation. As indicated by example, when a carry is produced, the provisional sum may represent a value of 15 when the correct decimal sum should be 5. The apparatus of section IV in FIG. 25 functions to convert the provisional sum signaled on the Q terminals into a correct decimal sum representation. Section IV includes half adder-subtracters HAS2' and HAS4' which receive the Q2 and Q4 signals on their G terminals and which produce the proper sum signals on the S2 and S4 output terminals. A half adder HA4' is employed to produce the proper carry operation from HAS2' to HAS 4', and a half adder HA8' is utilized to receive the Q8 signal and produce the proper signal on the final output terminal S8. In essence, the apparatus of section IV operates automatically to add a decimal value of 6 to the provisional sum represented on the Q terminals when and only when there is a decimal carry output produced by section III. This results in a final and correct representation in binary code on the output terminals S1, S2, S4, S8.

To pursue the example given above, let it be assumed that all four of the terminals Q1, Q2, Q4, Q8 are at a binary 1 level, representing a decimal value of 15, and that a binary 1 is produced by section III on the carry output terminal CO. This means that the final output terminal S1 receives a binary 1 directly from the terminal Q1. The G terminals of HAS2', HAS4' and HA8' receive binary 1 signals from the terminals Q2, Q4, Q8, respectively. The H terminals of HAS2' and HA4' receive binary 1's from the output of the gate 412. And, assuming that operation is in the add mode, the D terminals of HAS2' and HAS4' receive binary 1 control signals. Therefore, the unit HAS2' produces a binary 0 signal on the output terminal S2 and a carry from its terminal C to the unit HA4'. The unit HA4' thus receives binary 1's on its G and H terminals, so that its S output terminal supplies a binary 0 to the H terminal of the unit HAS4'; the its output terminal C supplies a binary 1 signal to the H terminal of the device HA8'. This means that the adder-subtracter HAS4' produces a binary 1 on the output terminal S4. Because the half adder HA8' is receiving binary 1's on its input terminals G and H, it supplies a binary 0 output signal to the terminal S8. Thus, it will be seen that the binary signals on the final output terminals S1, S2, S4, S8 represent the binary word 1010, which is equal to the decimal value of 5. This is the correct numerical sum representation for the particular digit place of the full adder-subtracter shown in FIG. 25 when the provisional sum signaled on the Q terminals is 15, as assumed from the example stated above.

Section IV of the apparatus shown in FIG. 25 functions always to add the value of 6 to the provisional sum represented on the Q terminals if the two input numbers L and K require a decimal carry; but any decimal carries which result from this addition of the number 6 in section IV are simply ignored. In the example set forth above, where the provisional sum is 15, section IV of the apparatus thus performs the following addition:

$$\begin{array}{rl} Q= & 1\ 1\ 1\ 1=15 \\ +0\ 1\ 1\ 0= & 6 \\ \hline 1\ 0\ 1\ 0= & 5=\text{output on S1, S2, S4, S8.} \end{array}$$

If, on the other hand, the provisional sum signaled on the Q terminals is nine or less, and if there is no carry from the devices HA8 or HAS8, then the same value is signaled on the final output terminals S1, S2, S4, S8. If it is assumed, for example, that the four bit binary word on the Q terminals is 0110 (representing the decimal value of 6) but that the OR circuit 412 produces no output to the terminal CO so there is no decimal carry, then the final output terminal S1 will receive a binary 0 from the terminal Q1. Further, the H terminals of the units HAS2' and HA4' will both receive binary 0's, so the signal passed by the unit HAS2' to the terminal S2 will be the same (in this example a binary 1) as that appearing on the Q2 terminal. The component HAS2' can produce no carry from its terminal C so that both inputs G and H of the unit HA4' will be 0, and the signal applied to the H terminal of the unit HAS4' must be 0. The output terminal S4 will receive the same binary signal (in this example, 1) as that appearing on the terminal Q4. Finally, under the conditions outlined, neither of the units HA4' or HAS4' can signal a carry, so that the input to the H terminal of the half adder HA8' must be 0. Thus, the output terminal S8 will receive the same binary signal (in this example, a binary 0) as that which appears on the Q8 terminal. Thus, in the example outlined above, the binary signals applied to the four output terminals S1, S2, S4, S8 will be 0110, representative of the decimal sum value of 6.

It will thus be apparent that the apparatus of FIG. 25 functions to provide the proper sum and carry signals as the two input decimal digits represented in binary code on the input terminals L and K take on different values between 0 and 9 and as the carry input from a lower order decimal place signaled on the terminal CI takes on values of 0 or 1. As will be explained hereafter, several decade units identical to that shown in FIG. 25 may be connected in tandem to form a multiplace digital adder.

Thus far the operation of the adder-subtracter shown in FIG. 25 has been described for the add mode. The subtraction mode of operation is produced whenever a binary 0 signal is applied to the main control terminal D, thereby disabling the gates 410 and 411 and conditioning all of the half adder-subtracters for the subtract mode. A decimal digit of a first number or minuend is applied in four bit binary code by signals on the input terminals L1, L2, L4, L8. The decimal digit for the subtrahend is applied in four bit binary code notation to the input terminals K1, K2, K4, K8. The subtraction operation may best be described by reference to specific examples.

Let it be assumed:
a. The decimal value of the minuend digit signaled on the L input terminals is 7;
b. The decimal value of the subtrahend digit signaled on the K terminal is 3; and
c. There is a binary 1 signal fed to the terminal CI, indicating a borrow from the next lower order decimal place. Under these conditions, the half adders in section I perform the following addition:

```
CI=   1  0  0  0=1
K= +1  1  0  0=3
      ─────────
      0  0  1  0=4
```

These output signals 0010 appear on the S terminals of the four half adders HA1, HA2, HA4, HA8, thereby representing the decimal value of 4. As a result, the four half adder-subtracters HAS1, HAS2, HAS4, HAS8 in section II will perform the following subtraction function:

```
L Inputs to G Terminals equals_  1  1  1  0=  7
Inputs to H Terminals equals_   -0  0  1  0= -4
                                 ─────────────
Q Terminal Outputs equals ___    1  1  0  0=  3
```

Thus, the Q1, Q2, Q4, Q8 terminals will signal the binary word 1100 indicative of the provisional difference value of 3. There being no borrow signal from the C terminal of the units HA8 or HAS8, there will be a binary 0 signaled at the output of the OR circuit 412 and on the carry out terminal CO, indicating no decimal borrow to the next higher order place. Thus, the same signals which appear on the four Q terminals will appear on the final output terminals S1, S2, S4, S8, thereby correctly indicating the difference value of 3.

It will be noted that a borrow signal from a lower order decimal place and applied to the terminal CI is, in effect, added to the subtrahend or K number before the latter is subtracted from the minuend or L number.

To take a further example, assume that:
a. The decimal value of the minuend digit signaled on the L terminals is 7;
b. The decimal value of the subtrahend digit signaled on the K terminals is 8; and
c. There is a borrow signaled by a binary 1 signal applied to the K input terminal CI. Then, the half adders of section I will perform the adding operation:

```
CI=   1  0  0  0=1
K= +0  0  0  1=8
      ─────────
      1  0  0  1=9
```

Thus, neglecting for the moment any carries from section II back to the half adders of section I, the S terminals of the four half adders in section I will signal the binary word 1001 (the decimal value of 9) and these signals will be applied to the H input terminals of the half adder-subtracters in section II. Accordingly, the apparatus of section II will perform the following subtraction:

```
L equals_____   1  1  1  0=  7
HA Outputs equals_____  -1  0  0  1=  9
                            ─────────────
Q equals_____   0  1  1  1  +7
                            borrow output from HAS8.
```

The provisional difference signaled on the Q terminals is thus 0111 equaling the decimal value of 7, and there will be a borrow signal from the C terminal of the half adder-subtracter HAS8 which passes through the OR circuit 412 to signal a binary 1 or decimal borrow on the carry output terminal CO.

Now, the provisional difference signal on the Q terminals of 0111 (equal to the decimal value 7) does not in and of itself correctly represent the difference value of 7 minus 9. However, the binary 1 signal applied to the H terminals of the units HAS2' and HAS4' causes section IV of FIG. 25 to automatically subtract the decimal value of 6 from the number represented on the Q terminals, thereby to arrive at the correct final difference value signaled on the output terminals S1, S2, S4, S8. Bearing in mind that the control terminals D of the units HAS2' and HAS4' receive a binary 0 control signal so that they operate in a subtraction mode, the apparatus of section IV receives the Q number as its input and performs the following subtracting operation:

```
Q=   0  1  1  1=  7
    -0  1  1  0= -6
     ─────────
S=   0  0  0  1=  8
```

Therefore, when the provisional difference represented on the Q terminals is 7 and there is a borrow signal supplied to the next higher order decade, the difference digit value signaled on the S output terminals is 8. This is the correct difference value for the decimal place under consideration because the borrow signal passed to the next higher order decimal place is equal in value to −10, and the value of signaled as the difference value leaves the net difference representation equal to a −2. In other words, −10 + 8 is equal to −2, and the value of 8 is represented by the binary signals 0001 appearing on the output terminals S1, S2, S4, S8. In net effect, the subtraction operation is 7 − 9 = −10 + 8 = −2 which is the correct answer.

A moment's reflection will confirm that similar correct subtracting operations will occur as the L and K input terminals receive four bit coded binary signals representing different decimal values between 0 and 9, and as there is either a borrow or no borrow signaled on the carry input terminal CI—assuming of course that the control terminal D is at a 0 binary level to condition the apparatus for operation in the subtraction mode.

The one place decimal adder-subtracter of FIG. 25 thus operates to properly add or subtract two decimal digits (each represented in four bit binary code) in the corresponding order places of multidigit decimal numbers, responding also to carries or borrows from the next lower order digit place. It produces the necessary carry or borrow signal to the next higher order decimal place and signals the value of the decimal digit sum or difference on its four output terminals S1, S2, S4, S8. In one of its principal aspects, the adder-subtracter of FIG. 25 responds to two input digits, each of which may have any value between 0 and 9 inclusive, by producing a provisional sum or difference which, in four bit binary code, may have any value between 0 and 15, and thus which in itself is not a correct representation of the sum or difference. However, when there is a carry or borrow to the next higher order decimal place, the final and correct sum or difference representation is obtained by automatically adding or subtracting the decimal value of 6 to or from the provisional number.

It will be understood that the specific circuitry for the half adders (as detailed by FIG. 22) and the half adder-subtracters (as detailed by FIG. 23) utilized in the one place adder-subtracter of FIG. 25 may be constructed with fast acting transistor or vacuum tube circuits, as is well known per se in the art. Thus, the one place adder-subtracter as shown in FIG. 25 will produce its sum or difference, and its carry or borrow, signals very quickly (within about one microsecond) after the input signals are applied to the L and K terminals. If one set of input signals is removed from those terminals and a new set applied, the new sum or difference and carry or borrow outputs are signaled almost instantaneously, and will continue to be signaled so long as the same set of input signals remain.

D. The Complete Five Place (Twenty Bit) Full Adder-Subtracter

The full adder-subtracter shown at 105 in FIG. 5b is illustrated in FIG. 26. As there shown, the multiplace adder-subtracter 105 includes five-decimal place adder-subtracters AS-A, ASlB, AS-C, AS-D and AS-E. Each of the latter is constructed identically to the one-place adder-subtracter illustrated in FIG. 25, and the various input and output terminals as shown in FIG. 25 are the same as those which are repeated for each adder-subtracter in FIG. 26. Thus, from what has been said with reference to FIG. 25, the adder-subtracter for the five-digit places as shown in FIG. 26 will be readily understood in their organization and operation.

It will be seen from FIG. 26 that the one-decimal place adder-subtracters A—E operate to add or subtract two decimal digits (each represented in four bit binary code) for the units, tenths, hundredths, thousandths, and ten thousandths order places in a five-place decimal number A.BCDE. The carry output terminal CO of each individual adder-subtracter is connected to the carry input terminal CI for the next higher order decimal place. All five of the one-place adder-subtracters receive a control signal applied to a master terminal D, so that they are selectively conditioned to operate either in an add or a subtract mode.

Thus, two five-place decimal numbers, with the value of each place represented in four bit binary code, may be represented by input signals supplied to the respective sets of L and K terminals at the left of FIG. 26. The five-place sum or difference of those numbers will be signaled on the S output terminals at the right in FIG. 26, with the value of each decimal digit in the sum or difference number being represented in four-bit binary code. More specifically, the larger one of two five-place decimal numbers (and which will be the minuend for subtracting operations) is represented by signals in binary code notation and applied to 20 input terminals LA8 through LE1. A second input number (and which in the case of subtraction will be the subtrahend) is represented by signals applied to 20 input terminals KA8 through KE1. The five-place decimal sum or difference number resulting from the addition or subtraction operation will be signaled in four-bit binary code notation on the 20 adder-subtracter output terminals SA8 through SE1. It will be understood, of course, that when two input numbers are represented by signals applied to the L terminals and the K terminals, respectively, the sum or difference number is represented by signals which appear almost instantaneously on the output terminals SA8 through SE1.

With the organization and operation of the five-decimal place adder-subtracter 105, as shown in FIG. 26, in mind, the manner in which that full adder-subtracter is utilized in the present system will become clear as the description proceeds.

TIMING SIGNAL SOURCE

In order to cause the single full adder-subtracter 105 (FIG. 26) to successively add or subtract different pairs of numbers, means are provided for measuring off rapidly repeating cycles of successive time periods. This function is served by the timing signal source 107 (FIG. 5b) which is shown in detail in FIG. 9.

Referring to FIG. 9, the timing signal source in this instance includes a pulse oscillator or clock 425 which transmits recurring pulses at a frequency of, say, 100 kc., to a scale-of-ten ring counter 426. The pulses appearing on each of the 10 output terminals 0—9 of this counter will thus have a frequency of 10 kc., and each such pulse will be approximately 10 $\mu$s. in duration. Such pulses from the 9 output terminal are supplied as the input to a scale-of-four ring counter 427, so that the four output terminals T$a$, T$b$, T$c$, T$d$ of the latter receive thereon four respective trains of mutually spaced negative-going pulses, each train having pulses at a frequency of approximately 2.5 kc. with each pulse being about 0.1 $\mu$s. in duration. Thus, the four terminals T$a$, T$b$, T$c$, T$d$ receive signals thereon which are graphically represented at 430, 431, 432 and 433 in FIG. 9$a$. It will be seen that the signals appearing on the four output terminals of the ring counter 427 measure off successive time periods $\tau a$, $\tau b$, $\tau c$, $\tau d$ and that the cycle of these four successive time periods then rapidly repeats.

During each cycle of the four successive time periods, it is desired to provide a short "operate" pulse. This is accomplished by passing the 10 microsecond pulses appearing on the 8 output terminal of the counter 426 through one input of four gates 435, 436, 437 and 438. The second inputs for those gates are connected respectively to the terminals T$a$, T$b$, T$c$, T$d$. With this, the output terminals T$as$, T$bs$, T$cs$, T$ds$ of the four gates each receive one and only one short pulse during the respective time intervals $\tau a$, $\tau b$, $\tau c$, $\tau d$. The "operate" pulses on these latter terminals are respectively shown at 440, 441, 442, 443 in FIG. 9$a$.

The timing signal source 107 controls the operation of several different portions of the present control system, and this is made clear by identifying the signal source output terminals with the same reference characters in several of the different FIGS. of the drawings which will hereafter be described

MULTIPLEX GATES

As previously indicated, there are seven multidigit decimal numbers stored and represented in binary code notation. These are the numbers X and Y indicative of the X and Y commands (see FIG. 6$b$); the correction number N indicative of the correction distance established by the adjustment or setting of the selected adjuster device (see FIG. 8); the adjusted command numbers X' and Y' indicative of the modified or adjusted desired positions along the X and Y axes (see FIG. 9); and the actual position numbers XP and YP which are indicative of the actual positions of the movable elements along the X and Y axes (see FIGS. 17 and 18). In order that these numbers may be treated in successive pairs by the adder-subtracter 105 (FIG. 26), the timing signal source 107 (FIG. 9) is associated with multiplex gates 106 shown generally in FIG. 5$a$.

These multiplex gates 106 are illustrated in more detail by FIGS. 21$a$—$e$. In general, there are 20 gate units GTA8——GTE1, each corresponding to one bit of a coded binary representation for a five place number. All such gate units receive the timing signals appearing on the terminals T$a$, T$b$, T$c$, T$d$.

The gate units GTA8, GTA4, GTA2, GTA1, GTB8, GTB4, GTB2 and GTB1 shown in block form in FIGS. 21$a$ and 21$b$ are all substantially identical to the gate unit GTA8 which is illustrated in more detail by FIG. 20. As there shown, the gate unit GTA8 includes four gates 450, 451, 452, 453 respectively connected to receive as inputs the binary signal on the terminals XA8 (FIG. 6$b$), X'A8 (FIG. 9), YA8 (FIG. 6$b$) and Y'A8 (FIG. 9). Such gates are enabled in sequence by the timing signals received from the terminals T$a$, T$b$, T$c$, T$d$ and their outputs pass through a common OR circuit 454, to a single terminal GA8 which forms one input to a compare block CPA8. Thus, during four successive periods within each successive cycle of the timing signal source 107 signals representing the A digit, eight-bit of the X-axis command number X, the X-axis adjusted command number X', the Y-axis command number Y, and the Y-axis adjusted command number Y' are applied to the terminal GA8 of the compare block.

The gate unit GTA8 further includes gates 455 and 456 connected to receive the XPA8 and YPA8 signals, respectively, from the devices FIGS. 17 and 18) which store and represent the actual position numbers XP and YP. These latter two gates are enabled in response to timing signals appearing on the terminals T$b$ and T$d$, respectively. The gates 455 and 456 have their output terminals coupled through an OR circuit 458 to a common terminal HA8 which constitutes a second input for the compare block CPA8 in FIG. 20. Thus, it will be seen that during the second and fourth time periods of each successive cycle of the timing signal source 107 the binary values of the XPA8 and YPA8 number bits will be applied to that terminal HA8.

The gate units GTA4 through GTB1 (FIGS. 21$a$ and 21$b$) are identical to the gate unit GTA8, except that the former receive as inputs the binary signals representing the A4, A2, A1, B8, B4, B2 and B1 bits of the several different stored numbers X (FIG. 6b), X' (FIG. 9), Y (FIG. 6b), Y' (FIG. 9), XP (FIG. 17) and YP (FIG. 18).

Figure 21C:
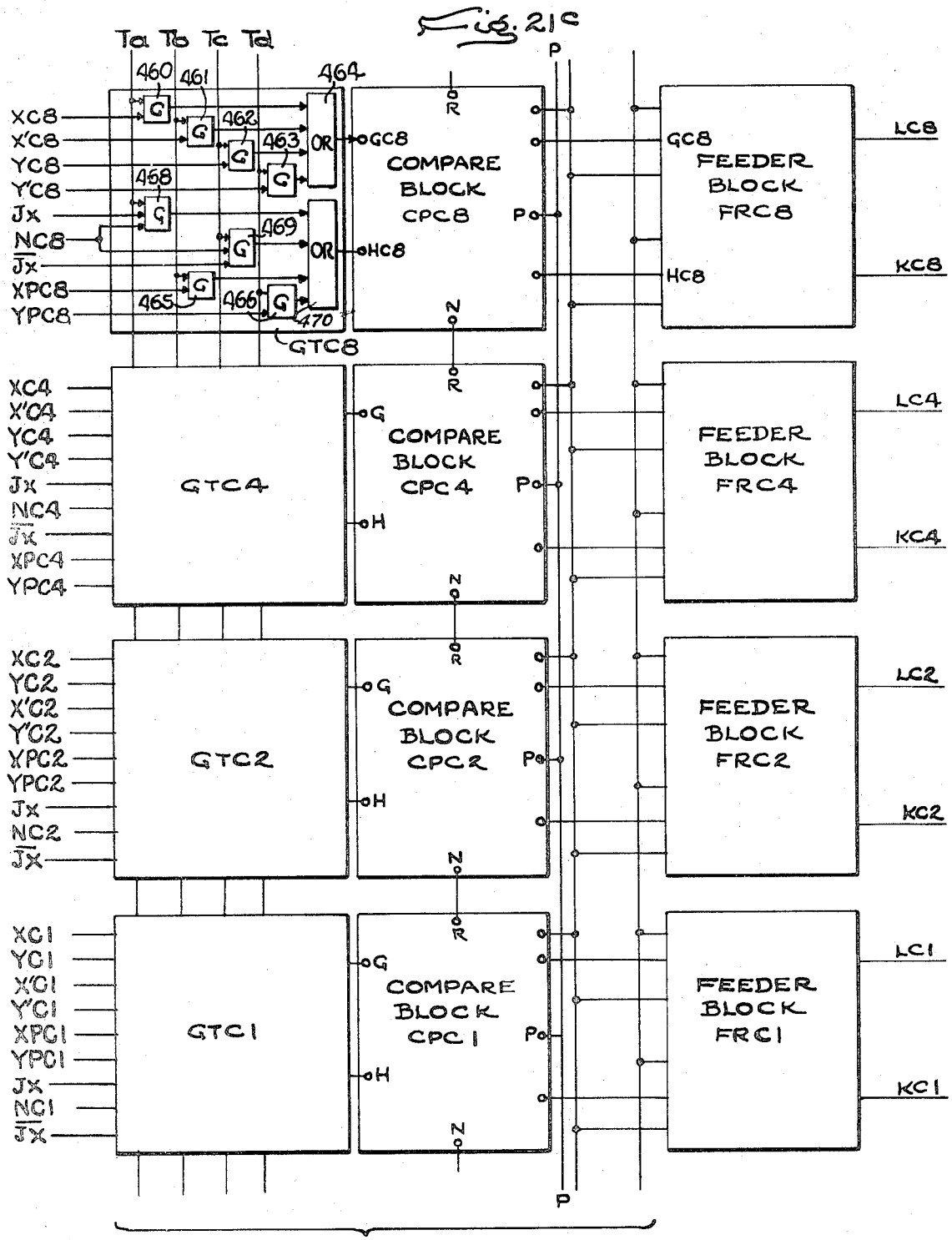
Figure 21D:
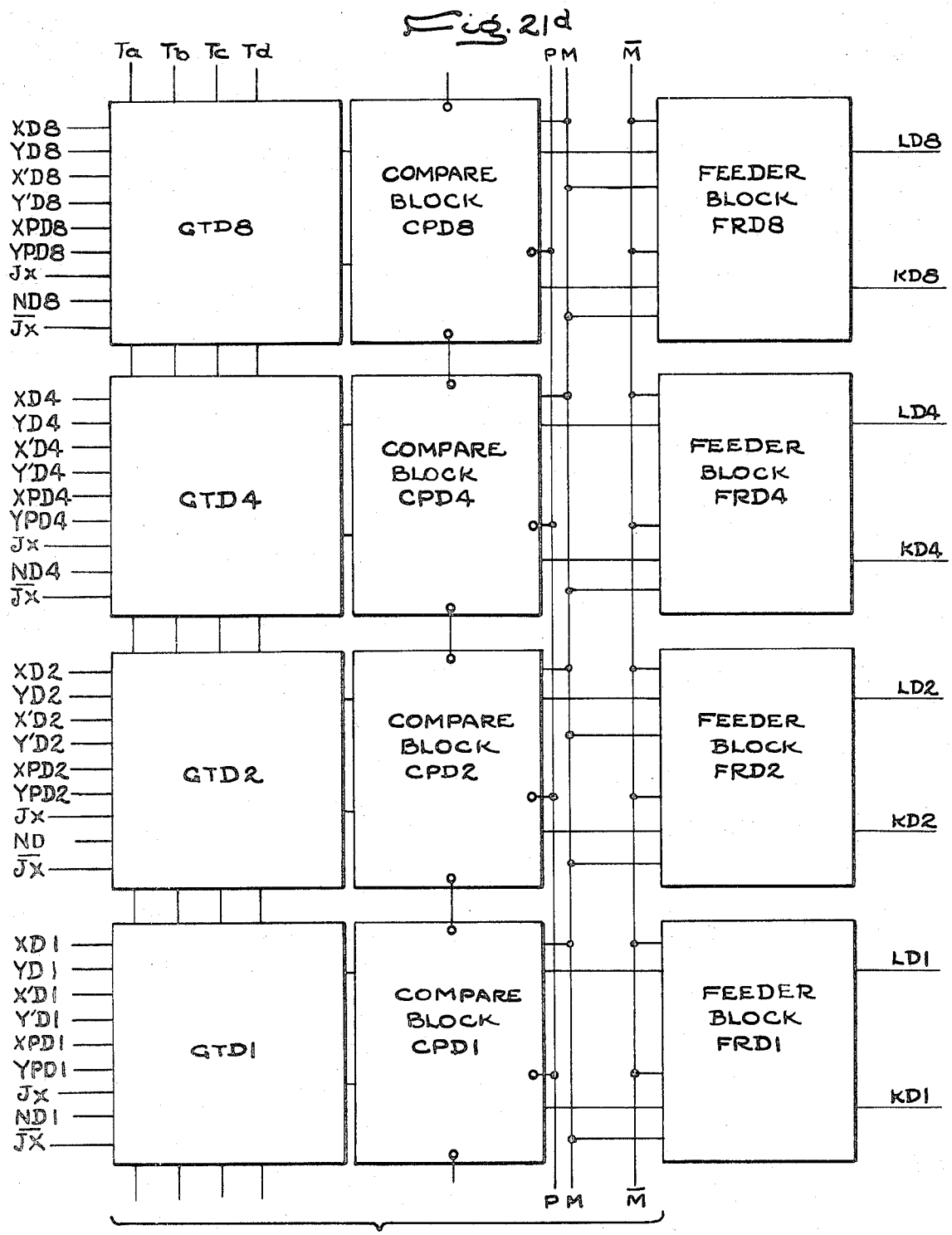

The gate units GTC8 through GTC1 differ slightly from those for higher order bits. As shown in FIG. 21c, the gate unit GTC8 has four gates 460, 461, 462, 463 respectively enabled during the time periods Ta, Tb, Tc, Td and connected to receive as their other inputs the XC8, X'C8, YC8 and Y'C8 binary signals. These four gates transmit their outputs one at a time through a common OR circuit 464 to a single input terminal GC8 for an associated compare block CPC8. In addition, the gate unit GTC8 has gates 465 and 466 enabled by signals from the timing source terminal Tb and Td and receiving inputs XPC8 and YPC8. To this extent, the gate unit GTC8 is like the gate unit GCA8. However, the unit GTC8 includes two gates 468 and 469 which are enabled by timing signals appearing on the terminals Ta and Tc, and which receive the same binary bit NC8 as an input. It will be seen, however, that the gates 468 and 469 also have inputs connected respectively to the Jx and $\overline{Jx}$ terminals in FIG. 7, so that the gate 468 is effective only if the stored selection code is in the J50 series or the J70 series and the signal Jx is a binary 1 to indicate that the correction adjustment is for the X-axis. If the signal Jx is a binary 0 and $\overline{Jx}$ is a binary 1, the stored J code is not in the 50 or 70 series, indicating that the connector adjustment is for the Y axis. The four gates 465, 466, 468, 469 all have their outputs connected through an OR circuit 470 to the common H input terminal of an associated compare block. This means, then, that different successive pairs of binary bits will be applied to the terminals GC8 and HC8 of that compare block during the four successive time periods measured off during each cycle of the timing signal source.

The gate units GTC4, GTC2, GTC1 and GTD8 through GTD1 are all constructed in substantially the same way as the gate unit GTC8. Thus, these latter units need not be described in further detail.

Figure 21E:
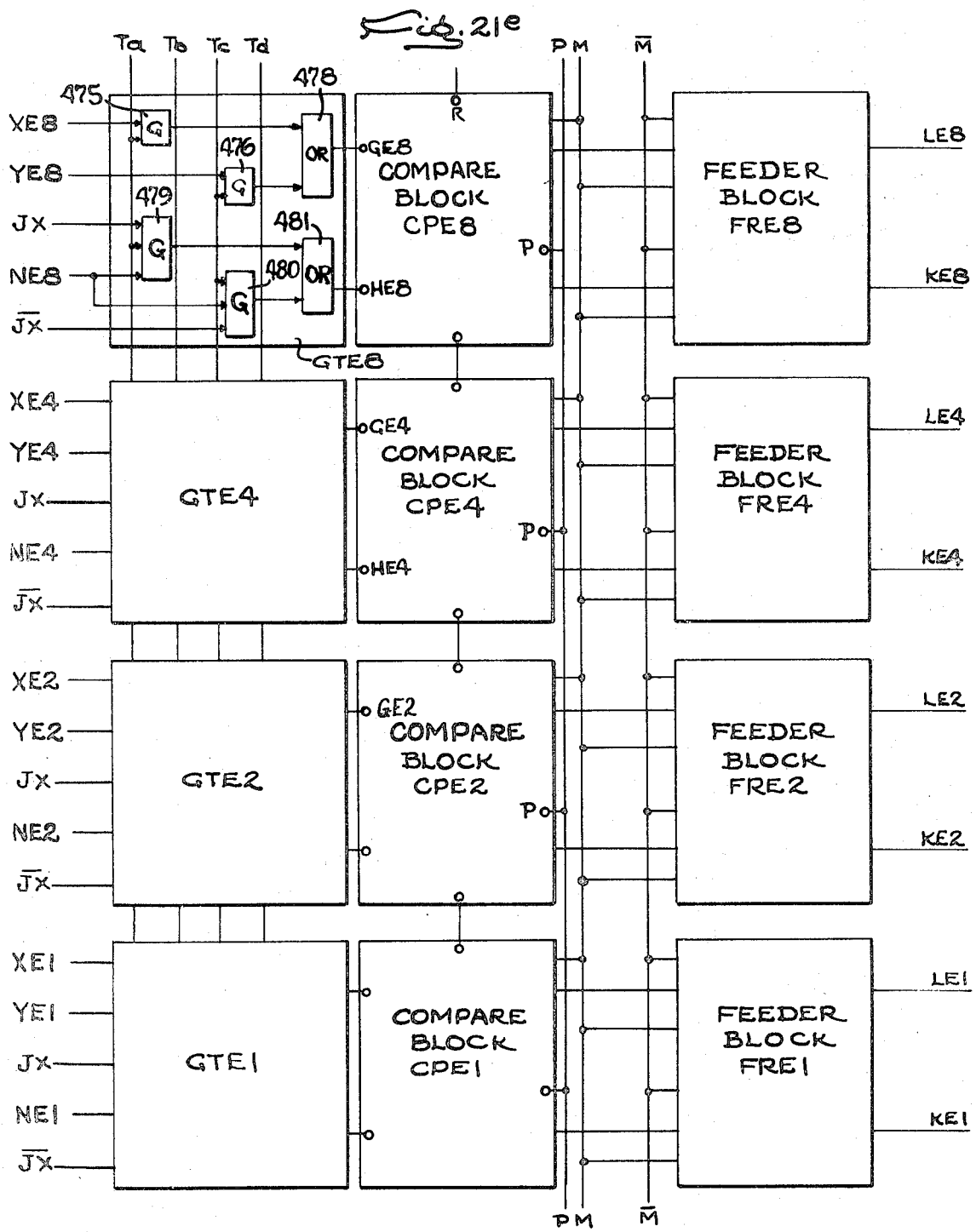

Referring to FIG. 21e, the gate units GTE8, GTE4, GTE2 and GTE1 are all identical, but they differ slightly from those gate units previously described. As shown specifically with reference to the gate unit GTE8, it comprises first and second gates 475 and 476 respectively enabled by signals appearing on the Ta and Tc terminals and respectively connected to receive binary signals representing the XE8 and YE8 bits of information. Thus, during the first and third time intervals within a complete cycle of the timing signal source, the gates 475 and 476 respectively transfer through an OR circuit 478 the XE8 and YE8 bits (from the storage terminals in FIG. 6b) to a common terminal GE8 for an associated compare block.

The gate unit GTE8 further includes gates 479 and 480 each controlled by three inputs. These latter gates are respectively enabled by timing signals appearing on the Ta and Tc terminals, and they are respectively enabled only when Jx or $\overline{Jx}$ signals are supplied to them from FIG. 7 (i.e., when the stored code is the 50 or 70 series). During these intervals, the gates 479 and 480 will transfer the NE8 bit of information through a common OR circuit 481 to the input terminal HE8 of an associated compare block. The gate units GTE8 and those units GTE4, GTE2, GTE1 identical to it are somewhat simpler then the gate unit GTC8 inasmuch as they are never called upon to selectively transmit the bits in the lowest order or E decimal place of the adjusted command numbers X' and Y' and the actual position numbers XP and YP. This will become more apparent from the description which follows below.

Bearing in mind the organization of the several gate units shown in FIGS. 21a through 21e, it will be apparent that these gate units have input terminals which are connected to receive the binary coded representations of all of the stored numbers. That is, there are 20 bits associated with each five-digit decimal number represented in four-bit binary codes, and there is one gate unit for each such bit of numerical information. As the timing signal source goes through each complete cycle of producing successive timed pulses on the terminals Ta, Tb, Tc, Td, the gate units transfer to the two sets of input terminals G and H of each associated compare block the binary signals which correspond in decimal order and bit place for two of the stored numbers. Referring, for example, to the gate unit GTC8 shown in FIG. 21c, during the first time period when a signal is present on the terminal Ta, the XC8 bit is transferred via gate 460 to the terminal GC8 of the associated compare block CPC8. During this same period of time, and assuming the Jx terminal is at a binary 1 level, the gate 468 will transfer the NC8 bit of information to the terminal HC8 associated with the same compare block.

During the second time period when a signal appears on the terminal Tb, the gate 461 will transfer the X'C8 bit to the associated terminal GC8 while the gate 465 will transfer the XPC8 bit to the associated terminal HC8.

During the third period measured off by the timing signal source, the gate 462 will transfer to the associated terminal GC8 the YC8 bit, while at the same time the gate 469 will transfer to the associated terminal GC8 the NC8 bit if at that time the $\overline{Jx}$ signal is a binary 1. Finally, during the fourth time period when the terminal Td has a signal thereon, the gate 463 will transfer the Y'C8 bit to the associated G terminal, and the gate 466 will transfer the YPC8 bit to the terminal HC8.

In overall result, therefore, the multiplexing gates cooperating with the timing signal source operate to supply successive pairs of multidigit decimal numbers represented in binary code successively and simultaneously to two pairs of input terminals, the latter having been designated G and H in all of the compare blocks of FIGS. 21a—e. That is, during one of the receiving time intervals a first multidigit decimal number represented by 20 binary bits is applied to all of the G terminals, and a second multiplace digital number represented by 20 binary bits is applied to all of the H terminals. These same two numbers are fed as inputs to the adder-subtracter of FIG. 26, as will be explained more fully below. Then, as the timing signal source measures off the next time interval, two other multidigit decimal numbers will be applied respectively to the G and H terminals of the compare blocks and these will then be supplied as inputs to the adder-subtracter of FIG. 26.

COMPARING APPARATUS

The outputs of the multiplex gates 106 are passed through a compare apparatus 108 (FIG. 5b) and thence through a feeder 109 to the full adder-subtracter 105. The compare apparatus 108 produces an output signal M which is indicative of whether the number applied to the G terminals of the compare apparatus by the multiplex gates is less than the number applied to the H terminals of the compare apparatus. Such an M signal, or the lack of it, controls the operation of the feeder 109; and the M signal, or lack thereof, is utilized by other components of the system in a way which will be latter described.

In order to determine which of the five decimal place, 20 bit numbers represented by signals transferred through the multiplex gate units and applied simultaneously to the G and input terminals, respectively, is the larger, the compare apparatus 108 is constructed to include 20 compare blocks here labeled CPA8 through CPE1 (FIGS. 21a—e). Each such block corresponds to one-bit place in the binary coded representation of a five place decimal number. The next-to-last alphabetical letter in the reference character for each compare block designates a decimal digit place according to the notation A.BCDE heretofore employed, and the suffix numeral indicates the weight or value of the particular bit place in which that compare block is employed. As illustrated, there is a connection from the N terminal of each compare block to the R terminal of the next lower order bit place compare block, and all of the compare blocks illustrated in FIGS. 21a—e are identical in their organization and operation.

As exemplary of all of the compare blocks CPA8 through CPE1, the block CPA8 is shown in detail by FIG. 20, having G and H input terminals (specifically, GA8 and HA8) which receive their inputs from the corresponding gate unit GTA8. This compare block includes four triple-input gates 490, 491, 492, 493 which are connected, as shown, directly or through inverting NOT circuits 495 and 496 to receive the binary signals applied to the terminals G and H. All four of these gates are disabled unless a binary 1 signal is applied to a control terminal R leading to one input of each gate. If the control terminal R receives a binary 0 signal, then the whole compare block CPA8 is disabled, because none of the four gates 490- —493 can then transmit or pass a binary 1 signal.

From inspection, therefore, it will be seen that if an enable or binary 1 signal is applied to the R terminal (and such a signal is permanently applied to the terminal R of the particular block CPA8 shown in FIG. 20), then the gate 490 will produce a binary 0 or a binary 1 signal on its output terminal M only if the input G bit signal is less than the input H bit signal, i.e., when the received G bit is a 0 and the recieved H bit is a 1. Under any other conditions, the output of the gate 490 applied to the terminal M will be a binary 0, indicating that the bits supplied to the terminals G and H are equal or that the former is greater than the latter.

On the other hand, the gate 491 supplies a binary 1 signal to its output terminal P only if the received G bit value is greater than the received H bit is a 0. The gates 492 and 493 have their outputs connected through an OR circuit 498 to a common terminal N. The truth table (assuming an enabling binary 1 signal is applied to the R terminal) for the signal which appears on the N terminal is thus:

TABLE VII

| G | H | N |
|---|---|---|
| 0 | 0 | 1 |
| 1 | 0 | 0 |
| 0 | 1 | 0 |
| 1 | 1 | 1 |

Stated another way, there is a binary 1 signaled on the N terminal of the compare block CPA8 only if the binary signals received on the G and H input terminals are the same. By contrast, a binary 0 is signaled on the N terminal if the bit value signaled on the G and H input terminals are unlike.

Therefore, if the binary value of the bit applied to the G terminal of the compare block CPA8 is less than the value of the bit applied to the H terminal, a binary 1 will appear on the terminal M and a binary 0 will appear on the terminal N. If those two bit values are equal, a binary 0 will appear on the terminal M and a binary 1 will appear on the terminal N. If the received bit on terminal G is greater than that received on the terminal H, a binary 0 will appear on the terminal M, and a binary 0 will appear on the terminal N.

The several compare blocks CPA8 through CPE1 are connected so that the N terminal of each one supplies a control signal to the R terminal of the next lower order compare block, as shown in FIGS. 21a—e. This means that if the comparison which takes place in the compare block CPA8 reveals inequality of the binary values signaled on terminals G and H, and thus a binary 1 or 0 will be signaled on the terminal M, then a binary 0 will appear on the terminal N and be transferred to the terminal R of the next lower order compare block CPA4. That binary 0 applied to the terminal R of the latter compare block will disable it completely and cause it to produce a binary 0 on its N terminal, thereby disabling all of the succeeding lower order compare blocks. Thus, whenever any of the several compare blocks senses a condition of inequality between the two bit values applied to its input values G and H, all of the lower order compare blocks will be completely disabled. The highest order compare block which is not disabled will signal either a binary 1 or a binary 0 on its output terminal M, and those signals will respectively indicate that the number represented on all of the G terminals is either (a) equal to or greater than the number represented on all of the H terminals (i.e., M = 0), or (b) less than the number represented on all of the H terminals (i.e., M ≠). Those compare blocks which are higher in their bit place orders than the lowest order enabled compare block will produce binary 0 signals on their M output terminals, but this will be of no significance because the 20 compare blocks CPA8 through CPE1 have their M terminals all connected together by a common conductor 500. Thus, the compare apparatus functions to compare the two multidigit decimal numbers respectively represented by signals on (a) the 20 G terminals (hereinafter called G numbers) and (b) the 20 H terminals (hereinafter called H numbers) by comparing the bit values at the first or highest order bit place where equality of the two compared bits does not occur. If the highest order bit place where equality does not occur signals a binary 1 on its M terminal (and thus on the conductor 500), then it is known that the G number is less than the H number. Conversely, if the highest order bit place where equality does not occur signals a binary 0 on its M terminal (and thus the conductor 500 remains at a binary 0 level), then it is known that the G number is not less than (but on the contrary it is either equal or greater than) the H number.

As shown in FIG. 21a, the conductor 500 is connected through a NOT circuit 501 to a conductor 502. Thus, the compare apparatus as a whole operates to produce the following indication of the relative magnitudes of the multidigit numbers represented by signals supplied to all of the G and H terminals: If the G number is less than the H number, then the signal M on the conductor 500 is a 1 and the signal $\overline{M}$ appearing on the conductor 502 is 0; and if the G number is equal to or greater than the H number, the signal M applied to the conductor 500 is a zero, and the signal $\overline{M}$ applied to the conductor 502 is a binary 1. These signals indicating the relationship of magnitudes between the two G and H numbers applied to all compare blocks are utilized in a manner which will become clear as the description proceeds.

THE FEEDER APPARATUS

The feeder 109 (FIG. 5b) is controlled by M and signals from the compare apparatus 108 such that the selected pair of numbers to be added or subtracted are transmitted to the adder-subtracter 105 with the larger number always signaled on one particular set of adder input terminals (the L terminals in FIG. 26) and the smaller number signaled on the other set of input terminals (the K terminals in FIG. 26).

To accomplish this, the feeder 109 is made up of 20 feeder blocks FRA8 through FRE1 (FIGS. 21a—e), there being one such block for each bit place in a coded binary representation of a five-place decimal number. All of these feeder blocks are identical, and a detailed description of the feeder block FRA8 will suffice for all.

As shown in FIG. 20, the input terminals GA8 and HA8 for the compare block CPA8 are connected directly to input terminals GA8 and HA8 in the feeder block FRA8. In other words, the binary signals for G and H numbers transmitted through the gate unit GTA8 are received and utilized not only in the associated compare block CPA8, but they are also applied directly as input signals to the associated feeder block FRA8. It will thus be seen that the GA8 signal is applied to the inputs of gates 510 and 511, while the HA8 signal is applied as inputs to two gates 512 and 513. In addition, the gates 511 and 512 are controlled by inputs from the line 500, so as to receive an M signal; and the gates 510 and 513 have control inputs connected to the line 502 so as to receive the $\overline{M}$ signal. The gates 510 and 512 have their outputs connected through an OR circuit 515 to an output terminal LA8; and the gates 511 and 513 have their outputs connected through an OR circuit 516 to an output terminal KA8.

In operation, if the G number received through the multiplex gates is equal to or larger than the H number, then the M signal on line 500 will be a binary 0 and the signal on line 502 will be a binary 1, as previously explained. This disables the gates 511 and 512, while enabling the gates 510 and 513. Under these conditions, the input signal on terminal GA8 (whether it is a binary 0 or 1) will be, in effect, transmitted through the gate 510 and the OR circuit 515 to the terminal LA8; and the binary signal on terminal HA8 (whether it is a 0 or a 1) will, in effect, be transmitted through the gate 513 and the OR circuit 516 to the output terminal KA8.

On the other hand if the G number received through the multiplex gates is less than the H number, the compare apparatus will make the M signal on the conductor 500 a binary 1, and the $\overline{M}$ signal on the conductor 502 a binary 0. This will disable the gates 510 and 513, but it will enable the gates 511 and 512. Thus, under these conditions, the binary signal on the input terminal GA8 will be transmitted through the gate 511 and the OR circuit 516 to the terminal KA8; and the binary signal on the input terminal HA8 will be transmitted through the gate 512 and the OR circuit 515 to the terminal LA8. In overall result, therefore, the feeder block FRA8 operates under the control of the compare apparatus to transfer signals received on its G and H input terminals to the L and K output terminals, respectively, only if the G number transmitted by the multiplex gates is equal to or greater than the H number. Conversely, if the G number is less than the H number, the feeder block FRA8 transmits the signals received on its G and H terminals respectively to its K and L output terminals.

All of the compare blocks FRA8 through FRE1 (FIGS. 21a—e) operate in this same manner. They are controlled by the M and $\overline{M}$ signals on conductors 500 and 502 so that the number transmitted by the multiplex gate units GTA8 through GTE1 and appearing on all of the G terminals is transmitted to all of the L output terminals, and the H number transmitted by the multiplex gate is transferred to all of the K output terminals, providing the G number is equal to or greater than the H number. Conversely, if the G number appearing on all of the compare block G input terminals is less than the H number signaled on all of the compare block H input terminals, then the feeder blocks operate to transfer the G number representations to the output terminals KA8 through KE1, and to transfer the H number representing signals to the output terminals LA8 through LE1.

All the terminals LA8 through LE1 are connected with and identical to the correspondingly labeled terminals at the left portion of FIG. 26; and all of the output terminals KA8 through KE1 shown at the right in FIGS. 21a—e are connected with and identical to the correspondingly labeled terminals in the left portion of FIG. 26. Thus, whenever two numbers are transmitted to the respective sets of L and K input terminals for the full adder-subtracter of FIG. 26, the number which is the larger in value will be signaled on the L input terminals and the smaller number will be signaled on the K input terminals. As a result, the adder-subtracter always functions properly in its subtract mode of operation, treating the number on the L set of input terminals as the minuend, and the number represented on the K set of input terminals as the subtrahend.

ADD-SUBTRACT CONTROL

As indicated previously, the adder-subtracter 105 shown in FIG. 26 operates either in an add or a subtract mode in response to a binary 1 or 0 signal applied to its main control terminal D. Under various conditions and depending upon the signs of the two numbers supplied as inputs to the adder-subtracter 105, the latter must be caused to either add or subtract.

This control function is served by an add-subtract control 520 (FIG. 5a) responsive to sign signals applied thereto for creating the proper control signal on the D terminal of the adder-subtracter.

Referring to FIG. 23a, the add-subtract control 520 as there shown includes four time multiplexing gates 521—524 sequentially enabled one at a time in response to signals applied thereto from the timing signals source terminals Ta, Tb, Tc, Td. The outputs of these gates pass through a common OR circuit 525 to the terminal D, the latter being the same as that appearing in FIG. 26. The four gates 521—524 receive their main inputs from four respective OR circuits 531—534 associated with logic units 535—538, respectively.

The logic unit 535 operates to determine whether adding or subtracting takes place in the adder-subtracter 105 when a correction number N is being algebraically combined with an X command number (during the time period when the terminal Ta signal enables the gate 521) to compute an adjusted command number X'. As will be more fully explained, the sign of the correction distance number N along the X axis is positive when a binary 1 appears on the J5* terminal in FIG. 7, and it is negative when a binary 1 appears on the J7* terminal. The sign of the X command number is positive or negative when a binary 0 or 1 appears on the terminal XM in FIG. 6b. These same terminals connect as shown in FIG. 23a to the inputs for the logic unit 535, and the latter operates as a means (a) to cause addition when the sign of the command-position number X is the same as the sign of the X axis correction distance number N, and (b) to cause subtraction when the sign of the X number is different from the sign of the N number.

As here shown, the X command sign XM is applied directly to the input of a gate 540 and through an inverting NOT circuit 541 to an input of a second gate 542. The second inputs of the gates 540 and 542 receive the J7* and J5* signals, respectively. These two gates have their outputs connected to the OR circuit 531. From inspection, it will be understood that the logic unit 535 operates according to the following truth table:

TABLE VIII

| Sign of X No. | XM | $\overline{XM}$ | Sign of corr. No. | J5* | J7* | OR output | Mode produced |
|---|---|---|---|---|---|---|---|
| + | 0 | 1 | + | 1 | 0 | 1 | ADD. |
| + | 0 | 1 | − | 0 | 1 | 0 | SUBTR. |
| − | 1 | 0 | + | 1 | 0 | 0 | SUBTR. |
| − | 1 | 0 | − | 0 | 1 | 1 | ADD. |

Thus, whenever the signs of the X-axis commands and an X-axis correction distance are alike, the terminal D (FIGS. 23a and 26) will receive a binary 1 signal during the time interval Ta, and will cause the adder-subtracter 105 to add the X and N numbers supplied to its two sets of input terminals L and K. On the other hand, when the signs of the X-axis command and the X-axis correction distance are unlike, the terminal D will receive a binary 0 during the Ta intervals, causing the adder-subtracter 105 to subtract the larger of the X and N numbers from the smaller.

The logic unit 536 determines whether addition or subtraction should take place when the adjusted command number X' and the actual position number XP are simultaneously fed to the adder-subtracter 110 during the time intervals Tb. This logic unit includes gates 545 and 546 connected to the X'M sign terminal (from FIG. 9) and the XPM sign terminal (from FIG. 17) directly and through NOT circuits 548 and 549, as shown. The outputs of these two gates are connected to the OR circuit 532. From inspection, the operation of the logic unit 536 will be seen to agree with the following truth table:

TABLE IX

| Sign of X' No. | X'M | $\overline{X'M}$ | Sign of XP No. | XPM | $\overline{XPM}$ | OR output | Mode produced |
|---|---|---|---|---|---|---|---|
| + | 0 | 1 | + | 0 | 1 | 0 | SUBTR. |
| + | 0 | 1 | − | 1 | 0 | 1 | ADD. |
| − | 1 | 0 | + | 0 | 1 | 1 | ADD. |
| − | 1 | 0 | − | 1 | 0 | 0 | SUBTR. |

From the foregoing table, it will be clear that the logic unit 536 (which is effective only during the T$b$ time periods when the gate 522 is enabled) causes the adder-subtracter 105 selectively to (a) add the X' and XP numbers if their signs are unlike, and (b) subtract the X' and XP numbers if their signs are alike. Such algebraic combination results in the sum or difference number signaled on the adder-subtracter output terminals SA8—SE1 (FIG. 26) to accurately represent the error distance which separates the actual position of the movable element or table 58 from the desired adjusted position.

The logic units 537 and 538 are similar in their organization and operation to the units 535 and 536, respectively. They function during the time periods when the terminals T$c$ and T$d$ enable the gates 523 and 524 to cause the addition or subtraction of (a) and Y and N numbers, and (b) the Y' and P numbers, by producing the proper binary signal on the control terminal D. It may be noted with reference to the logic unit 537, however, that it receives an indication of the sign of the correction distance number N from the N— terminal (FIG. 8) and the latter is at a binary 0 or 1 level depending upon whether the sign selection switch or the selected adjuster is open or closed.

SIGNALING THE SIGN X AXIS CORRECTION DISTANCES

If the cutting tool 60 (FIG. 1) carried by the rotating spindle during execution of certain blocks of an overall program is a milling cutter, the programmer will, of course, assume and designate that the cutter has a certain diameter, say 2 inches. In utilizing the punched tape prepared to numerically designate a program, the machine tool operator will choose and insert into the spindle (for use during operation in accordance with those certain blocks) a milling cutter which has a diameter of 2 inches, or perhaps less than 2 inches if the cutter has been worn and resharpened. In no case would there be any reason for the machine operator to employ a cutter having a diameter greater than that assumed and designated by the programmer.

In accordance with one feature of the present invention, the control system here illustrated makes it possible to signal correction distances dialed into a selected adjuster as an absolute number, and the proper sign of that number, i.e., the sense of the correction distance is automatically derived from the program data and properly signaled to compensate for a cutter diameter which is less than that assumed by the programmer. This enables the same magnitude of correction to be dialed into a single adjuster and that same adjuster to be rendered effective to produce the same correction in a positive or negative sense during the execution of several program blocks involving the same cutter. In this way, diameter corrections can be accomplished for a given number or different cutters with only half as many adjusters as would otherwise be required.

To achieve this advantage, one group of adjusters to be employed for X-axis cutter diameter corrections is made "common" to two groups or series of selection codes. For example, 10 adjusters 93 may be assigned selection codes of "J50 or J70" to "J59 or J79," only two such adjusters 93 (51 or 71) and 93 (58 or 78) being shown for the sake of brevity in FIG. 8. As previously explained with reference to FIG. 7, if any selection code J50 to J59 in the "fifty series" is applied to and read from a given block of the punched tape, this will be represented by a signal on that one of the ten terminals "J50 or J70" to "J59 or J79" which corresponds to the value of the last digit place in the selection code. If any selection code J70 to J79 in the "70 series" is read and stored, this will be represented by a signal on one of the same ten terminals "J50 or J70" to "J59 or J79" which corresponds to the value of the last digit place in the code. Thus, if a J58 code is read and stored, the adjuster 93 (58 or 78) in FIG. 8 will be rendered effective to signal the correction number N; and if a J78 code is read and stored, the same adjuster 93 (58 or 78) will be rendered effective.

Now, the "J" letter in any selection code is an address which signifies that the two suffix numerals are to determine which of several adjusters is to be rendered effective. For cutter diameter corrections along the X-axis, the first numeral following the "J" is an auxiliary code which can have one of two values, e.g. 5 or 7. Either such value signifies that the correction dialed in to the selected adjuster is to be along the X-axis. The second numeral following the "J" is a primary selection code since it designates the particular one of the several adjusters from among the group of 10, 93 (50 or 70) to 93 (59 or 79) all not being shown in FIG. 8, which is to be rendered effective.

In the practice of the invention, the auxiliary code value, 5 or 7, included in any 50 or 70 series selection code is utilized to designate the sign of the correction number which is represented in magnitude by the setting of the selected adjuster. It is for this reason that the decoder 98 in FIG. 7 includes the J5* and J7* terminals which receive binary 1 signals thereon only in response to the stored J code being in the 50 or 70 series, respectively. A binary 1 on the J5* terminal (and thus a binary 0 on the J7* terminal) is treated as indicative of the fact that the effective correction number N signaled on the terminals at the bottom of FIG. 8 is positive. Conversely, a binary 1 on the terminal J7* (and thus a binary 0 on the terminal J7*) is treated as indicative of the fact that the effective correction number N signaled on the terminals at the bottom of FIG. 8 is negative. Therefore, when an X-axis correction is to be made, the selected adjuster in the 93 "fifty or seventy" group (only two of which are shown in FIG. 8) has no sign switch for the operator to set; on the contrary, the sign of the N number is electrically signaled on the J5* and J7* terminals—and it can be either positive or negative. Such sign information is utilized during the timing periods T$a$ (when the X and N numbers are being combined to compute the adjusted command number X') as heretofore and hereafter explained.

With this system, therefore, the programmer needs only to realize that all X-axis corrections for program blocks utilizing a given rotating cutter can be effected by a J code which renders the same adjuster effective. For example, to produce X-axis corrections to compensate for a given reduced diameter cutter, the programmer will always insert either a J58 or a J78 selection code, and the one selector 93 (58 or 78) will be effective during the execution of any block containing either of those codes. If one of those blocks involves machining by the cutter as the workpiece and table 58 move toward (or after they have moved toward) the right to reach a precise position, then the correction distance for a reduced diameter cutter must be positive, and the programmer will insert the J58 code to so indicate. If one of those blocks involves machining by the cutter as the workpiece and table 58 move relative to the cutter toward (or after they have moved toward) the left to reach a precise position, then the correction distance for a reduced diameter cutter must be negative, and the programmer will insert the J78 code to so indicate. The programming technician will, of course, know the direction of movement of the table 58 and the workpiece to reach a precise position relative to the cutter along the X-axis during each positioning operation which involves machining with a given cutter.

A specific example will make this operation clear. Suppose a programmer has designated a 2.000 inches diameter milling cutter to be used during certain blocks of a program. Assume that the cutter actually selected by the machine operator is 1.998 inches in diameter. If positioning of the table in a negative direction to a commanded position of +1.2345 inches is carried out, the cutter periphery will be located 0.001 inches further to the left (relative to the workpiece) than the programmer intended, and the location of the machined surface will be in error by 0.001 inches. To enable correction, the programmer inserts a J78 code into that particular program block. The adjuster 93 (58 or 78) in FIG 8 will thus be rendered effective, and the operator will dial in a correction of N= 0.001 inches. Now, when the positioning operation is effected, the N number will be treated as negative, so the table 58 will be moved to an adjusted position of +1.2335 inches, i.e., 0.001 inches further to the left, and the work surface will be machined in the proper location on the workpiece.

On the other hand, if positioning of the table according to another block of information is to be obtained by table movement toward the right to a commanded position of +2.6780 inches, the programmer will insert the code J58 into that block on the punched tape. The adjuster 93 (58 or 78) will be rendered effective, and the same correction number N = 0.001 inches previously set into that adjuster will be signaled. Because of the J58 code, however, this correction number will be treated as positive, and the table will move to an adjusted position of +2.6790 inches, thereby correctly compensating for the fact that the cutter radius is 0.001 inches less than originally assumed by the programmer.

In net result, therefore, one adjuster serves to produce the same correction needed for all positioning motions involving the same cutter. And the operator need not select or set the sign of the correction number since that is designated by the programmed selection codes.

This feature of automatically signaling the proper sign for cutter diameter corrections, and reducing the quantity of required adjusters to half that which otherwise would be necessary to provide corrections for a given number of cutters, has here been shown only in connection with the X-axis portion of the system. It will be apparent, however, that the same system may be utilized for additional axes.

Referring again to FIG. 7, it will be seen that whenever an X-axis correction is to be made, and either a J50 series or J70 series selection code is stored, one or the other of the inputs to the OR circuit 234 will be 1, and a binary 1 signal will appear on the terminal Jx. If a correction is to be made along the Y-axis, then a binary 0 signal will appear on the terminal Jx. This terminal and output terminal $\overline{Jx}$ of an associated NOT circuit are connected as inputs to certain ones of the gate units in FIGS. 21c—e, as noted above, so that the correction number N (signals on the N terminals at the bottom of FIG. 8) is combined either with the X command number (during the timing intervals Ta) or with the Y command number (during timing intervals Tc). It will be understood that if desired, the apparatus here shown by way of example may be expanded so that two separate correction numbers are stored and combined with the X and Y command numbers, respectively, so as to provide for corrective adjustments along both the X- and Y-axes, during execution of a single block of positioning data.

COMBINING X AND N NUMBERS TO COMPUTE AND STORE X' NUMBERS

With reference to the gate unit GTC8 in FIG. 21c, it will be recalled that during the first time period Ta measured off during each cycle of the timing source 107, the gate 460 is enabled and the gate 468 is partially enabled. If the block of data previously read and stored from the punched tape contained a J50 or J70 series selection code, so that a 1 signal appears on the Jx terminal (FIGS. 7 and 21c), the gate 468 is fully enabled. The signals on the terminals XC8 and NC8 are thus transferred through the gate unit GTC8 to the input terminals GC8 and HC8 of both the compare block CPC8 and the feeder block FRC8. This same operation takes place relative to the storage terminals XC4 to XE1 (FIG. 6b) and NC4 to NC1 (FIG. 8) since those terminals reappear in FIGS. 21c—e as inputs for the gate units GTC4 to GTE1. The correction number N includes digits only in the C, D, E decimal places, so that the gate units GTA8 to GTB1 (FIGS. 21 a, b) do not need to have N number inputs. However, the binary bits XA8 to XB1 do pass through the corresponding gate units and feeder blocks to the associated L or K terminals of the adder-subtracter. Thus, when a correction has been programmed for the X-axis, and the time periods Ta are rapidly and repeatedly measured off, the X command and N correction numbers are routed to the L and K sets of input terminals in FIG. 26.

Also, during each Ta period, the add-subtract control 520 in FIG. 23a supplies the proper signal to the D control terminal in FIG. 26, so that the adder-subtracter 105 either adds or subtracts the X and N numbers. The sum or difference number appears on the S output terminals at the right in FIG. 26, and these same 20 output terminals SA8 to SE1 are permanently connected to those which are correspondingly labeled in FIG. 9. As a result, when the short "operate" pulses Tas (see FIG. 9a) appear during each Ta period, the sum signals representing the adjusted command position number X' are applied through multiplace gates 573 (FIG. 9) to the adjusted storage decades X'A, X'B, X'X, X'D, X'E. Each such S terminal is connected directly and also through a NOY circuit to two respective gate sections which lead to the set and reset terminals of a flip-flop (not shown) in the associated storage decade. As a result, each flip-flop within each storage decade is either set or reset to its 1 or 0 state to agree with the binary bit data which appears on the corresponding one of the terminals SA8 through SE1.

In summary, the apparatus here described operates during the recurring Ta time intervals to perform the computation X ± N = X', where each of the numbers is a multidigit decimal number represented in binary code. The sum or difference number X' is gated from the output of the adder-subtracter 105 in FIG. 26 into the X' storage device of FIG. 9, and it is then permanently signaled on the terminals X'A8 to X'E1 until such time that a new X' number is gated into the same storage device.

ADJUSTED COMMAND SIGN DETERMINATION

The system here described includes means to determine and store the sign of the sum or difference number X' when the latter is computed and stored in the storage device 99 of FIG. 9. For this purpose, an adjusted storage sign determination apparatus 550 (FIG. 5a) responds to command and correction sign signals, and to the relative magnitude signal M from the compare apparatus, and signals the proper sign of the adjusted command numbers X' and Y'.

The determination of the sign of the adjusted command number is complicated by the fact that command numbers X or Y may be either positive or negative; correction numbers N may be either positive or negative; and the correction distance number N may be either greater or less than the command number X or Y.

To take examples, if the X command position is +1.2345 inches and the correction distance is either (a) +0.2000 inches or (b) −0.2000 inches, then the X' number computed and stored will be (a) +1.4345 inches or (b) +1.0345 inches. In this case where the N number is less than the X number, the sign of the X' number is made the same as that of the X number, regardless of the sign of the N number.

On the other hand, if the X number is +0.0500 inches and the correction distance is either (a) +0.0800 inches or (b) −0.8000 inches, then the X' number must be either (a) +0.1300 inches or (b) −0.0300 inches. In this case where the N number is greater than the X number, the sign of the X' number is made the same as that of the X number if the X and N signs are alike, or it is made as that of the N number if the X and N signs are unlike.

The adjusted sign determining apparatus 550 of the present invention, as shown in FIG. 26a, includes two substantially identical sections 550a and 550b which respectively determine and signal the proper sign for the computed X and Y axis adjusted command numbers X' and Y'. The section 550a utilized in connection with the X-axis control has input terminals XM, M, and J7* (these latter three terminals being connected to the correspondingly labeled terminals in FIGS. 6b, 21e, and 7). The XM terminal is at a binary 0 or 1 level if the stored X number is positive or negative. The M terminal is at a binary 0 or 1 level (during timing intervals Ta) if the X number is respectively greater or less than the N number, as determined by the comparing apparatus described above. And the J7* terminal is at a binary 0 or 1 level if the N number for X-axis correction is positive or negative, for reasons explained above. These three input signals are applied directly or through NOT circuits 552, 553, 554, as shown, to the inputs of three gates 558, 559, 560; and the outputs of the latter are passed through an OR circuit 561 to an X' SIGN terminal. The latter signals a positive or negative sign for the X' number when it is at a 0 or 1 binary level, respectively.

From inspection of the section 550a in FIG. 26a, it will be seen that the gate 558 and the input connections thereto constitute means for signaling the X' sign as negative (binary 1) if the X and N signs are both negative. The rest of the apparatus forms means to signal the X' sign as positive (binary 0) if both the X and M signs are positive.

In addition, the gate 559 and the inputs thereto form means to signal the X' sign as negative if the X number is negative and greater than the N number (i.e., M = 0); whereas the apparatus as a whole signals the X' sign as positive if the X sign is positive and the X number is greater than the N number.

Finally, the gates 560 and the inputs thereto constitute means for signaling the X' sign as negative if the N number sign is negative and the N number is greater than the X number (i.e., M = 1). The apparatus as a whole signals the X' sign as positive if the N sign is negative and the N number is less than the X number.

These means included within the sign determination section 550a can best be understood by inspection with reference to the following truth table which shows the various conditions under which the X' sign will be signaled as positive or negative:

TABLE X

| Comm. No. X Sign | XM | $\overline{XM}$ | Correction No. N sign | J7* | $\overline{J7*}$ | X less than N? | M | $\overline{M}$ | X' sign signal | X' sign |
|---|---|---|---|---|---|---|---|---|---|---|
| + | 0 | 1 | + | 0 | 1 | Yes | 1 | 0 | 0 | + |
| − | 1 | 0 | + | 0 | 1 | Yes | 1 | 0 | 0 | + |
| + | 0 | 1 | − | 1 | 0 | Yes | 1 | 0 | 1 | − |
| − | 1 | 0 | − | 1 | 0 | Yes | 1 | 0 | 1 | − |
| + | 0 | 1 | + | 0 | 1 | No | 0 | 1 | 0 | + |
| − | 1 | 0 | + | 0 | 1 | No | 0 | 1 | 1 | − |
| + | 0 | 1 | − | 1 | 0 | No | 0 | 1 | 0 | + |
| − | 1 | 0 | − | 1 | 0 | No | 0 | 1 | 1 | − |

To summarize the contents of table X, the sign determination section 550a in FIG. 26a operates as:

1. Means to signal the sign of the X' number as being the same as the sign of the X number when the signs of X and N are the same;
2. Means to signal the sign of the X' number as being the same as the sign of the X number whenever the X number is greater than the N number (i.e., whenever the compare apparatus produces no signal response and thus indicates that M = 0); and
3. Means to signal the sign of the X' number as being the same as the sign of the N number when the X number is less than the N number (i.e., whenever the compare apparatus produces a signal response, so that M = 1).

The X' sign signal (binary 0 or 1) appears on the X' sign terminal in FIG. 26a at all times, and it will change immediately when any of the input signals XM, M and J7* change. In order to store the X' sign signal at the proper instants when it is valid (i.e., when the M signal is based upon a comparison of X and N numbers during the time intervals Ta), the X' sign terminal is connected, as shown in FIG. 9, (a) through a NOT circuit 570 and a gate 571 to the reset terminal R of the sign storage flip-flop 240, and (b) through a gate 572 to the set terminal S of the same flip-flop. The gates 571 and 572 are enabled only by the Tas pulses (see FIG. 9a) during Ta timing periods, and will then cause the flip-flop 240 to be set or reset to its 0 or 1 states if the X' sign terminal is then at a binary 0 or 1 level. In this way, the sign of the X' number is stored and signaled as positive or negative by a binary 0 or 1 potential on the flip-flop terminal X'M.

The adjusted sign determination apparatus 550b illustrated in FIG. 26a is substantially identical to that section 550a previously described, except that it serves to determine the proper sign for the Y axis adjusted command number Y'. Accordingly, it will suffice simply to note that the sign determination section 550b has an output terminal Y' sign which is connected to the similarly labeled terminal in FIG. 9 so as to set the sign storage flip-flop 241 to the proper state whenever a pair of gates 574 and 576 are enabled by the appearance of the short pulse Tcs during the Tc timing intervals. It may be noted with reference to FIG. 26a that the sign of the N number representing a correction distance along the Y-axis is applied to the section 550b from the N− terminal which appears in FIG. 8 in association with the correction distance number N storage apparatus. Such sign is selected by the operator to be positive or negative by leaving open or closing the sign selection switch Ss of the effective adjuster 93 (21) or 93 (11) When a binary 1 level appears on the N−terminal, it indicates that the correction distance number N for the Y-axis direction is negative. Except for this specific difference in the way the sign of the correction distance is supplied to the sections 550a and 550b, the latter are organized and operate in precisely the same manner so as to produce and signal an indication of the sign of adjusted command numbers X' and Y'; respectively.

COMBINING X' AND XP NUMBERS TO COMPUTE X -AXIS ERROR

It will be recalled from the previous description of the gate units GTA8 to GTE1 (FIGS. 21a−e) that, during the time periods Tb, the signals on the terminals X'A8 to X'E1 in FIG. 9 (representing the stored X' number) are transmitted as inputs to one of the two sets of input terminals L and K of the adder-subtracter 105 (FIG. 26). During each such Tb time period, the actual position XP number represented on the terminals XPA8 to XPD1 (FIG. 17) is transmitted as input signals to the other set of the adder-subtracter input terminals. The proper control signal is transmitted from the add-subtract control 520 (FIG. 23a) to the control terminal D in FIG. 26. Thus, during each timing period Tb (and these periods recur at a very rapid rate), the adder-subtracter 105 in FIG. 26 performs the computation X' ± XP = Xrr, where Xrr is a number representing the error distance between the adjusted desired position and the actual position of the movable element or table 58. Thus, during each time period Tb the error number Xrr is represented on the adder-subtracter output terminals SA8 through SD1 (FIG. 26).

Because the actual position number XP is stored and represented to four place accuracy A.BCD, it is not necessary for the gate units, compare blocks, and feeder blocks associated with the E digit place (see FIG. 21e), nor for the E digit-place portion of the adder-subtracter (FIG. 26), to take part in this calculation.

The error number Xrr is transferred to the switch point determination device 110 (FIG. 5b) which is shown in more detail by FIGS. 27a and 27b. The Xrr number is utilized to control the motion of the table 58 in a way to reduce the error toward zero, as hereinafter explained. It will be understood, of course, that as the actual position number XP dynamically changes when the table 58 is moving, the error number Xrr will also dynamically change.

COMBINING Y AND N NUMBERS TO COMPUTE Y' NUMBERS

During the recurring time intervals Tc, the gate units GTA8 through GTE1 (FIGS. 21a−e) selectively transmit to one set of the adder-subtracter input terminals the signals on the storage terminals YA8 and YE1 (FIG. 6b); and they transmit to the other set of such adder-subtracter input terminals the signals on the storage terminals NC8 to NE1 (FIG. 8). Thus, during the timing intervals Tc, the adder-subtracter 105 of FIG. 26 performs the computation $Y \pm N = Y'$, where Y is a five digit Y-axis command number, N is a three-digit correction distance number, and Y' is a five-digit adjusted command number. During the intervals Tc when the number Y' is signaled on the adder-subtracter output terminals SA8 to SE1 (FIG. 26), the gates associated with the Y'storage decades 100 (FIG. 9) are opened by short enabling signals received from the timing source terminal Tcs. Thus, the storage device 100 is set to store and signal on its output terminals Y'A8 to Y'E1 the adjusted command number Y'. At the same time, the adjusted sign determination section 550b (FIG. 26a) signals on the Y SIGN terminal the sign of the Y' number, and this is stored by the flip-flop 241 (FIG. 9) and signaled on the Y'M terminal, as previously explained.

COMBINING Y' AND YP NUMBERS TO COMPUTE THE Y AXIS ERROR

During the time periods Td, the gate units GTA8 to GTD1 (FIGS. 21a—d) transmit the stored Y' number represented on the terminals Y'A8 to Y'E1 (FIG. 9) as input signals to one set of the input terminals of the adder-subtracter 105 (FIG. 26). During each such Td time period, the actual position number YP represented on the terminals YPA8 to YPD1 (FIG. 18) is transmitted as input signals to the other set of the adder-subtracter input terminals. A control signal is transmitted from the add-subtract control 520 (FIG. 23a) to the control terminal D in FIG. 26. Thus, during each time period Td, the adder-subtracter 105 in FIG. 26 performs the calculation $Y' \pm YP = Yrr$, where Yrr is a number which represents the error distance between the adjusted desired position and the actual position of the movable element or saddle 55 along the Y-axis. It will be understood that the time periods Td recur at an extremely high rate, and that during each such period the error number Y rr is represented on the adder-subtracter output terminals SA8 through SD1 (FIG. 26).

Inasmuch as the Y-axis actual position number YP is stored and represented to four place accuracy A.BCD, it is not necessary for the gate units, compare blocks, and feeder blocks for the E digit place (FIG. 21e), nor for the E digit-place portion of the adder-subtracter, to take part in this calculation.

The Yrr number is transferred to the switch point determination device 110 FIG. 5b which is shown in more detail by FIGS. 27a and 27b. Such rapidly recurring representations of the Yrr number are utilized to control the movement of the saddle 55 toward the desired position which is represented by the Y' number, and it will be understood that as the saddle 55 is moving, both the actual position number YP and the error number Yrr will dynamically change.

SIGNALING THE REDUCTION OF POSITION ERRORS TO PREDETERMINED VALUES (SWITCH POINTS)

So long as the X or Y axis digital errors Xrr or Yrr are greater than a predetermined value, the elements movable along the X- and Y-axis are driven toward the adjusted command positions X' or Y', so that the actual position numbers XP and YP are changed (by the digital feedback, previously described) to reduce the error numbers Xrr and Yrr. It will be explained more fully below how such drive of the movable elements is initiated and controlled so that the velocity of movement is progressively reduced as the errors are progressively reduced to successive predetermined values.

In accordance with one feature of the present invention, means are provided to signal when the X and Y axis errors are reduced below first predetermined distances or values. For this purpose, the output terminals SA8-SD1 of the adder-subtracter 105 are permanently connected to the correspondingly labeled terminals of a switch point determining device 110 which is illustrated generally in FIG. 5b and shown in more detail by FIGS. 27a and 27b. That portion of the apparatus shown in FIG. 27a serves to indicate when the X- and Y-axis error numbers Xrr and Yrr are reduced below a predetermined distance or "switch point" value which, in the example to be described, is 0.2800 inches. As shown in FIG. 27a, the switch point determining device 110 includes six error compare blocks ECB2, ECB1, ECC8, ECC4, ECC2(a), and ECC1(a). The latter are identical in organization and operation to the compare block CPA8 previously described with reference to FIG. 20, and it will therefore be unnecessary to describe the individual compare blocks shown in FIG. 27a. There is a connection from the N terminal of each compare block in FIG. 27a to the R terminal of the next lower bit place block, and the M terminals of all such compare blocks are connected to a common conductor 600. Stated in general terms, the compare blocks function to produce a binary 1 signal on the conductor 600 only when the X or Y error number Xrr or Yrr is reduced below a predetermined value or distance which is predetermined and selected by the setting of a switch point storage device 111 here shown as comprising six manually operated switches SVB2, SVB1, SVC8, SVC4, SVC2(a), and SVC(a).

The first compare block ECB2 has its R terminal connected to receive the output of an OR circuit 601 through a NOT circuit 602. The OR circuit has input terminals SA8-SB4 (which connect to those corresponding terminals in FIG. 26). Thus, whenever the computed number represented on the output terminals of the adder-subtracter 105 is equal to or greater than 0.4000, will be a "1" output from the OR circuit 601, and a "0" input to the R terminal of the compare block ECB2, and all of the compare blocks in FIG. 27a will be disabled. A binary 0 will therefore appear on the conductor 600. When, however, the output number signaled by the adder-subtracter is less than 0.4000, a binary 1 will be applied to the R terminal of the compare block EBC2, and all of the compare blocks in FIG. 27a will then function to compare the relative magnitudes of the two numbers represented by signals supplied respectively to their G and H terminals.

As here shown, the first such number supplied to the G terminals is that represented by signals on the SB2 to SC1 output terminals of the adder-subtracter. The second such number is a predetermined switch point distance number represented and stored by the states of the six switches in the switch point storage device 111. These switches all selectively connect a −12 volt source (representative of a binary 1) 604 (see FIgG.27b) to respective ones of the H terminals for the six compare blocks in FIG. 27a. Depending upon which of these switches are closed, they will apply in binary code to the H terminals signals which represent any decimal number between $x.39xx$ and $x.00xx$, where the x's are indeterminate and not signaled. In the present illustration, the two switches SVB2 and SVC8 are shown in their closed positions, so that the decimal number applied in binary form to the H terminals is $x.28xx$.

Now, while the S terminals shown at the left in FIG. 27a receive all output number representations from the adder-subtracter, those of interest and those which are utilized include only the Xrr and Yrr numbers, as will be hereinafter made clear. For this reason, all but the Xrr and the Yrr output numbers signaled by the adder-subtracter 105 will be ignored.

In the operation of FIG. 27a, therefore, the error compare blocks are disabled and a binary 0 is signaled on the conductor 600 unless the error number Xrr or Yrr signaled on the S terminals is less than 0.4000 inches. Even then, the compare blocks will produce a binary 0 on the conductor 600 unless the Xrr or Yrr number applied to their G terminals is less then the switch point number of 0.2800 inches which is, in effect, signaled on their H terminals. In other words, the apparatus of FIG. 27a compares the Xrr or the Yrr number and it signals an M in the form of a binary 1 potential on the conductor 600 when and only when the error number is less than predetermined value which in the present example represents an error distance of 0.2800 inches. This signifies that the elements movable along the X- or Y-axes, respectively, have approached to within less than 0.2800 inches of the adjusted desired positions represented respectively by the X' and Y' numbers.

The elements movable along the X- and Y-axes may have to move through different distances to reach their respective adjusted desired positions, and they do not necessarily move in unison. Therefore the table 58 might reach the first switch point distance of 0.2800 inches at a time different from that at which the saddle 55 reaches its first switch point. In order to individually signal when the elements movable along the two respective axes come within the first predetermined or "-switch point" distances of their adjusted desired positions, the terminal 600 is associated with time multiplexing gates and the switch point signaling flip-flops. More specifically, the conductor 600 is connected directly to one input of a gate 610 and through a NOT circuit 611 to a second gate 612. These latter two gates receive as their second inputs the timing pulses which appear on the terminal T$bs$ of the timing signal source 107. The output of the gate 610 connects to the set terminal S of a flip-flop 614, while the output of the gate 612 connects to the reset terminal R of that same flip-flop. Thus, during the time intervals T$b$ and when the short "operate" pulses appears on the terminal T$bs$ (refer back to FIG. 9$a$), the gates 610 and 612 will be enabled. If the compare blocks of FIG. 27$a$ are at that time signaling a binary 0 on the terminal 600 (thereby indicating that the X-axis error distance X$rr$ is greater than 0.280 inches) a binary 1 signal will be applied to the $\overline{M}$ input of the gate 612 and the latter will supply an output to reset the flip-flop 614. As a result, the output terminal labeled $\overline{XSP1}$ will signal a binary 1 (and the terminal XSP1 and a binary 0), thus signifying that the first switch point distance has not been reached. On the other hand, if at those instants when a short pulse appears on the terminal T$bs$ the conductor 600 has a binary 1 signaled thereon (indicating that the error number X$rr$ is less than the predetermined value of 0.2800 inches), the gate 610 will pass an output signal to the set terminal S of the flip-flop 614, setting the latter and producing a binary 1 signal on its output terminal XSP1. Thus, the flip-flop 614 responds solely to the X-axis error X$rr$, and it produces a binary 0 and 1 on the terminals XSP1 and $\overline{XSP1}$, respectively, so long as the X-axis error is greater than the first predetermined switch point value. On the other hand, as soon as the X-axis error X$rr$ is reduced below the predetermined value of 0.2800 inches, this is signaled by the flip-flop 614 producing a binary 1 on the terminal XSP1 and a binary 0 on the terminal $\overline{XSP1}$.

As shown in FIG. 27$a$, the apparatus includes gates 610, 612, as well as a flip-flop 614 which are controlled by the short "operate" timing pulses which appear on the terminal T$bs$. These components operate in exactly the same way as the gates 615, 616 and the flip-flop 617, except that the latter respond to the timing pulses on the terminal T$ds$ during the time period T$d$ when the adder-subtracter 105 is producing on its output terminals signals which represent the Y-axis error number Y$rr$. Thus, so long as the Y-axis error distance Y$rr$ is less than a first predetermined value (in this example 0.2800 inches), the terminal YSP1 will be at a binary 0 level and the terminal $\overline{YSP1}$ will be at a binary 1 level. Conversely, as soon as the Y-axis error Y$rr$ is reduced below that predetermined value, this is signaled by a binary 1 appearing on the terminal YSP1, and a binary 0 appearing on the terminal $\overline{YSP1}$, and a binary 0 appearing on the terminal $\overline{YSP1}$.

The apparatus appearing on FIG. 27$b$ is in general similar to that shown and described with reference to FIG. 27$a$, except that it functions to signal when the X-and Y-axis error distances are reduced to a second smaller predetermined value which will here be called the second switch point. In FIG. 27$b$ the switch point determination apparatus 110 includes six error compare blocks ECC2($b$), ECC1($b$), ECD8, ECD4, ECD2, and ECD1. The G terminals of these six compare blocks receive the signals appearing on the output terminals SC2, SC1, SD8, SD4, SD2, SD1 of the adder-subtracter; and the H terminals of these error compare blocks receive binary signals which represent a second predetermined switch point distance established by closing different combinations of six switches SVC2($b$), SVC1($b$), SVD8, SVD4, SVD2, and SVD1. The M terminals of all of the error compare blocks in FIG. 27$b$ are connected to a common conductor 620 which will receive a binary 0 or 1 potential thereon when the X and Y error numbers X$rr$ and Y$rr$ are respectively greater or less than the second predetermined switch point value.

The R terminal of the first compare block ECC2($b$) is connected to receive the output of an OR circuit 621 (FIG. 27$a$) through a NOT circuit 622. The inputs to the OR circuit 621 are constituted by the output of the OR circuit 601 and the signals appearing on the terminals SB2, SB1, SC8, and SC4. In a manner analogous to that explained above in connection with the OR circuit 601, the R terminal of the compare block ECC2($b$) will receive a binary 1 potential only if the output number signaled by the adder-subtracter is less than 0.0400 inches. Unless the X- or Y-axis is reduced below that value, all of the compare blocks in FIG. 27$b$ will be disabled and the conductor 620 will reside at a binary 0 level.

However, once the error number signaled on the output terminals of the adder-subtracter 105 is reduced below .0400 inches, then the compare blocks in FIGS. 27$b$ function to signal when the error number is reduced below a second switch point value. In the present instance, the predetermined second switch point value is 0.0180 inches, as established by closure of the switches SVC1($b$), SVD8, SVD4, SVD2, and SVD1. In other words, the number applied to the H terminals of the several compare blocks in FIG. 27$b$ is $x.x$18$x$, $x$,and a binary 1 will be signaled on any M terminal of one of the compare blocks only if the error number represented by signals applied to the G terminals of those compare blocks is less than 0.0180 inches. When, however, the number signaled on the G terminals of the compare blocks is less than the predetermined number signaled on the H terminals of the compare blocks, a binary 1 signal will appear on the conductor 620.

The apparatus of FIG. 27$b$ includes gates 610$a$, 612$a$, 615$a$, 616$a$ which correspond in organization and function to the four gates 610, 612, 615, 616 previously described with reference to FIG. 27$a$. Also, the apparatus of FIG. 27$b$ includes two flip-flops 614$a$ and 617$a$ which function in the same manner as the flip-flops 614, 617 described with reference to FIG. 27$a$. Thus, it may be briefly stated that during those time intervals T$b$ of the timing signal source, the flip-flop 614$a$ will be set or reset if the X-axis error distance X$rr$ is less than or greater than a second predetermined switch point distance (here shown by way of example as 0.0180 inches). The terminals XSP2 and $\overline{XSP2}$ will be at binary 0 and 1 levels if the X-axis error is greater than the second switch point, or they will respectively be at the binary 1 and 0 levels if the X-axis error is less than such second switch point.

Correspondingly, during each time interval T$ds$ when the adder-subtracter 105 is signaling the Y-axis error Y$rr$, the flip-flop 617$a$ will be set or reset to its proper state, so that the terminal YSP2 will reside at a binary 0 or 1 potential whenever the Y-axis error distance is greater than or less than the predetermined second switch point value. The terminal $\overline{YSP2}$ will be complementally placed at a 1 or 0 level when the error is greater than or less than the second predetermined switch point value.

The switch point signaling terminals XSP1, $\overline{XSP1}$, YSP1, $\overline{YSP1}$, XSP2, $\overline{XSP2}$, YSP2, $\overline{YSP2}$ shown at the left in FIGS. 27$a$ and 27$b$ connect to the apparatus shown in FIGS. 28 and 29 and produce control effects which will later be described.

DIGITAL SLOWDOWN CONTROL

It will be assumed for the moment, and later explained, that so long as the actual position of the table 58 and saddle 55 along the X- and Y-axes differ from the adjusted command positions X' and Y', the X- and Y-axis motors 68 and 86 are energized to drive the table 58 and saddle 55 in the proper direction to reduce the distance error to zero. In keeping with one aspect of the present invention, the velocity of the table 58 or the velocity of the saddle 55 is made relatively high when the position error is great, but these velocities are progressively reduced as the error reaches and falls below one or more predetermined values called "switch points." This function is served in part by the X- and Y-axis slowdown networks 114 and 115 (FIG. 5b) which respond to the switch point determination apparatus described above with reference to FIGS. 27a and 27b.

The X-axis slowdown network 114 as shown in more detail by FIG. 28 controls the energization of the clutch coils Xca, Xcb, and Xcc in the multispeed transmission Tx (see FIG. 2 and Table I). This slowdown network includes three gates 630—632 each of which has one input terminal connected to the X RUN output terminal of a flip-flop 634. Thus none of these gates 630—632 is enabled until a complete block of information has been received from the punched tape and a signal appears on the EB terminal (see FIGS. 6a and 28) to set the flip-flop in its 1 state.

Once a complete block of information has been read and an EB signal from FIG. 6a has set the flip-flop 634 in FIG. 28, and the positioning motion of the table and saddle have begun, the gate 630 receives a binary 1 on its XSP1 input terminal, and produces a 1 on its output terminals so long as the X-axis error Xrr exceeds the first predetermined switch point value. Under these conditions the gates 631 and 632 produce no binary 1 output signals.

When, however, the first switch point has been reached, but the second switch point has not yet been reached, the gate 631 produces a binary 1 output, and the gates 630, 632 produce binary 0 outputs. Finally, when the second switch point has been reached but a third switch point XSP3 (sensed and signaled in a way to be explained) has not yet been reached so there is a 1 on the terminal XSP3, then the gate 631 produces a binary 1 output, and the gates 630, 632 produce binary 0 outputs.

The three gates 630—632 all have their outputs connected to an OR circuit 636 which acts through an amplifier 638 to control the energization or deenergization of the clutch coil Xca. A second OR circuit 639 receives as its two inputs the outputs of the gates 630 and 631, and it controls through an amplifier 640 the clutch coil Xcb. A third OR circuit 641 receives the output only from gate 630, and acts through an amplifier 642 to control the coil Xcc.

Assuming for convenience of explanation that the first switch point distance is 0.2800 inches and that the second switch point distance is 0.0180 inches, it will be seen with reference to table I, supra, that so long as the X-axis error number Xrr is greater than 0.2800 inches all three clutch coils Xca Xcb, Xcc will be energized and the table 58 will be translated along the X-axis at an exemplary velocity of 128 i.p.m. Then, after the first switch point is reached, only the clutch coils Xca, and Xcb will be energized, and the table 58 will be moved at a velocity of 8 inches per minute until the second switch point is reached. When the X-axis error is reduced below the second switch point value of 0.0180 inches, only the gate 632 will produce a 1 output, and only the coil Xca will be energized, so that the velocity at which the table is driven will be reduced to a value of 2 i.p.m. Thereafter, and for reasons to be explained below, when the third switch point is reached and the output of the gate 632 becomes zero, all three of the clutch coils Xca Xcb, Xcc will be deenergized, and the X-axis transmission Tx will drive the table at its lowest velocity of 1 inch per minute.

This progressive slowdown in the velocity of the table as it approaches an adjusted desired stopping position prevents overshoot beyond the desired position due to the mass and inertia of a heavy movable element such as the table 58. In this way, the time delays and inaccuracies of overshooting a desired stopping point and cycling thereabout are reduced.

The apparatus illustrated in FIG. 28 is substantially duplicated to produce progressive slowdown of the element which is driven along the Y-axis as the Y-axis error is progressively reduced below predetermined switch point values. Thus, the Y-axis slowdown network 115 is shown in FIG. 29 simply in block form as controlling the Y-axis transmission clutch coils Yca, Ycb, Ycc, it being understood that the apparatus in FIG. 29 is in detail substantially like that of FIG. 28 except that it controls the motions and velocities of the saddle 55 along the Y-axis.

MOTION DIRECTION CONTROL

As noted above, as long as the X-axis error or the Y-axis error is not substantially zero, then the X- or Y-axis motors 68 or 86 will be energized so as to drive the movable elements 58 or 55 to reduce those errors. The velocities at which those motions are effected are controlled by the X- or Y-axis transmissions Tx or Ty, and as the latter are controlled by the slowdown networks 114 and 115. However, it is necessary to determine the direction in which the corrective movement of the table 58 or the saddle 55 occurs, since under various conditions of operation it might be necessary to have the table or saddle driven either in a positive or negative direction along the X- or Y-axis in order to move toward the adjusted command position.

To control the energization and deenergization of the X- and Y-axis motors 68 or 86, the X and Y direction and stopping controllers 138 and 139 (FIG. 5b) are employed, but these controllers need to have information supplied to them which indicates whether the motors must be energized in a forward or a reverse direction in order to produce the movement which will reduce the distance error numbers Xrr and Yrr toward zero.

This function is served by a motion direction control shown generally at 650 in FIG. 5a and illustrated in detail by FIG. 30. Referring to the latter FIG., the motion direction control 650 includes upper and lower portions utilized for signaling the direction of corrective motion along the X- and Y-axes, respectively. As shown, the direction-determination apparatus for the X-axis has input terminals connected to receive the M and $\overline{M}$ signals (from the compare apparatus of FIGS. 21a—e); the XPM signal (from FIG. 17) which represents the sign of the actual position number XP; and the signal which appears on the X'M terminal (from FIG. 9) to represent the sign of the adjusted command number X'. The signals appearing on these input terminals are applied, as shown, to the inputs of three gates 651—653, and all of the gate outputs are passed through a common OR circuit 655 to a terminal 656. The output from the terminal 656 is transferred directly to the input of a gate 658, and through a NOT circuit 659 to the input of a gate 660. These two gates are both enabled by the short "operate" pulse which appears on the timing source terminal Tbs during the Tb time periods, i.e., when the compare apparatus of FIGS. 21a—e and the adder-subtracter of FIG. 26 is receiving the X' and XP numbers to compute the X error number Xrr.

It will be recalled from what has been said before that the M signal will be a binary 1 if the comparison apparatus detects that the adjusted command number X' is less than the actual position number XP. Moreover, the signal on the terminal X'M will be a binary 1 if the sign of the adjusted command number X is negative; and the signal on the XPM terminal will be a binary 1 if the sign of the dynamically stored and represented actual position number XP is negative. The apparatus of FIG. 30 functions to produce a binary 0 or a binary 1 signal on the terminal 656 when the sensed conditions require that the table 58 be moved in a positive or negative direction, respectively, in order to reduce the X-axis distance error toward zero.

The operation of the X-axis direction determination apparatus as shown in FIG. 30 may be most expeditiously described by the following truth table for the gates 651—653 and the OR circuit 655.

It will be seen from inspection of FIG. 30 and Table XI that the gate 651 and the inputs thereto constitute means for signaling a binary 1 on the terminal 656 (and thus calling for a negative direction of motion) when desired position X' is negative (X'M =1), the actual position XP is negative (XPM = 1), and the X' number is greater than the XP number (M = 0 and $\overline{M}$ = 1). The gate 652 and the inputs thereto constitute means for signaling a binary 1 on the terminal 656 (and thus

TABLE XI

| Case: | Sign of X' | Sign of XP | X' less than XP? | X'M | $\overline{X'M}$ | XPM | $\overline{XPM}$ | M | $\overline{M}$ | Term. 656 | Motion direction |
|---|---|---|---|---|---|---|---|---|---|---|---|
| I | + | + | Yes | 0 | 1 | 0 | 1 | 1 | 0 | 1 | − |
| II | − | + | Yes | 1 | 0 | 0 | 1 | 1 | 0 | 0 | − |
| III | + | − | Yes | 0 | 1 | 1 | 0 | 1 | 0 | 1 | + |
| IV | − | − | Yes | 1 | 0 | 1 | 0 | 1 | 0 | 0 | + |
| V | + | + | No | 0 | 1 | 0 | 1 | 0 | 1 | 0 | + |
| VI | − | + | No | 1 | 0 | 0 | 1 | 0 | 1 | 0 | − |
| VII | + | − | No | 0 | 1 | 1 | 0 | 0 | 1 | 1 | + |
| VIII | − | − | No | 1 | 0 | 1 | 0 | 0 | 1 | 1 | − | designating a negative motion direction) when the desired position number X' is positive (X'M = 0), the actual position number XP is positive (XPM = 0), and the X' number is less than the XP number (M +1). Finally, the gate 653 and the inputs thereto form means for signaling a binary 1 on the terminal 656 (thereby calling for a negative direction of corrective motion) when the adjusted desired position number X' is negative (X'M = 1) but the actual position number XP is positive $\overline{XPM}$ = 1). The gates 651—653 and the OR circuit 655 collectively constitute means for signaling a binary 0 on the terminal 656 (and thus indicating that corrective motion should be in a positive direction) whenever none of those three conditions set forth above obtains. Therefore, the signal determined by the apparatus of FIG. 30 and appearing on the terminal 656 correctively indicates whether the movable table 58 should be driven in a positive or negative direction (to the right or left along the X-axis) in order that the table is moved toward the desired position and the error distance is reduced toward zero.

During the timing intervals signaled on the terminal Tbs, the binary signal on the terminal 656 is routed through the gates 658 and 660 to the set or reset terminal, respectively, of a flip-flop 661. If the signal on terminal 656 is a zero, then the flip-flop 661 will be reset and its output terminal XC+ will be placed at a binary 1 potential, thereby signaling that corrective motion should be in a positive direction. On the other hand, if the signal on terminal 656 is a binary 1, the flip-flop 661 will be set to the 1 state, and a binary 1 signal will appear on its terminal XC−, thus designating that the direction of corrective motion should be negative. In effect, signals on the XC+ or XC− terminals respectively signify that the error number Xrr is negative or positive.

The direction determination apparatus shown in the lower portion of FIG. 30 is organized and operates in exactly the same way as that shown in the upper portion of the same FIG. The only difference is that the lower portion of FIG. 30 responds to the short "operate" signal which appears on the timing source terminal Tds, and thus it senses the conditions which exist during those timing intervals Td when the two inputs to the compare apparatus of FIGS. 21a—e are the Y-axis adjusted command number Y' and actual position number YP. For this reason, the various elements shown in the lower portion of FIG. 30 are identified by the same reference characters, except for the addition of the distinguishing suffix a, as those which are shown in the upper portion of FIG. 30. It will not be necessary, therefore, to further describe the lower portion of the direction determining apparatus, and it will be understood that a binary 1 signal appears on the terminal YC− when the saddle 55 must move in a negative direction, while a binary 1 signal appears on the terminal YC+ when the saddle must move in a positive direction.

DIRECTION AND STOPPING CONTROLLERS

The X-and Y-axis direction and stopping controllers 138 and 139 (FIG. 5b) serve as means responsive to the direction control signals and the switch point signals to cause the X-and Y-axis motors 68 and 86 to be energized in a forward or a reverse direction until the X-and Y-axis positioning errors have been reduced to predetermined small values (in the example given, the second switch point value). The X-axis direction and stopping controller 138 is shown in detail by FIG. 28. So long as the digital error number Xrr is greater than the second predetermined switch point value, the XSP2 input terminal for a gate 670 will be at a binary 1 level. If the direction control signal XC+ (from FIG. 30) is a 1 (indicating that the table 58 must be driven in a positive direction), the gate 670 will pass a binary 1 output signal through an OR circuit 671 to one input of a gate 672. Assuming that the gate input terminal 672a receives a binary 1 signal (as hereinafter explained) and if the X RUN input of the gate 672 also receives a binary 1 signal from the flip-flop 634 (indicating that a block of information has been read from the punched tape but the commanded positioning has not been completed), then the gate 672 will produce a binary 1 output to cause an amplifier 674 to energize the contactor coil Xfor. Thus, the motor 68 (see FIG. 2) will be energized in a forward direction to drive the table 58 in a positive direction (toward the right) along the X-axis.

On the other hand, if the direction control signal XC− from FIG. 30 is a binary 1, then the gate 670 will be disabled, and a gate 675 will be enabled so long as the computed X error number Xrr is not less than the second, lower switch point value (and the signal XSP2 is a binary 1). Under these circumstances, the binary 1 output from the gate 675 will pass through an OR circuit 676 to the input of a gate 678. If the gate 678 is enabled by an X RUN signal on its other input terminal, the output of the gate will cause an amplifier 679 to energize the contactor coil Xrev. Thus, the motor 68 (see FIG. 2) will be energized in a reverse direction to drive the table 58 in a negative direction (toward the left) along the X-axis.

Once the second switch point is reached, and the signal on the terminals XSP2 goes to 0, the gates 670 and 675 will be disabled, but gates 708, 709 will be enabled (as hereafter explained) to maintain one or the other of the contactor coils energized. In essence, so long as the second switch point has not been reached, the direction of motion of the table 58 is controlled by first and second control means which respectively include the gates 670 and 675 enabled by the XSP2 terminals and responding respectively to the XC+ or XC− signals. When the second switch point is reached, these gates are disabled, and the gates 708, 709 become responsive to analogue direction control signals XF+ and XF− to control the direction of motion.

The Y-axis direction and stopping controller 139 is identical in its organization and operation to the X-axis direction controller 138. Accordingly, the controller 139 has been illustrated only in general block form in FIG. 29, and it will be understood that it responds to the direction signals YC+ and YC−, as well as the various switch point signals YSP1, YSP1, YSP2, YSP2 so as to control the contactor coils Yfwd and Yrev associated with the Y-axis motor 86 (see FIG. 3) in a manner substantially identical to that explained in connection with the stopping controller 138 for the X-axis. Therefore, the Y-axis direction and stopping controller need not be described in further detail.

FINE ANALOGUE SYSTEM

The digital computation and feedback system as thus far described operates, in response to each block of numerical information read from a punched tape or the like, to compute an adjusted command position by adding or subtracting the correction distance dialed in to the particular one of several adjusters which is rendered effective by a selection code within the block. It then digitally computes the error between the adjusted command position and the actual position of the movable element, and in response to the numerical error representation drives the movable element along its axis so that the actual position is changed toward agreement with the adjusted command position. However, this involves digital feedback of one pulse for each increment of distance traveled. In the present instance, there is one feedback pulse for each .001 inch increment of motion. In such a digital feedback system, there is always the risk that some feedback pulses will be "lost" due to malfunction of the pulse generators or the counters which respond thereto. It is also possible that spurious feedback pulses may be "gained" due to noise induced in the various connecting conductors. In short, a digital feedback system is not completely reliable and precise for accurate final positioning, although it is advantageous in that it can, with relatively compact and simple physical components, control positions over a wide range.

In accordance with an important aspect of the present invention, the digital feedback apparatus is utilized only to bring the movable elements within a certain proximity of the adjusted command position, and a fine analogue system is then activated to carry out the final positioning and stopping of the element precisely at the adjusted command position. In this way, the disadvantages of positioning with digital control are avoided while its advantages are retained, and yet the analogue system apparatus is much smaller, less complex, and less expensive, especially in comparison to the "coarse, medium and fine" channels which have heretofore been required for a wide range analogue positioning controls.

In the embodiment here shown by way of example, the fine analogue system includes an Inductosyn position sensing and feedback device associated with each of the movable elements, i.e., the table 58 and the saddle 55, as previously mentioned and shown in FIGS. 2, 3 and 5b. It will be understood, of course, that other types of analogue position-sensing and feedback devices may be employed, one well known example being rotary induction resolvers geared to the lead screws to rotate through one revolution for each increment of distance traveled by the table or saddle.

The construction and operation of Inductosyn feedback devices are per se well known in the art, and need not be here set forth in detail. By a way of brief review, the Inductosyn device here employed as a fine position feedback element functions in response to analogue alternating excitation voltages applied to the two conductors or "windings" 124a and 124b of its slider 124 (FIGS. 2 and 5b). The excitation signals are sized in their relative amplitudes such that they represent the sine and cosine functions of a desired position, the vector sum of their amplitudes being an analogue representation of a desired position. For any given relationship of vector amplitudes of the two excitation signals, a standing field pattern is created which induces in the conductor or "winding" 125a of the scale 125, an alternating error voltage which by its amplitude and phase polarity depends upon the relative positions of the slider and scale. This induced voltage is thus an analogue representation of the error between the desired position represented by the particular amplitude relationship of the excitation signals and the actual position of the slider relative to the scale.

The positions of the slider 124 at which the scale output voltage drops to zero are called nulls, and they are spaced apart by repeating fine spans, for example, 0.050 inches. The locations of the nulls are shifted along the scale according to the vector amplitudes of the excitation signals, but only within a small range, for example, 0.050 inches. A servocontrol responsive to the analogue error signal induced in the scale will drive the movable element (and thus the slider fixed thereto) until the nearest null point is reached. Thus, it is necessary in using only a fine analogue system to bring the example ±.025 inches) of the desired final position before the analogue control system can produce precise final positioning.

In keeping with an important feature of the present invention, means are provided to create an analogue representation, variable within a limited range or repeating fine span $s$, to represent the desired position of the movable element by sensing the values of the last few digits of a digitally stored number which is indicative of the desired position. More particularly, because a command number X or Y may be modified as a result of a dialed in correction N, means are provided in the present instance to sense and convert the values of the last few digits of the adjusted command numbers X' and Y' into an analogue representation. This analogue representation is then employed to produce a fine analogue error signal which varies within a limited distance $\Delta 2$ (e.g., .050 inches or ±.025 inches from the exact null location) according to the sense and extent of the position error. The error signal is employed to control the drive of the movable element until the error is reduced substantially to zero, so that the element is stopped precisely in the adjusted command position. Yet, the entire analogue system is normally disabled and is rendered effective only after the digital control has brought the element to within a predetermined distance $\Delta 1$ of the desired position, that distance $\Delta 1$ being less than half the span distance $\lambda$ for the repeating fine analogue signal representation.

Inasmuch as the fine analogue systems for the X- and Y-axes are substantially identical in their organization and operation, that system associated with the X-axis positioning control will first be described, and it will be unnecessary to repeat in detail a description of the Y-axis analogue system.

As shown generally in FIGS. 5a and 5b, a connection is made from the X' adjusted command storage 99 to the BCD-to-decimal converter 120, so that the latter receives a digital, numerical representation of the last few digit values of the adjusted command number X'. The converter 120 is "turned on" or operative only when it receives an enabling signal XSP2, and the latter occurs only when the X error distance has been reduced to the predetermined value $\Delta 1$ of the second switch point (.018 inches in the previously given example) which is, of course, less than half of the .050 inches repeating fine spans here given by example. The converter 120 produces a straight decimal representation of the last few digits of the X' number and supplies that representation to a digital-to-analogue converter 121. The latter in turn produces analogue signals in sine-cosine relationship suitable for exciting a resolver or Inductosyn device. These excitation signals are passed through a manually adjustable differential resolver 122 which affords correction or calibration adjustments and thence to the conductors 124a, 124b of the Inductosyn slider 124. So long as the table 58 does not agree in its fine position with the fine analogue representation, an error signal is induced in the slider 125 and supplied to the analogue error detector 136. The latter in turn supplies control signals to both the slowdown network 114 and the direction and stopping controller 138 so that the motor 68 continues to be energized and drive the table 58 at a slow velocity until the error is reduced substantially to zero and the table is stopped precisely at the adjusted command position.

Referring in more detail to this system as shown in FIG. 31, the BCD to decimal converter 120 has twelve input terminals labeled X'C8 to X'E1 which are permanently connected to the correspondingly labeled terminals of the X' adjusted command storage 99 in FIG. 9. Thus, the converter 120 receives input signals representing in binary code the values of the last three digits 0.00 CDE in the adjusted command number X' which is stored and represented in the apparatus of FIG. 9. The converter 120 produces no output signals until it is rendered operative or effective by a binary 1 signal appearing on a control terminal labeled XSP2 in FIG. 31. This latter terminal is connected to the XSP2 terminal in FIG. 27b, and it will, for the reasons given above, be placed at a binary 1 level only after the digital control system has moved the saddle 58

0.018 inches given by way of previous example) of the adjusted command position. When this occurs, the converter 120 produces on its output terminals signals which represent in absolute or straight decimal notation the values of the three lowest order digits of the adjusted command number X'.

As shown in FIG. 31, the converter 120 has three sets of ten output terminals, each set corresponding to one of the three lowest order digit places C, D, E of the X' command number. For example, if those last three digit places have the values 3, 4, and 5, then the number three output terminal in the C digit group, the number four output terminal in the D digit output group and the number five output terminal in the E digit output group will have signals produced thereon.

This decimal representation of the three lowest order digit values for the X' number is supplied as an input to the digital-to-analogue converter 121. This latter converter is well known per se to those skilled in the art and it need not be described in detail. For example, such a digital-to-analogue converter is illustrated and described in Fitzner U.S. Pat. No. 3,040,221, to which reference can be made for specific details. Suffice it to say here that the digital-to-analogue converter 121 produces alternating voltages related in their amplitudes according to sine and cosine functions of a resultant amplitude vector of an alternating voltage which by its amplitude corresponds to the value of the three digit numbers signaled on the converter input terminals. These sine and cosine excitation signals are passed by the converter 121 to stator windings 122a, 122b of the manually adjustable differential resolver 122. Resolvers of the latter type are well known per se to those skilled in the art, and it may be noted here only that the excitation applied to the stator windings induces corresponding voltages in rotor windings 122c and 122d which are modified according to the adjusted angular position of the rotor so as to represent a constant offset from the position signaled by the numerical input to the converter 121. The differential resolver 122 may thus serve as an adjusting or calibrating device.

Thus, the sine-cosine signals produced by the digital-to-analogue converter 121 are transferred through the resolver 122, with or without a calibrating correction, to excite the conductors 124a, 124b of the Inductosyn slider 124. The slider 124 is carried by and movable with the table 58 (as shown in FIG. 2) and thus as the table moves the slider 124 moves relative to the stationary scale 125. Depending upon the excitation signals supplied to the slider which establish the location of the null points at fine span distances along the X-axis, and depending upon the position of the scale relative to the closest null point, an error signal is induced in the conductor 125a of the scale 125. In general terms, the error signal is an alternating voltage which in amplitude varies according to the sine of the distance by which the slider 124 is displaced from the nearest null point, and it is in phase polarity agreeable with the sense of that displacement from the nearest null point. Therefore, a polarized analogue error signal generally proportional to and agreeable in sense with the position error will be induced in the conductor of the scale 125 and supplied to the input of an amplifier 700 which forms a part of the fine analogue detector 136. The relationship between the magnitude and polarity of the analogue error signal and the error distance and direction is valid, however, only within a fine range, for example, .050 inches or 0.0250 inches on either side of the closest null point.

The error signal as amplified in the amplifier 700 is supplied both to an amplitude discriminator 701 and to an amplitude and direction discriminator 702. Inasmuch as a variety of suitable discriminators are well known to those skilled in the art, they will not be described here in detail. Reference may be made to Fitzner U.S. Pat. No. 3,040,221 if it is desired to review the organization and operation of these types of discriminators. It will be sufficient simply to observe here that the amplitude discriminator 701 produces an output signal so long as the AC error signal from the amplifier 700 is greater than a predetermined amplitude and it thus normally energizes a switch point relay RXSP3. By way of example, it may be assumed that the discriminator 701 energizes the relay RXSP3 until the analogue error signal indicates that the error distance has been reduced below a value of .0030 inches. This value will be hereinafter called the third switch point.

The second discriminator 702 functions in a slightly different fashion. It responds to the phase polarity of the analogue error signal and so long as the distance error is positive (the table 58 is to the left of the closest null point), it energizes a positive error relay PRX. So long as that error is negative (i.e., the table 58 is to the right of the closest null point), it energizes a negative relay NRX. When the error signal is reduced in amplitude below a predetermined value (for example 0.0002 inches, hereinafter called the "stopping value"), then both of the relays PRX and NRX will be deenergized. Thus, the discriminator 702 always causes one or the other of the relays PRX and NRX to be energized depending upon whether the distance error is positive or negative until such time that the drive for moving the table 58 is to be terminated and the latter brought to a stop.

The three relays in the analogue error detector 136 control contacts RXSP3a, PRXa, and NRXa which are shown as a part of the X slowdown network in FIG. 28. It will be seen that whenever the analogue error signal indicates that the error distance is greater than the third switch point value of .0030 inches, then the contacts RXSP3a will be closed to connect a −12 volt source to a conductor 705, producing a binary 1 signal on the latter indicating that the third switch point has not been satisfied. Under these conditions, the signal $\overline{XSP3}$ on the conductor 705 enables the gate 632, so that the latter is effective to energize the clutch coil XCa. On the other hand, when the error distance is reduced below 0.0030 inches, the contacts RXSP3a open so that the gate 632 is disabled and all of the clutch coils XCa, XCb, XCc are deenergized. As a result, the transmission Tx (FIG. 2) is placed in its lowest speed ratio and the velocity of the drive imparted to the table is reduced to a very low value of 1 inch per minute (see table I, supra). Thus, under the control of the analogue system, when the error is reduced to a third switch point value, the velocity of the movable table 58 is further reduced as it continues to move toward the adjusted command position, and the possibility of overshoot is reduced.

At the instant when the second switch point was reached and the fine analogue system enabled by a binary 1 signal applied to the XSP2 terminal for the converter 120 in FIG. 31, the gates 670 and 675 in the stopping controller 138 were disabled, because the signals on their XSP2 inputs switched to a binary 0 level. However, at that same instant, either the relay contacts PRXa or the relay contacts NRXa (FIG. 28) closed to accordingly, that the analogue error signal was positive or negative. Accordingly, a binary 1 signal appeared either on an XF+ conductor or an XF− conductor, leading to inputs of gates 708 or 709, respectively. The second inputs to these gates connected to the XSP2 terminal of FIG. 27b also received a binary 1 at the same time. Accordingly, depending upon whether the analogue system senses (a) a positive error, or (b) a negative error, then (a) the gate 708 supplies a response through the OR circuit 671 to continue the energization of the contactor coil X for, or (b) the gate 709 supplies a signal through the OR circuit 676 to continue the energization of the contactor coil Xrev. Therefore, depending upon whether the error sensed by the analogue system is positive or negative, the motor 68 is maintained energized to rotate in a direction which will drive the table 58 toward the final stopping position.

Finally, when the discriminator 702 (FIG. 31) drops out both of the relays PRX and NRX, the signals XF+ and XF− in FIG. 28 will both become binary 0's. Accordingly, neither of the gates 708 and 709 will pass binary 1 signals, and both of the contactor coils Xfor and Xrev will be deenergized, interrupting the energization of the motor 68. Because the motor is deenergized by the action of the discriminator 702 when the table is .0002 inches away from the precise desired position, the kinetic energy stored in the table dissipated as the latter coasts two ten thousandths of an inch before coming to stop. Thus, the final position of the table agrees with the X' stored number to the nearest ten thousandths of an inch. The discriminator 702 may be adjusted to provide different stopping values depending upon the inertia and other characteristics of the particular movable element which is being controlled.

In review, the digital feedback system here described can theoretically operate to bring the movable element to within .001 inch of a desired position since the actual position of that element is stored and represented to the nearest thousandths of an inch by the storage counter of FIG. 17. However, in the operation of the present control system, when the digital portion of the apparatus has brought the movable element to within a certain predetermined distance (here the second switch point or 0.018 inches), the digital control system is disabled, and a fine analogue control system is rendered effective. The analogue system can bring the movable element precisely to the desired position so long as it is within ±0.0250 inches, and thus the latter is well within the effective operating range when it is rendered effective. Thereafter, the analogue system controls the drive of the movable element to reduce its velocity when the error is reduced to a third switch point value (here described as .0030 inches), and then to terminate the drive of the movable element (when the error is reduced to a stopping value of .0002 inches) so that it coasts to and stops precisely in the desired position which is represented to an accuracy of the nearest ten thousandths of an inch.

STARTING THE NEXT POSITIONING CYCLE

When positioning in response to one block of information is complete, the signals XF+ and XF− (FIG. 28) both have a 0 value. They are supplied as inputs to an OR circuit 710 having its output connected through a NOT circuit 711 to one input of a gate 712. A second input XSP3 to such gate is supplied from the conductor 705 through a NOT circuit 706. A third input is connected to the switch point terminal XSP2. Thus, when positioning is complete, the gate 712 supplies a 1 signal to the reset terminal R of the flip-flop 634, and the latter resets to its 0 state so that Xrun signal becomes 0, thereby disabling the gates 630—632 and the gates 672 and 678 in FIG. 28. As a result, the gates 672 and 678 close to further assure that the contactor coils Xfor and Xrev are both deenergized (and that the motor 68 is stopped), and the clutch coils in the X-axis transmission are also all deenergized.

The output of the gate 712 also leads to a "positioning complete" terminal XPC, and a binary 1 signal on this terminal signifies that the X-axis positioning operation has been completed. This latter terminal appears also in FIG. 6a as one input to the gate 184. The second input of the latter is the corresponding signal for the Y-axis controls, and is here labeled YPC. When both inputs to the gates 184 are binary 1's, the positioning operation along both the X- and Y-axes is completed, and the gate 184 supplies an output signal which sets the flip-flop 165. Thus, in the manner previously explained, the tape reader motor TM will again be energized, and the tape reader will be caused to read one complete block of information.

When that block of information has been completely read and stored, as previously described, an end of block signal will appear on the EB terminal of FIG. 6a. This terminal as shown in FIG. 28 is connected to the set terminal of the flip-flop 634. Therefore, during the reading of a block of information on the punched tape the flip-flop 634 is in its reset condition, and the motor contactor coils Xfor and Xrev are both deenergized. Once the EB signal appears, however, the flip-flop 634 is set, then the control system begins operation to carry out the second cycle of positioning in accordance with the data read from a second block of the punched tape. By this control provision, therefore, the system reads one block of information, then positions the table and saddle along the X- and Y-axes in accordance with that block of information, and when the positioning operation is completed a new block of information is read to repeat the cycle.

PRESETTING THE ACTUAL POSITION STORAGE COUNTERS

With the system here described, it is entirely immaterial if some feedback pulses from the pulse generator PGX and PGY are "lost" or "gained." So long as the digital control system with its pulse feedback brings the movable element to within a predetermined distance Δ1 (here ±.018 inches) of the adjusted command position, the fine analogue system (which can operate over a distance span Δ2 of ±.025 inches) will assume control and carry out final and precise positioning. If eighteen pulses are lost or gained due to malfunction of the pulse generators, the reversible counters, or associated connecting components, the movable element will nevertheless be accurately positioned to agree with the adjusted command X' number which is stored and represented with an accuracy to the nearest ten thousandths of an inch.

It is possible, however, that a few pulses might be lost or gained during each of several different positioning operations. If the aggregate of lost or gained pulses exceeds 25, the analogue system might be turned on when the movable element is more than .025 inches away from the proper null point, and it would then position the movable element at an improper null point, that is, it might operate within the wrong one of the repeating fine spans.

In accordance with the present invention such cumulative effect of losing or gaining a few feedback signals during each of several different positioning cycles is obviated by making certain that the stored actual positioning numbers XP or YP agree precisely with the actual positions of the movable elements at the end of each positioning cycle.

For this purpose, the actual position storage counters 101 and 102 (FIGS. 17 and 18) are caused to be "preset" or corrected to store and represent the adjusted command number X' and Y' after each cycle of positioning has been accomplished. In the exemplary embodiment, the terminals X'M and X'A8 to X'D8 (FIG. 9) are connected as shown in FIG. 17 to the reversible counter 101. More specifically, the four X' number storage terminals for each of the decimal digits A, B, C, D are connected to the four presetting input terminals U8, U4, U2, U1 of the respective reversible counting decades which correspond to the digit places A, B, C, D. When a "position complete" signal appears on the terminal XPC (FIG. 28) it is supplied as shown in FIG. 17 to the PC terminals of each of the decade counting stages 320A—D, and it is also supplied to the XPC terminal of the counter control 320. As explained previously with reference to FIG. 16, the four decade counters 320A—D will thus be reset to store and represent the same binary number then represented on the terminals X'A8 to X'D1. The counter 101 will thus be "preset," and corrected if necessary, to store and represent the X' number which precisely designates the then existing actual position of the table 59. Moreover, as previously explained with reference to FIG. 19, the appearance of a signal on the terminal XPC will cause the actual position sign storage flip-flop 365 to be set or reset, if necessary, so that the sign of the actual position number XP as signaled on the terminal XPM will agree with the sign of the adjusted command number X' as signaled on the terminal X'M.

Taking an example, suppose the X' number computed and stored as the result of reading one block of information from the punched tape is +1.2345 inches, and that during the subsequent movement of the table 58, eight pulses are lost due to malfunction of the pulse generator PGx or the reversible counter 101 in FIG. 17. The table 58 will, despite the loss of eight pulses, still be accurately moved to a position of +1.2345 inches along the X-axis, but the storage counter would contain and store the number 1.226 when the positioning operation is completed. By the operation of the present system, the counter 101 will be preset and corrected to agree with the stored X' number. In response to a "position complete" signal on the terminal XPC it will be preset to store and represent the correct number 1.234 before the succeeding positioning cycle of operation begins. In this way, both temporary and cumulative errors are obviated.

It will be observed from FIG. 18 that the terminals Y'M and Y'A8 through Y'D1 are connected to the presetting input terminals for the Y-axis reversible counter 102. Thus, the same sort of correction or presetting operation will occur in response to the YPC signal produced at the end of each positioning cycle of operation, so that the actual position number YP as stored by the counter 102 will agree with the adjusted command position number Y', and thus with the actual position of the saddle 55. Inasmuch as the presetting apparatus and controls for the Y-axis components is the same as that described relative to the X-axis controls, presetting of the Y-axis counter need not be further detailed.

UNIDIRECTIONAL APPROACH

In moving an element to and stopping it precisely in a desired position, it is often desirable to avoid the inaccuracies which may result due to backlash or windup in the lead screw and associated gearing. The need is even more pronounced in those cases where a rotary induction resolver is geared to the lead screw to serve as a fine analogue feedback device in lieu of the Inductosyn device here shown. Such backlash or windup error can be largely eliminated by causing the movable element always to be driven in the same direction toward the desired position prior to termination of the drive. In other words, regardless of the original direction of movement, the element is always stopped in the desired position after approaching that position from the same direction.

In accordance with one aspect of the present invention, the system here shown includes a very simple and inexpensive portion which cooperates with the switch point and slowdown controls to effect stopping of the movable elements after unidirectional approach to the desired position. Moreover, the arrangement is such that the unidirectional approach portion of the apparatus can be easily rendered effective or ineffective, so as to selectively produce either bidirectional or unidirectional approach action.

Referring to FIG. 28, it will be recalled that the sign of the position error is signaled on the XC+ or XC− terminals when the digital control system is operative and the error distance has not been reduced to the second switch point value (i.e., XSP2 = 0). Also, after the second switch point has been reached and the analogue system rendered effective, the sign of the position error is signaled on the XF+ and XF− terminals in response to the analogue error signal induced in the Inductosyn slider 125 (FIG. 30). The OR circuit 671, gate 672, and coil X*for* collectively form control means for moving the element or table 58 in a positive direction; while the OR circuit 676, gate 678, and the coil X*rev* collectively form means for moving the table 58 in a negative direction. The gates 670 and 708 form means to actuate the positive direction drive means so long as the distance error is substantially greater than zero and the error sign is positive (i.e., if either of the XC+ or XF+ signals is 1). Thus, if the table 58 is moving to the right toward the desired position, it will be stopped there in the normal fashion previously described.

Unidirectional approach operation is produced by the control apparatus UDA shown in FIG. 28, and which is rendered effective by closure of a selection switch SUDA. It includes a bistate device 750 and means responsive to a sign signal representative of a negative position error for setting the flip-flop to its 1 state. More specifically, an OR circuit 751 has its output connected through the switch SUDA to the set terminal S of the flip-flop, and the two inputs of the OR circuit are connected to the XC− and XF− terminals. Assuming that the switch SUDA is closed, this means that if either the digital system or the analogue system signals a negative error, the flip-flop 750 will be set to its 1 state.

On the other hand means are provided to reset the flip-flop 750 to its 0 state when the error signal is positive and the error is greater than a predetermined magnitude (i.e., the second switch point value previously mentioned by way of example as being .0180 inches). Such means take the form of a gate 752 having its two inputs connected to the XC+ and $\overline{XSP2}$ terminals, so that it transmits a binary 1 to the reset terminal R of flip-flop 750 only if the second switch point is unsatisfied (XSP2 = 1) and the fine error is positive (XC+ = 1).

To provide control means for energizing the reverse drive coil X*rev* so long as the flip-flop 750 is in the 1 state (and even if the error distance is substantially zero or positive), the 1 output terminal of that flip-flop is connected as an input to the OR circuit 676. The $\overline{1}$ output terminal of the flip-flop is connected as an input 672a for the gate 672, so that the latter will be disabled when the flip-flop is set to its 1 state.

In operation, therefore, and assuming the switch SUDA to be closed, if the table 58 is being driven in a negative direction toward a desired stopping position under control of the digital system, it will be slowed down at the first and second switch points, as previously described above. The analogue system will cause a further reduction in velocity at the third switch point. Under these conditions, however, one or the other of the signals on terminals XC− and XF− will be a binary 1, and the flip-flop 750 will be set to its 1 state. Therefore, the OR circuit 676 and the gate 678 will continue to cause energization of the coil X*rev* even when the gates 675 and 709 no longer produce a 1 output after the table reaches a zero error position. Also, the gate 672 is disabled, so that the forward contactor coil X*for* cannot be energized even when the gates 670 and 708 produce a 1 output as the table moves beyond the zero error position and the error becomes positive. Therefore, when the table is moving in a negative direction (at its lowest speed), it does not stop at the adjusted command position but continues to move to the left beyond that desired position.

When, however, the table has moved a first predetermined distance to the left of the desired position equal to the stopping value (0.0002 inches), the signal on the terminal XC+ reverts from a 0 to a 1. And, as the table moves a further predetermined distance equal to the second switch point value (0.0180 inches), the signal XSP2 reverts from a 0 to a 1. Thus, at this latter instant after the table has traveled in a negative direction beyond the desired position, the flip-flop 750 is reset by a signal received from the gate 752. As a result of such resetting (and because the signals XC− and XF− are now both binary 0's), the gate 678 no longer energizes the coil X*rev*. Also, as a result of this resetting a binary 1 appears from a terminal 672a so that the gate 672 is enabled. Since the error distance is now positive (and either the XC+ or XF+ signal is a binary 1), the gate 670 or 708 will produce a 1 output, thereby energizing the forward coil X*for*. The table 58 is thus driven in a positive direction (toward the right) until it reaches and is stopped in the desired position.

This action will always occur when position error is initially negative and the initial direction of movement is negative, assuming that the selector switch SUDA is closed. The table will stop only after it has traveled beyond the desired position and returned thereto by moving in a positive direction. On the other hand, even with the switch SUDA closed, if the position error is initially positive and the initial direction of table movement is positive, the flip-flop 750 is never set, and the table merely approaches the desired position while moving in a positive direction, thereafter stopping in the normal manner described above.

Finally, it will be understood that when the switch SUDA is opened, the flip-flop 750 can never be set even though the position error and the direction of table movement are both negative. Under these conditions, the apparatus will function in the manner first described above, i.e., the table will approach the desired position from either a positive or negative direction depending upon the sense of the position error, and it will stop in the desired position after being progressively slowed down by the digital and analogue control means.

It will be understood, of course, that the Y-axis control components may include a unidirectional approach portion similar to that shown at UDA in FIG. 28. Because this involves providing a substantial duplicate of the apparatus UDA but associated with the Y-axis stopping controller 139, it has not been shown or described in any detail.

RESUME OF OPERATION

From the foregoing, the operation and advantages of the present numerical control system will be clear. However, a brief resume will be helpful, particularly to indicate the interrelationships of the several portions of the apparatus.

The tape reader 91 (FIG. 6a) reads one block of numerical data from the punched tape 90 and then stops. As that block of information is being read, program command or desired positions along the X-and Y-axes are transferred into storage devices 92, 94 (FIG. 6b), and there signaled or represented in binary coded decimal notation as the signs and values of first and second multidigit numbers X and Y. If the block of the tape so read contains a selection code for permitting the machine operator to dial in program-modifying correction adjustments, the J code number is stored by the storage device 96 (FIG. 6b), converted by the decoder 98 (FIG. 7) into natural or absolute decimal signals, and caused to render effective a selected one of a large plurality of adjusters 93 (only four of which are shown by way of example in FIG. 8). The selected adjuster and the setting thereof which is chosen by the machine operator, stores and signals a correction number N, the sign of the latter being represented on the N− terminal (FIG. 8) if it is a Y-axis correction and on the J5*, J7* terminals (FIG. 7) if it is an X-axis correction. The correction distance number N, of course, may be changed by the machine tool operator according to the extent of the correction he finds necessary to compensate for tool wear, deflection, and other similar factors for the particular positioning operation corresponding to the block of information previously read into storage. The actual positions of the table 58 and the saddle 55 along the X-and Y-axes are signaled by reversible counters 101 and 102 FIGS. 17 and 18) as the signs and values of multiplace numbers represented in binary code notation. These two counters count up or down as the movable elements travel away from or toward their respective axis origins in response to digital feedback pulses, and they thus dynamically store the actual position numbers XP and YP.

A single full adder-subtracter (shown in FIG. 26 and made more understandable by the preceding FIGS. 22—25) is operated by a continuously running timing signal source 107 (FIG. 9) so that it rapidly and repeatedly forms an algebraic combination of different pairs of numbers. First, the stored X and N numbers are combined to compute an adjusted command number X', and the latter is gated into the X' storage device 99 (FIG. 9). Thus, a multiplace adjusted command number X' is stored and represented in binary code on the terminals at the right in FIG. 9.

Second, the X' and XP numbers are combined to compute a binary code representation of a multiple digit error number X$rr$, the latter being signaled on the adder-subtracter output terminals at a rapid rate, for example, once every 400 $\mu$. s.

Third, the Y and N numbers are combined to compute an adjusted Y-axis command position Y', and this is gated into the storage device 100 (FIG. 9) so that it is permanently signaled in binary code notation on the terminals at the left edge of FIG. 9.

Fourth, the Y' and YP numbers are combined algebraically to compute a binary coded representation of a multiplace Y-axis error number Y$rr$, the latter being signaled on the adder-subtracter output terminals every 400 $\mu$. s.

In response to the numerical representation of the X- and Y-axis error distances, the switch point determination apparatus 110 (FIGS. 27a, b), the slowdown networks 114, 115 FIGS. 28 and 29), and the stopping controllers 138, 139 (FIGS. 28 and 29) cause the table 58 and the saddle 55 to be driven toward their adjusted command positions represented by the numbers X' and Y' and the stored signs thereof. If the error numbers are below, or when they are reduced below, first and second switch point values, the drive means (here illustrated as transmissions Tx and Ty) are controlled to reduce the velocities of motion, thereby avoiding overshoot due to inertia and kinetic energy. It will be apparent that as the elements move toward their desired positions, the XP and the YP numbers change, and thus the error numbers are reduced. However, because the error numbers are computed and signaled once every 400 microseconds, the effect is substantially the same as if the actual positions and the error numbers were being continuously represented.

When the elements have moved to within predetermined small distances Δ1 (e.g., .018 inches) of the desired positions, the X- and Y-axis fine analogue systems are activated and caused to control the final positioning. It is an especially advantageous feature of the present system that the analogue input signals representing in fine repeating spans the desired positions of the movable elements are derived from a digital-to-analogue conversion of the last few digit values of the adjusted command position numbers X' and Y' which have already been computed and stored as an incident to the operation of the digital system. Because the analogue system operates within repeating signal spans covering distances Δ2 of .050 inches (i.e., ±.025 inches) which are greater than the distance Δ1 (e.g., .018 inches) by an amount greater than the increment accuracy (.001 inches) of the digital control, the changeover to the analogue systems always takes place when the analogue system is operating within the proper one of its repeating fine spans, and despite some loss or gain of pulses which may have occurred in the digital feedback arrangement. Thus, the potential inaccuracies of an all-digital system are eliminated, and yet the need for the very complex and expensive arrangement of coarse, medium and fine channels, which have heretofore been required in all-analogue control systems, is avoided.

After the analogue systems are rendered effective, the corrective motions of the table 58 and saddle 55 continue, but the drive velocity is further reduced when the analogue error signal indicates that the distance error is below a third switch point (e.g., .003 inches). Then, when the error distance is reduced substantially to zero or to a stopping value (e.g., .0002 inches), drive is terminated to let the elements coast to and stop precisely at the adjusted command positions.

When the drive thus terminates and positioning is completed according to one set of numerical information read from one block of the punched tape, the reversible counters 101, 102 (FIGS. 17 and 18) are preset and corrected to agree precisely with the stored X' and Y' numbers which now represent the actual positions of the movable elements. This is effected by the XPC and YPC signals (see FIGS. 28 and 29) which are coupled back to the reversible counters 101 and 102 (FIGS. 17 and 18) so as to cause the counters to be preset to store the X' and Y' numbers supplied to their U terminals from the X' and Y' terminals of FIG. 9. In this way, any cumulative error due to loss or gain of feedback pulses is obviated.

Also, when positioning is complete, the apparatus of FIG. 6a responds to the XPC and YPC signals to restart the tape reader 91 to read into storage the next block of information on the punched tape, so that the next positioning cycle of operation is initiated.

While all of the foregoing is occurring, the proper add-subtract control signal is determined by the adder-subtracter control 520 (FIG. 23a) and applied to the D terminal of the adder-subtracter 105 (FIG. 26). The direction control 650 (FIG. 30) responds to stored sign information to cause the direction controllers 138, 139 to drive the elements in the proper direction so as to always reduce the position error. The comparing apparatus 108 and feeder apparatus 109 (FIGS. 21a—e) cooperate with the timing signal source and the multiplex gates 106 to determine which of the two numbers to be algebraically combined is the larger, and to supply the larger to a particular set of the two sets of input terminals for the adder-subtracter. The compare apparatus further provides signals (M and $\overline{M}$), indicative of the relative magnitudes of the two numbers being combined, as control input signals for the motion direction control 650 (FIG. 30) and the adjusted storage sign determining apparatus 550 (FIG. 26a).

While the system as here shown and described with reference to an exemplary embodiment requires what may seen to be many block diagrams and a fairly lengthy description to make clear the various interconnections and operations, it is on the contrary relatively simple and compact in terms of physical hardware. The various individual circuits employed and here described with reference to well known block diagram symbols may be embodied by transistorized printed circuit boards which are quite small and reliable in operation.

Again, the present drawings and description have been prepared to illustrate only an exemplary embodiment of the invention, and many changes in specific detail may be made without departing from the spirit and scope of the appended claims. Merely by way of example, it would be a matter of obvious design choice to duplicate the various components here described so as to provide control of positioning along three or more axes. Similarly, the digital system may be expanded or contracted to handle multidigit numbers with either more or fewer digit places than the five-order numbers A.BCDE here referred to by way of example. The reversible, variable speed drives for translating the movable elements such as the table 58 and the saddle 55 may, of course, take forms different from those here illustrated as reversible motors controlled by contactors and driving the lead screws through multispeed, multiple clutch transmissions. It will be apparent to those skilled in the art that variable speed reversible motors may be employed to drive the lead screws, or that selectively engageable forward and reverse clutches may be used as a reversible drive means receiving power from an unidirectionally rotating prime mover. The familiar "NOR" logic may be utilized as an obvious alternative to the "AND-OR" logic circuits which have here been described. Bistate devices other than flip-flops (e.g., tunnel diodes, magnetic cores, or relays) may be used in many instances. Finally, the various two-valued terms here referred to—such as plus or minus, zero or one, left or right- —can be interchanged. What is called positive or negative in the present description might, as a matter of choice, be called negative or positive in other equivalent systems. To avoid length, the appended claims have been prepared with the intention that the reader will understand and apply this obvious standard of equivalency as to positive and negative, zero or one, and other like terms employed to designate two possible characteristics or states.

I claim:

1. In a system for moving an element to bring its actual position into agreement with a desired position defined by a first multidigit number, the combination comprising means for digitally representing and storing said first number, means for digitally representing and storing a second multidigit number indicative of the actual position of the element and which changes as the element is moved, first means responsive to said digital representations for computing and digitally representing a third multidigit number indicative of the error distance between said desired and actual positions, means responsive to said third number representation for moving the element toward the desired position with progressively lower velocities as the third number is reduced below progressively lower predetermined values, means creating and signalling a fine analogue representation of the desired position within repeating fine spans, means responsive to said analogue representation and the actual position of the element to produce a fine analogue error signal which varies within any repeated fine span according to the sense and extent of the position error, second means responsive to said analogue error signal for moving the element toward the desired position with progressively lower velocities as such error signal is reduced below progressively lower values, means for stopping such movement when said analogue error signal is less than a predetermined lowest value, means for enabling said first means and disabling said second means so long as the difference between said first and second numbers exceeds a predetermined low value representative of a distance less than one-half of said spans, and means for disabling said first means and enabling said second means when such difference is equal to or less than said predetermined low value.

2. In a system for moving an element to make its actual position agree with a desired position defined by a first multidigit decimal number, the combination comprising means for digitally representing and storing said first number, means for digitally representing and storing a second multidigit decimal number indicative of the actual position of said element, means for algebraically combining said digital representations to derive a third digital number representative of the difference between said first and second numbers and of the error between said desired and actual positions, means for moving said element toward said desired position with a first velocity so long as said third number exceeds a first predetermined value, means for moving said element toward said desired position with a second, lower velocity so long as said third number is less than said first value but greater than a second predetermined value, means for deriving from said digital representation of said first number an analogue representation of certain lower order digits in such number, means responsive to said analogue representation and the actual position of said element to produce a fine analogue error signal which varies within repeating fine spans according to the sense and extent of the position error, means for moving said element toward said desired position with a third velocity, lower than said second velocity, when said third number is less than said second predetermined value and said analogue error signal is greater than a first certain value, and means for terminating the movement of said element and stopping the latter when said third number is less than said second predetermined value and said analogue error signal is less than a second certain value which is lower than said first certain value.

3. In a system for moving an element to bring its actual position into agreement with a desired position defined by a first decimal number ABCDE, the combination comprising means for digitally representing and storing the value of each order digit A, B, C, D, and E in said first number, a counter having four decade counting stages connected in tandem, means for producing one pulse for each one-thousandths of a unit distance of movement of the element, means for causing said counter to count said pulses and thereby digitally represent and store a second decimal number ABCD indicative of the actual position of the element, means responsive to the representations of said two numbers for digitally representing a third decimal number ABCD indicative of the error between said desired and actual positions, means responsive to the digital representation of said first number for producing an analogue representation of the last few digits CDE of the first number, means responsive to said analogue representation for producing an analogue error signal which is cyclically repetitive as the element is displaced from the desired position over successive fine spans of distance, means for driving said element with a first velocity toward said desired position until said third number is reduced to a predetermined value, and means rendered effective in response to said third number being less than said predetermined value for driving said element with a second velocity, lower than the first, until said analogue error signal is reduced substantially to zero.

4. In a system for moving an element to bring its actual position into agreement with a desired position defined by a first multidigit decimal number, the combination comprising means for digitally representing and storing said first number, means including a feedback connection from said element for digitally representing and storing a second multidigit number indicative of the actual position of said element, means for algebraically combining said first and second number representations to produce and digitally represent a third number representative to first degree of accuracy of the error between said actual and desired positions, means responsive to said first number representation for producing a fine analogue representation of said desired position, said analogue representation being accurate within successive fine spans of distance $\Delta 2$ to a degree greater than said first degree of accuracy, means responsive to said fine analogue representation for producing a fine analogue error signal generally proportional to the fine error between the actual and desired positions, means controlled by said third number representation for driving said element toward said desired position until said third number is reduced to a value less than half that corresponding to the distance Δ 2, and means controlled by said analogue error signal for thereafter driving said element toward said desired position until such error signal is reduced substantially to zero.

5. In a system for moving an element to bring its actual position into agreement with a desired position defined by a first multidigit decimal number accurate to the $n$th decimal place, the combination comprising means for digitally representing and storing the value of each order digit in said first number, a multidecade counter, means for causing said counter to count one unit for each coarse increment of movement of the element and thereby to digitally represent and store a second multidigit decimal number accurate to the $(n-1)$th decimal place and indicative of the actual position of the element, means responsive to the digital representations of said first and second numbers for digitally representing a third decimal number accurate to the $(n-1)$th decimal place and indicative of the error between the desired and actual positions, means responsive to the digital representation of said third number for driving the element toward the desired position until the third number is reduced to a predetermined value, means for creating an analogue representation of the Nth, (N−1)th, and (N−2)th order values of said first number, means for creating from said analogue representation an analogue error signal which cyclically varies from zero over fine spans greater than twice the distance represented by said predetermined value of said third number as said element is displaced from the desired position, and means responsive to said analogue error signal for driving the element toward the desired position and stopping it in such desired position.

6. In a system for moving an element to bring its actual position into agreement with a desired position defined by a first multidigit decimal number, the combination comprising means for representing and storing in binary coded decimal form the values of the progressively lower order digits of said first number, a multidecade binary coded decimal counter, means for feeding one pulse to said counter for each predetermined incremental distance $i$ moved by said element so that said counter dynamically represents and stores in binary coded decimal form a second multidigit number indicative to the nearest increment $i$ of the actual position of said element, means for algebraically subtracting the said second number from said first number to represent a third number indicative of the error between said desired and actual positions, first drive control means responsive to said third number representation being greater than a predetermined value Δ1 for driving said element toward said desired position, means responsive to the representation of the values of the last few lowest order digits of said first number for producing an analogue signal which by its magnitude is representative, within successive fine spans of distance Δ2, of the desired position, means responsive to said analogue signal for producing an analogue error signal which varies in sense and magnitude according to the difference between the desired and actual positions within each fine span, means responsive to said third number representation being reduced in magnitude to a value Δ1 corresponding to an error distance $e$ for disabling said first drive control means, said distance $e$ being less than said distance Δ2 but greater than half said incremental distance $i$, and second drive control means responsive to said analogue error signal for continuing to drive said element toward said desired position until such error signal is reduced substantially to zero, whereby malfunctions of said pulse feeding means or counter resulting in inaccuracy of the representation of said second number by an amount as much as half the numerical value of the distance Δ2 will not affect the accuracy of the final position of the element.

7. In a system for moving an element to bring its actual position into agreement with a desired position represented by a first multidigit decimal number, the combination comprising means for representing and storing in binary coded decimal form the value of the progressively lower order digits ABCDE of said first number, a reversible counter having a plurality of binary coded decimal decade stages connected in tandem, means for generating a pulse for each increment of distance, equal to one unit in the D order of said first number, moved by said element, means for causing said counter to count up or down in response to each pulse when the element is moving away from or toward a zero position so that the counter represents and stores in binary coded decimal form the values of the progressively lower order digits ABCD of a second decimal number indicative of the actual position of said element, means for periodically algebraically combining said first and second number representations to derive and represent in binary coded decimal form a third decimal number ABCD representative to the nearest integer in the D order digit place of the error between the desired and actual positions, first drive control means responsive to said third number representation for driving said element toward said desired position until said third number is reduced to a predetermined switch point value Δ1, means responsive to the binary coded decimal representation of the values of the CDE orders of said first number for representing such values in absolute decimal form, means responsive to said absolute decimal representations for creating a fine analogue signal representative of the desired position of said element within successive fine spans of distance Δ2 which are greater than said Δ1, fine analogue feedback means connected to said element and responsive to said analogue signal for producing an analogue error signal generally proportional in magnitude and agreeable in sense within each fine span to the difference between the desired and actual positions within that span, means responsive to said third number representation falling below said switch point value for disabling said first drive control means, and second drive control means rendered effective upon disabling of said first drive control means for driving said element toward said desired position until said analogue error signal is reduced substantially to zero.

8. In a system for moving first and second elements to successive positions along first and second axes according to a repeatable program, the combination comprising a record device having successive blocks of information thereon with each block numerically defining at least one desired position along the X- and Y-axes, means for reading said record one block at a time, means responsive to such reading for digitally storing X- and Y-numbers respectively representative of X- and Y-axis desired positions, feedback means associated with said elements for digitally representing and storing XP and YP numbers respectively indicative of the actual positions of said elements along the X- and Y-axes, a single digital algebraic combining device having first and second sets of input terminals adapted to receive signals respectively representative of two numbers and having output terminals on which appear the digital representation of the algebraic combination of such two numbers, means for measuring off rapidly repeating cycles of successive time periods, means rendered effective during a first of said time periods for applying the stored representations of said X and XP numbers to said first and second sets of input terminals, means rendered effective during a second of said time periods for applying the stored representations of said Y and YP numbers to said first and second sets of input terminals, means for driving said first element toward the desired X-axis position with a first velocity until the number represented on said output terminals during one of said first time periods is reduced to a first predetermined value, means for thereafter driving said first element toward the desired X-axis position with a second velocity, lower than said first velocity, until the number represented on said output terminals during one of said first time periods is reduced to a second predetermined value which is less than said first value, means for driving said second element toward the desired Y-axis position with a third velocity until the number represented on said output terminals during one of said second time periods is reduced to a third predetermined value, and means for driving said second element toward the desired Y-axis position with a fourth velocity, lower than said third velocity, until the number represented on said output terminals during one of said second time periods is reduced to a fourth predetermined value which is less than said third value.

9. In a system for moving first and second elements to successive desired positions along first and second axes, respectively, the combination comprising means for digitally storing first and second numbers respectively representing programmed desired positions along the first and second axes, means for digitally storing a third correction number, means responsive to movement of the first and second elements for digitally storing fourth and fifth numbers respectively representing the actual positions of said elements along the first and second axes, a digital algebraic combining device having two sets of input terminals and one set of output terminals together with means for signalling on the output terminals a representation of the algebraic sum of two numbers represented by signals applied to the input terminals, a timing generator for measuring off rapidly repeating cycles of successive time periods, means effective during a first of said time periods for respectively applying (a) one of said first and second numbers and (b) a third number to said sets of input terminals, means for storing as a sixth number the representation appearing on said output terminals during said first periods, means effective during a second of said time periods for respectively applying (a) one of said fourth and fifth numbers and (b) said sixth number to said sets of input terminals, and means for driving said one of said elements toward the desired position along its axis until the number represented on said output terminals during one of said second time periods is less than a predetermined value.

10. In a system for moving first and second elements to successive desired positions along first and second axes, respectively, the combination comprising means for digitally storing first and second numbers respectively representing programmed desired positions along the first and second axes, means for digitally storing a third correction number, means responsive to movement of the element for digitally storing fourth and fifth numbers respectively representing the actual positions of said elements along the first and second axes, a digital algebraic combining device having two sets of input terminals and one set of output terminals together with means for signalling on the output terminals a representation of a number which is an algebraic combination of two numbers represented by signals applied to respective sets of the input terminals, a timing generator for measuring off rapidly repeating cycles of successive time periods, means effective during a first of said time periods for respectively applying said first and third numbers to said sets of input terminals, means for storing as a sixth number the representation appearing on said output terminals during said first periods, means effective during a second of said time periods for respectively applying said fourth and sixth numbers to said sets of input terminals, means effective during a third of said time periods for respectively applying said second and third numbers to said sets of input terminals, means for storing as a seventh number the representation appearing on said output terminals during said third time periods, means effective during a fourth of said periods for respectively applying said fifth and seventh numbers to said sets of input terminals, means for driving said first element toward the desired position along the first axis until the number represented on said output terminals during one of said second time periods is less than a predetermined value, and means for driving said second element toward the desired position along said second axis until the number represented on said output terminals during one of said fourth time periods is less than a predetermined value.

11. In a system for moving an element to successive programmed positions along an axis, the combination comprising first storage means for digitally storing and numerically representing a desired position, second storage means coupled to the movable element for dynamically storing and numerically representing in digital form the actual position of said element, means for representing in fine analogue form the desired position of said element within repeating fine spans along said axis, means coupled to receive said analogue representation and responsive thereto for producing a fine analogue error signal indicative within one span of the difference between the desired and actual positions of the element, means responsive to said first and second numerical representations from said first and second storage means for driving said element along the axis until the difference therebetween is reduced to a predetermined low value, means effective after said difference is reduced to said predetermined low value and responsive to said analogue error signal for driving the element along the axis until such error signal is reduced substantially to zero, and means responsive to completion of the operation of said last-named means for setting said second storage means to hold and represent the number contained in said first storage means.

12. In a system for moving an element to successive positions along an axis, the combination comprising first storage means for digitally storing and numerically representing a desired programmed position, second storage means for numerically representing an adjustable correction distance, third storage means coupled to the movable element for dynamically storing and numerically representing in digital from the actual position of said element, means for algebraically combining said representations of said first and second storage means to compute a numerically defined adjusted desired position, fourth storage means for storing and numerically representing said adjusted position, means responsive to the representation of said fourth storage means for producing analogue signals indicative of the adjusted position within repeating fine spans along said axis, means coupled to receive said analogue representation and responsive thereto for producing a fine analogue error signal indicative within one span of the difference between the desired and actual positions of the element, means responsive to said first and second numerical representations from said first and second storage means for driving said element along the axis until the difference therebetween is reduced to a predetermined low value, means effective after said difference is reduced to said predetermined low value and responsive to said analogue error signal for driving the element along the axis until such error signal is reduced substantially to zero, and means responsive to completion of the operation of said last-named means for setting said second storage means to hold and represent the number contained in said fourth storage means.

13. In a system for moving an element to successive ones of a plurality of programmed positions along an axis, the combination comprising first storage means for digitally storing and numerically representing a desired position along the axis, means for setting a number defining a first programmed position into said first storage means, second storage means for storing and numerically representing in digital form the actual position of the element along the axis, means for changing the numerical content of said second storage means by one numerical unit for each increment $i$ of movement of the element so that the actual position of the latter is normally stored, means responsive to the number stored in said first storage means for creating an analogue signal which represents the desired position of the element within repeating fine spans of distance $\Delta 2$ along the axis, means responsive to said first and second storage means for signalling when the difference between the numerically represented desired and actual positions is less than the span distance $\Delta 2$ but more than one increment $i$, means unaffected by said analogue error signal for driving said element toward said desired position in the absence of any signal by said signalling means, means operative in response to a signal from said signalling means for driving said element toward said desired signal until said analogue error signal is reduced substantially to zero, means responsive to said error signal reaching substantially zero for setting said second storage means to hold and store the number then stored in said first storage means, whereby the contents of the second storage means are corrected for any faulty operation of said changing means, and means for thereafter setting a number defining another programmed position into said first storage means.

14. In a system for moving an element to successive numerically defined positions according to a program, the combination comprising first storage means for digitally representing and storing a number representative of a desired position, second storage means including counter, pulse feedback means for causing said counter to count positively or negatively one unit for each distance increment $i$ moved by the element SC that the counter dynamically stores and digitally represents a number nominally representative of the actual position of the element, means responsive to the values of certain lower order digits of the number represented and stored by said first storage means for creating a fine analogue signal representative of the desired position of the element within repeating fine spans $\Delta 2$ along the axis, means movable with the element and responsive to said analogue signal for producing a fine analogue error signal representative by its magnitude of the difference between the desired and actual positions of the element within any given fine span, first control means responsive only to said first and second storage means for driving the element toward the desired position, second control means responsive to said fine analogue error signal for driving the element toward said desired position, means for rendering said first and second control means respectively effective and ineffective so long as the difference between the numbers in said first and second storage means is greater than a predetermined value which is less than the span distance $\Delta 2$ and greater than one distance increment $i$, means for rendering said first control means ineffective and said second control means effective when said difference is equal to or less than said predetermined value so that the element is driven until said fine error signal is reduced substantially to zero, and means responsive to termination of drive by the action of said second control means for setting said second storage means to hold the number then contained in said first storage means, thereby to compensate for any lost or spuriously gained pulses registered in said counter.

15. The combination set forth in claim 14, further characterized in that said second storage comprises a reversible binary coded decade counter with one decade stage for each place of a multidigit number to be stored, and said last-named setting means comprises means for dumping the contents of said first storage means in parallel into the counter.

16. In a numerically controlled system for positioning a movable element for machine tools or the like, the combination comprising a first register adapted to receive and digitally store a first number defining a desired position of the element, a second register adapted to receive and digitally store a second number defining the actual position of the element, means for increasing or decreasing the number stored in said second register as said element moves through successive increments away from or toward a zero reference position, algebraic combining means for digitally signalling an error number representing the sum or difference of said first and second numbers, first control means for driving the element toward said desired position so long as the error number exceeds a predetermined value, means for creating an analogue representation of the desired position within repeating fine distance spans, means responsive to the analogue representation for creating an analogue error signal representative by its magnitude of the difference between the actual and desired positions within a given fine span, second control means for driving said element toward said desired position after said first control means are ineffective and until said analogue error signal is reduced substantially to zero, and means responsive to completion of the driving by said second control means for resetting said second register to hold the same number as that then stored in said first register.

17. The combination set forth in claim 16 further characterized in that said second control means causes drive of the element at a velocity lower than that caused by said first control means.

18. The combination set forth in claim 16 further characterized in that said first number is stored in said first register with at least one more lower order digit place than the second number stored in the second register, and said means for creating the said analogue representation is responsive to the values of the last few lower order digits of the first number stored in the first register.

19. In a system for moving an element to different desired positions along an axis having positive and negative regions on opposite sides of a zero point, the combination comprising first means for digitally signalling the sign and value of a first number indicative of a desired value, second means for digitally signalling the sign and value of a second number indicative of the actual position of said element along the axis, comparing means responsive to signals from said first and second means for producing a signal M having a 0 or 1 value when the said first number is respectively greater or less in magnitude than said second number, reversible drive means for moving the element in a positive or negative direction along the axis, means for algebraically combining said first and second numbers and actuating said drive means so long as the resultant number is greater than a predetermined value, and means for controlling the direction of movement produced by said drive means including (a) means for causing movement of the element in a direction corresponding to the sign of said first number when said first and second signs are alike and said M signals is 0, (b) means for causing movement of the element in a direction opposite the sign of said first number when said first and second signs are alike and said M signals is 1, and (c) means for causing movement of the element in a direction corresponding to the sign of said second number when said first and second signs are unlike.

20. In a system for moving an element along an axis having positive and negative regions on opposite sides of a zero point, the combination comprising means for storing and digitally representing the sign and value of a first number indicative of a desired position along said axis, means having a feedback connection to said element for storing and digitally representing the sign and value of a second number indicative of the actual position of said element along the axis, drive means responsive to said storing means for moving said element so long as said first and second numbers are substantially unequal in magnitude, and means for controlling the direction in which said moving means drives said element, said last-named means including magnitude comparing means responsive to said first and second numbers for indicating when the first number is less than or greater than the second number, means responsive to the sign representations of said two numbers for causing said drive means to move said element in (a) a positive direction or (b) a negative direction when said first number and second number signs are (a) respectively positive and negative or (b) respectively negative and positive, means responsive to the sign representations of said two numbers for causing said drive means to move said element in (a) a positive direction or (b) a negative direction when said first number sign and said second number sign are both positive and said magnitude comparing means respectively signals that the first number is (a) greater than the second number or (b) less than the second number, and means responsive to the sign representations of said two numbers for causing said drive means to move said element in (a) a positive direction or (b) a negative direction when said first and second number signs are both negative and said comparing means respectively signals that the first number is (a) less than said second number or (b) greater than said second number.

21. In a system for moving an element along an axis having positive and negative regions on opposite sides of a zero point, the combination comprising means to store and represent the value X' of a number indicative of a desired position and to signal a positive or negative sign thereafter by the absence or presence of a signal X'M, means to store and represent the value XP of a number indicative of the actual position of the element and to signal a positive or negative sign therefor by the absence or presence of a signal XPM, magnitude comparing means for producing a signal M only when said X' value is less than said XP value, drive means for moving said element along said axis when said X' and XP values are substantially unequal, and means for controlling the direction of movement produced by said drive means, said last-named means including (a) means for causing movement to be in a negative direction when said X'M signal is present and said XPM signal simultaneously absent, (b) means for causing said movement to be in a negative direction when said M signal is present and both said X'M and XPM signals are simultaneously absent, (c) means for causing said movement to be in a negative direction when said X'M and XPM signals are simultaneously present and said M signal simultaneously absent, and (d) means for causing said movement to be in a positive direction when none of said means (a), (b) or (c) is effective.

22. In a system for positioning a movable element along an axis having positive and negative regions on opposite sides of a zero point, the combination comprising first means to digitally store and represent the value of a first number indicative of a programmed command position, second means to represent the sign of said first number as positive or negative by respectively making a first signal 0 or 1, third means to digitally store and represent a second number indicative of a correction distance, fourth means to represent the sign of said second number as positive or negative by respectively making a second signal 0 or 1, fifth means responsive to said first and third means for indicating when said first number is greater or less than said second number by respectively making a third signal 0 or 1, and means for determining the sign of an adjusted desired position computed by algebraically combining said first and second numbers, said last-named means including an output terminal and (a) means for signalling a 1 on said output terminal in response to said first and second signals both being 1's, (b) means for signalling a 1 on said output terminal in response to said first, second and third signals respectively being 1, 0 and 0, (c) means for signalling a 1 on said output terminal in response to said first, second and third signals respectively being 0, 1, 1, and (d) means for otherwise signalling a 0 on said output terminal, whereby the sign of the adjusted desired position is indicated as positive or negative respectively by a 0 or 1 on said output terminal.

23. In a system for positioning a movable element to a numerically defined adjusted position along an axis having positive and negative regions on either side of a zero point, the adjusted position being the algebraic sum of a programmed command position and a correction distance, the combination comprising means for digitally representing a first sign and a first numerical value of the command position, means for digitally representing a second sign and a second numerical value of the correction distance; first means for signalling when the first value is less than the second value, means responsive to the sign representations for adding said values when the first and second signs are alike and subtracting the smaller value from the larger when the first and second signs are unlike to produce a digital representation of a number representing the adjusted position along said axis; and means to determine and signal the sign of the adjusted position; said last-named means including (a) means to signal said adjusted sign as negative or positive if both said first and second signs are respectively negative or positive, (b) means to signal said adjusted sign as negative or positive if said first sign is a negative or positive respectively and said first means produces no signalling response, and (c) means to store said adjusted sign as a negative or positive if said second sign is a negative or positive respectively and said first means produces a signalling response; and means responsive to the representation of the adjusted position and sign thereof for moving said element to a corresponding position along the axis.

24. In a system for positioning a movable element along an axis having positive and negative regions on opposite sides of a zero point, the combination comprising means for digitally storing and numerically representing the value of a number Y indicative of a programmed desired position along the axis, means for storing and signalling a positive or negative sign for the Y number by the absence or presence of a signal YM, means for digitally storing and numerically representing the value of a number N indicative of a correction distance, means for storing and signalling a positive or negative sign for the N number by the absence or presence of a signal N—, magnitude comparing means for producing a signal M when said Y number is less than said N number, means responsive to either (a) the absence of both the signals YM and N— or (b) the presence of both the signals YM and N—, for adding said numbers Y and N to derive and digitally represent the value of an adjusted command number Y' indicative of an adjusted desired position, means responsive to the simultaneous presence of one of the signals YM and N— and absence of the other such signal for subtracting the smaller of the numbers Y and N from the larger to derive and digitally represent the adjusted command number Y', and means for determining and signalling the sign of the number Y' by creating the presence or absence of a signal Y'M when such sign is respectively negative or positive; said last-named means including (a) means responsive to the presence of both signals YM and N— for creating the signal Y'M, (b) means responsive to the presence of the signal YM and the simultaneous absence of the signals N— and M for creating the signal Y'M, (c) means responsive to the absence of the signal YM and the simultaneous presence of the signals M and N— for creating the signal Y'M; and means for moving the element along the axis to a position numerically corresponding to the value of represented number Y' and to a positive or negative region when the Y'M signal is respectively absent or present.

25. In a system for relatively moving a workpiece and a rotating milling cutter to successive relative positions along an axis according to a predetermined and recorded program of successive numerical commands, the recorded program including selector codes associated with certain ones of said commands with such selector codes including an auxiliary character having one of two values representative of a plus or minus sign when the associated command requires relative movement of the workpiece in a positive or negative direction along the axis to reach the commanded position, said selector codes including a selection character having any of a plurality of values, the combination comprising a plurality of adjusters each settable to numerically represent the magnitude of a correction distance, means for receiving and storing each successive numerical command, means for receiving and storing each selector code associated with the stored command, means for rendering effective that one of said adjusters which corresponds to the particular value of the selection character in the stored selection code, and means responsive jointly to (a) the stored numerical command, (b) the correction distance magnitude numerically represented by the effective adjuster, and (c) plus or minus sign representation by the auxiliary character of the stored selector code for moving said workpiece and cutter relatively along the axis to an adjusted position which is equal to the command position as made more positive or negative by an amount equal to the correction distance magnitude depending upon whether the auxiliary character of the stored selector code represents a plus or minus, whereby the same selector may be rendered effective for several commanded operations involving machining by the same milling cutter.

26. In a system for moving a workpiece relative to a rotating cutter and in a direction normal to the cutter axis so that the cutter mills surfaces on the workpiece, the relative positions of the workpiece and cutter being defined by successive numerical commands of a program which includes correction selector codes to afford compensation for the cutter having a diameter less than that originally assumed, said correction selector codes associated with numerical commands requiring positive or negative motion of the workpiece relative to the cutter having a first prefix or second prefix, respectively, the combination comprising, a plurality of adjusters settable to digitally and numerically represent the magnitudes of correction distances, first means for storing and digitally representing the sign and numerical value of a desired position command, second means for storing and representing the prefix and the value of any selector code associated with the stored command, means responsive to the stored value of the selector code for rendering a corresponding one of said adjusters effective, signalling means responsive to the storage of the first or second prefix in said second storage means for indicating that the sign of the numerical value represented by the effective adjuster is respectively positive or negative, algebraic combining means responsive to the numerical value represented by the effective adjuster, to the sign signalled by said signalling means, and to the sign and numerical value represented by said first storing means for producing a numerical representation of the sign and value of an adjusted position, and means for moving said workpiece and cutter relatively to said adjusted desired position, whereby the same adjuster may be selected to be effective during execution of several commands involving the same cutter, so that the same correction distance is employed for that cutter but in either a positive or negative sense.

27. In a system for positioning a workpiece relative to a rotating cutter according to a predetermined program of successive positions along an axis, and wherein each position may be compensated for the fact that the cutter diameter is less than that assumed in making up the program, the combination comprising means for producing successive sets of first signals numerically representing the signs and successive positions of said cutter relative to the workpiece according to the program, means for producing sets of second signals associated with certain ones of the sets of first signals, said sets of second signals each digitally indicating a selection code designating a particular one of a plurality of adjusters, said sets of second signals each digitally indicating an auxiliary code having one or the other of two values and designating a positive or negative sign when the positioning movement called for by the associated set of first signals respectively involves the workpiece moving in a positive or negative direction along the axis to reach programmed positions, first means for receiving and storing one set of the first signals at a time, second means for receiving and storing any set of the second signals associated with a stored set of the first signals, a plurality of adjuster devices adjustable to represent and store the numerical value of a cutter correction distance, means responsive to the selection code stored in said second storing means for rendering effective that one of said adjusters corresponding to the stored selection code, and means responsive jointly to (a) the sign and numerically represented position stored in said first storing means, (b) the auxiliary code stored in said second storing means, and (c) to the correction distance numerically represented by said effective adjuster, for producing and signalling the algebraic sum of the programmed position and the represented correction distance, whereby the same adjuster may be selected to effect corrections for a given cutter when the workpiece is moved in either a positive or negative direction relative to the cutter to reach a corrected position.

28. In a system for moving an element along an axis until its actual position magnitude with a desired position, the combination comprising means for electrically representing the sign and magnitude of the error distance between the desired and actual positions of the element, first control means responsive to such error sign representation being positive for driving said element in a positive direction until said error magnitude representation is reduced substantially to zero, second control means actuated in response to such error sign representation being negative for driving said element in a negative direction, means responsive to such error representation being negative for disabling said first control means, and third means responsive to said error magnitude representation exceeding a predetermined value and said sign representation being positive for deactuating said second control means and enabling said first control means, whereby the element always stops substantially in the desired position after movement in a positive direction, regardless of its initial direction of movement toward the desired position.

29. In a system for moving an element along an axis until its actual position agrees with a desired position, the combination comprising means for electrically representing the distance error between the desired and actual positions, means for electrically representing the sign of such distance error, first drive control means for moving said element in a positive direction, second drive control means for moving said element in a negative direction, third means responsive to said electrical representations for actuating said first drive control means when said sign representation is positive and so long as said error representation is substantially greater than zero, whereby said element moves in a positive direction toward and then stops in the desired position, a bistate device, means responsive to said sign representation being negative for setting said bistate device to its 1 state, means responsive to the bistate device being in the 1 state for actuating said second drive control means and disabling said first and third means, and means responsive to said electrical representations when said sign representation is positive and said error representation is greater than a predetermined magnitude for resetting said bistate device to its other state to thereby deactuate said second drive control means and enable said first and third means whereby upon movement of the element in a negative direction it passes through the desired position and then returns in a positive direction to stop at the desired position.

30. In a system for moving an element along as axis until its actual position agrees with a desired position, the combination comprising means for signalling the sign of the error between the desired and actual positions of the element, means for signalling the magnitude of the error between the desired and actual positions, first means for driving said element in a positive direction so long as the signalled sign is positive and the signalled error is not substantially equal to zero, second means for driving said element in a negative direction so long as the signalled error is negative and the signalled error is not substantially equal to zero, a bistate device, means responsive to the signalled error being at least momentarily negative for setting said bistate device to its 1 state, means responsive to the bistate device being in its 1 state for disabling said first means, means responsive to said bistate device being in its 1 state for causing said second means to continue driving said element in a negative direction irrespective of the signalled sign polarity and the signalled error, means responsive to said signalled sign being positive and said signalled error being greater than a predetermined value for resetting said bistate device to its 0 state, whereby the element always stops in a desired position after moving in a positive direction whether or not its initial movement was in a positive or negative direction.

31. The combination set forth in claim 30 further characterized by selector means conditionable to prevent any setting of said bistate device to its 1 state, so that the element moves and stops in the desired position after moving in positive or negative directions in response to positive or negative errors.

32. In a system for moving first and second elements to successive positions along X- and Y-axes according to a repeatable program, the combination comprising a record device having successive blocks of information thereon with each block numerically defining at least one desired position along the X- and Y-axes, means for reading said record one block at a time, means responsive to such reading for digitally storing X and Y numbers respectively representative of X- and Y-axes desired positions, feedback means associated with said elements for digitally representing and storing XP and YP numbers respectively indicative of the actual positions of said elements along the X- and Y-axes, a single digital algebraic combining device having first and second sets of input terminals adapted to receive signals respectively representative of two numbers and having output terminals on which appear the digital representation of the algebraic combination of such two numbers, means for measuring off rapidly repeating cycles of successive time periods, means rendered effective during a first of said time periods for applying the stored representations of said X and XP numbers to said first and second sets of input terminals, means rendered effective during a second of said time periods for applying the stored representations of said Y and YP numbers to said first and second sets of input terminals, means for storing and representing first and second preselected numbers of predetermined low values, means for driving said first element along the X-axis toward the desired X-axis position until the number represented on said output terminals during one of said first time periods is reduced to or below said first preselected number, and means for driving said second element along the Y-axis toward the desired axis position until the number represented on said output terminals during one of said second time periods is reduced to or below said second preselected number.

33. In a system for moving first and second elements to successive positions along X- and Y-axes, respectively, according to a repeatable program, the combination comprising a record device having successive blocks of information thereon numerically defining X and Y axis programmed desired positions for successive operations, certain ones of said blocks having adjuster selection codes included therein, means for reading said record device one block at a time, means responsive to said reading means for digitally storing X and Y numbers representative of the programmed desired positions of said elements along the X- and Y-axes, a plurality of adjusters each conditionable to digitally store and represent a correction number N, means responsive to reading by said reading means of a selector code for rendering effective that one of the adjuster devices which corresponds to that particular code and which stores an adjustable correction number N, designating means for signalling a binary 1 or 0 when the correction number N is to be applied to the X or Y axis, respectively, means for dynamically storing XP and YP numbers representative of the actual positions of said elements along the X- and Y-axes, a digital algebraic combining device having first and second sets of input terminals for receiving digital representations of two numbers and having output terminals on which appear the digital representation of the algebraic sum or difference of such two numbers, a timing generator for measuring off rapidly repeating cycles of successive time periods, means rendered effective during one of said time periods and if said designating means signals a 1 for supplying said X number and said N number respectively to said sets of input terminals to digitally signal on said output terminals an adjusted position number X', means for digitally storing said number X', means rendered effective during another of said time periods for supplying said X' number and said XP number to said sets of input terminals to digitally signal on said output terminals a number X$rr$ representing the error difference between the adjusted and actual positions of said first element along the X axis, means effective during still another of said time periods and if said designating means signals a 0 for supplying said Y number and said N number to said sets of input terminals to digitally signal on said output terminals an adjusted position number Y', means for storing said number Y', means rendered effective during yet another of said time periods for supplying said Y' and YP numbers to said sets of input terminals to digitally signal on said output terminals a number Y$rr$ representing the error difference between the adjusted and actual positions of said second element along the Y-axis, means for sensing said X$rr$ number during those periods when it appears on said output terminals and for driving said first element along the X-axis toward a position represented by said X' number at progressively lower velocities as the X$rr$ number is reduced below progressively lower predetermined values, means for sensing said Y$rr$ number during those periods when it appears on said output terminals and for driving said second element along the Y-axis at progressively lower velocities as the Y$rr$ number is reduced below progressively lower predetermined values, and means for stopping said X and Y drive means when said X$rr$ and Y$rr$ numbers respectively have been reduced substantially to zero.

34. In a system for moving first and second elements to successive positions along first and second axes according to a predetermined program, the combination comprising means for digitally storing first and second multidigit numbers respectively representing programmed positions along the first and second axes, means for digitally storing a third correction number, designating means for signalling a binary 1 or 0 when the correction number is to be applied to said first or second axis, respectively, means including feedback connections from said first and second elements for digitally storing fourth and fifth multidigit decimal numbers respectively indicative of the actual positions of said elements along the first and second axes, a single digital algebraic combining device having two sets of input terminals adapted to receive two numbers and having output terminals on which appear a representation of the algebraic sum or difference of such two numbers, a timing generator for rapidly measuring off repeating cycles of successive short time periods, means for applying as inputs to said combining device during a first of said time periods (a) said first number and (b) said correction number or zero depending upon whether said designating means signals a binary 1 or 0, to produce a representation of a sixth number indicative of an adjusted position on said output terminals, means for storing said sixth number, means for applying said sixth and fourth numbers as inputs to said combining device during a second of said time periods to produce a first axis error number representation of said output terminals, means for applying as inputs to said combining device during a third of said time periods (a) said second number and (b) said correction number or zero depending upon whether said designating means signals a binary 0 or 1, to produce a representation of a seventh number indicative of an adjusted position on said output terminals, means for storing said seventh number, means for applying said seventh and fifth numbers as inputs to said combining device during a fourth of said time periods to produce a second axis error number representation on said output terminals, means responsive to the last few lower order digits of said sixth number storage means for creating a first repeating fine analogue representation of the desired position of the first element along the first axis, means responsive to the last few lower order digits of said seventh number storage means for creating a second repeating fine analogue representation of the desired position of the second element along the second axis, means for driving said first element along the first axis at a relatively high velocity toward the desired position until the first axis error number represented on said output terminals during one of said second periods is less than a first predetermined value, means for driving said second element along the second axis at a relatively high velocity toward the desired position until the second error number represented on said output terminals during one of said fourth time periods is less than a second predetermined value, means responsive to said first analogue representation for continuing the drive of said first element along said first axis at a relatively lower velocity until the actual position of the element agrees with such analogue representation, and means responsive to said second analogue representation for continuing the drive of said second element along said second axis until the actual position of the element agrees with such analogue representation.